US011862837B2

(12) United States Patent
Shamsinejad et al.

(10) Patent No.: US 11,862,837 B2
(45) Date of Patent: Jan. 2, 2024

(54) HIERARCHICAL NETWORK SIGNAL ROUTING APPARATUS AND METHOD

(71) Applicant: Space Exploration Technologies Corp., Hawthorne, CA (US)

(72) Inventors: Souren Shamsinejad, Redmond, WA (US); Javier Rodriguez De Luis, Kirkland, WA (US); Nil Apaydin, Kirkland, WA (US); Alireza Mahanfar, Kirkland, WA (US)

(73) Assignee: Space Exploration Technologies Corp., Hawthorne, CA (US)

( * ) Notice: Subject to any disclaimer, the term of this patent is extended or adjusted under 35 U.S.C. 154(b) by 101 days.

(21) Appl. No.: 17/245,515

(22) Filed: Apr. 30, 2021

(65) Prior Publication Data

US 2021/0249749 A1 Aug. 12, 2021

Related U.S. Application Data

(63) Continuation of application No. 16/276,360, filed on Feb. 14, 2019, now Pat. No. 10,998,606.

(60) Provisional application No. 62/631,694, filed on Feb. 17, 2018, provisional application No. 62/631,195, filed on Feb. 15, 2018.

(51) Int. Cl.
*H01P 5/19* (2006.01)

(52) U.S. Cl.
CPC .................................... *H01P 5/19* (2013.01)

(58) Field of Classification Search
CPC .................................... H01P 5/19; H01Q 3/40
See application file for complete search history.

(56) References Cited

U.S. PATENT DOCUMENTS

| | | | |
|---|---|---|---|
| 7,626,556 | B1 | 12/2009 | Pluymers et al. |
| 9,379,437 | B1 | 6/2016 | Stutzke et al. |
| 10,998,606 | B2 | 5/2021 | Shamsinejad et al. |

(Continued)

FOREIGN PATENT DOCUMENTS

| | | | |
|---|---|---|---|
| KR | 1020110027494 | A | 3/2011 |
| KR | 101454878 | A | 11/2014 |

OTHER PUBLICATIONS

International Search Report and Written Opinion dated Apr. 10, 2020, issued in corresponding International Application No. PCT/US2019/018092, filed Feb. 14, 2019, 15 pages.

(Continued)

*Primary Examiner* — Andrea Lindgren Baltzell
*Assistant Examiner* — Kimberly E Glenn
(74) *Attorney, Agent, or Firm* — Polsinelli PC

(57) ABSTRACT

In some embodiments, an apparatus includes a first layer having a first plurality of electrically conductive traces comprising a first portion of a plurality of hierarchical networks; a second layer having a second plurality of electrically conductive traces comprising a second portion of the plurality of hierarchical networks; and a plurality of vias electrically connecting the first plurality of electrically conductive traces of the first layer to the respective second plurality of electrically conductive traces of the second layer to define the plurality of hierarchical networks. The first plurality of electrically conductive traces is orientated in a first direction and the second plurality of electrically conductive traces is orientated in a second direction different from the first direction.

26 Claims, 36 Drawing Sheets

(56) References Cited

U.S. PATENT DOCUMENTS

| | | | | |
|---|---|---|---|---|
| 2003/0076274 | A1 | 4/2003 | Phelan et al. | |
| 2003/0151550 | A1 | 8/2003 | Chen et al. | |
| 2007/0063898 | A1 | 3/2007 | Phelan et al. | |
| 2007/0152886 | A1 | 7/2007 | Baliarda | |
| 2008/0150832 | A1 | 6/2008 | Ingram et al. | |
| 2008/0291101 | A1 | 11/2008 | Braunstein et al. | |
| 2008/0297414 | A1 | 12/2008 | Krishnaswamy et al. | |
| 2012/0212303 | A1 | 8/2012 | Ding et al. | |
| 2013/0194152 | A1 | 8/2013 | Puente Baliarda et al. | |
| 2014/0266897 | A1 | 9/2014 | Jakoby et al. | |
| 2015/0015453 | A1 | 1/2015 | Puzella et al. | |
| 2016/0172755 | A1 | 6/2016 | Chen et al. | |
| 2019/0326664 | A1* | 10/2019 | Zhu | H01Q 3/38 |
| 2021/0243406 | A1* | 8/2021 | Bailey | H03H 7/06 |

OTHER PUBLICATIONS

International Search Report and Written Opinion dated Jun. 7, 2019, issued in corresponding International Application No. PCT/US2019/018064, filed Feb. 14, 2019, 11 pages.
International Search Report and Written Opinion dated Jun. 4, 2019, Issued in corresponding International Application No. PCT/US2019/018096, filed Feb. 14, 2019, 19 pages.

* cited by examiner

HIERARCHICAL NETWORK SIGNAL ROUTING APPARATUS AND METHOD

CROSS REFERENCE TO RELATED APPLICATIONS

This application is a continuation of U.S. application Ser. No. 16/276,360, filed Feb. 14, 2019, which claims the benefit of U.S. Provisional Patent Application No. 62/631,694 filed Feb. 17, 2018 and U.S. Provisional Patent Application No. 62/631,195 filed Feb. 15, 2018, the disclosures all of which are hereby expressly incorporated by reference herein in their entirety.

BACKGROUND

An antenna (such as a dipole antenna) typically generates radiation in a pattern that has a preferred direction. For example, the generated radiation pattern is stronger in some directions and weaker in other directions. Likewise, when receiving electromagnetic signals, the antenna has the same preferred direction. Signal quality (e.g., signal to noise ratio or SNR), whether in transmitting or receiving scenarios, can be improved by aligning the preferred direction of the antenna with a direction of the target or source of the signal. However, it is often impractical to physically reorient the antenna with respect to the target or source of the signal. Additionally, the exact location of the source/target may not be known. To overcome some of the above shortcomings of the antenna, a phased array antenna system can be formed from a set of antenna elements to simulate a large directional antenna. An advantage of a phased array antenna system is its ability to transmit and/or receive signals in a preferred direction (e.g., the antenna's beamforming ability) without physical repositioning or reorientating.

It would be advantageous to configure phased array antenna systems having increased bandwidth while maintaining a high ratio of the main lobe power to the side lobe power. Likewise, it would be advantageous to configure phased array antenna systems having reduced weight, reduced size, lower manufacturing cost, and/or lower power requirements. Accordingly, embodiments of the present disclosure are directed to these and other improvements in phase array antenna systems or portions thereof.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, a power splitter/combiner includes a first electrically conductive trace included in a first layer; second and third electrically conductive traces included in a second layer; a first via electrically coupled to the first and second electrically conductive traces; and a second via electrically coupled to the first and third electrically conductive traces. A first portion of the first electrically conductive trace comprises a first port of the power splitter/combiner. A second portion of the first electrically conductive trace, the first via, and the second electrically conductive trace comprises a second port of the power splitter/combiner. A third portion of the first electrically conductive trace, the second via, and the third electrically conductive trace comprises a third port of the power splitter/combiner.

In some embodiments, an apparatus includes a first electrical signal path branch included in a first layer; a second electrical signal path branch included in the first layer and a second layer; and a third electrical signal path branch included in the first and second layers. The first, second, and third electrical signal path branches electrically couple to each other in the first layer. Signal pathway lengths associated with the second and third electrical signal path branches are quarter wavelength signal pathway lengths.

In some embodiments, a method of routing signals includes, in response to receipt of a first signal in a first layer, splitting the first signal into second and third signals; causing to propagate the second signal from the first layer to a second layer disposed above or below the first layer; and causing to propagate the third signal from the first layer to the second layer. Each of the second and third signals has half the power of a power of the first signal.

In some embodiments, an apparatus includes a first layer having a first plurality of electrically conductive traces comprising a first portion of a plurality of hierarchical networks; a second layer having a second plurality of electrically conductive traces comprising a second portion of the plurality of hierarchical networks; and a plurality of vias electrically connecting the first plurality of electrically conductive traces of the first layer to the respective second plurality of electrically conductive traces of the second layer to define the plurality of hierarchical networks. The first plurality of electrically conductive traces is orientated in a first direction and the second plurality of electrically conductive traces is orientated in a second direction different from the first direction.

In some embodiments, an apparatus includes a first electrically conductive trace having a first orientation included in a first layer; a second electrically conductive trace having a second orientation, different from the first orientation, included in a second layer; and a power splitter/combiner included in the first and second layers. A first portion of the power splitter/combiner included in the first layer electrically connects to the first electrically conductive trace. A second portion of the power splitter/combiner included in the second layer electrically connects to the second electrically conductive trace. A third portion of the power splitter/combiner comprises a via that extends between the first and second layers.

In some embodiments, a method for routing signals includes routing a first signal through a first hierarchical network to a first plurality of electrical components; and routing a second signal through a second hierarchical network to a second plurality of electrical components. Routing the first signal through the first hierarchical network includes routing the first signal through a first electrically conductive trace oriented in a first direction in a first layer, a first via located between the first layer and a second layer, and a second electrically conductive trace oriented in a second direction, different from the first direction, in the second layer. Routing the second signal through the second hierarchical network includes routing the second signal through a third electrically conductive trace oriented in the first direction in the first layer, a second via located between the first layer and the second layer, and a fourth electrically conductive trace oriented in the second direction in the second layer. The first and third electrically conductive traces are offset from each other in the first layer and the second and fourth electrically conductive traces are offset from each other in the second layer.

DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein.

DETAILED DESCRIPTION

Figure 1A:
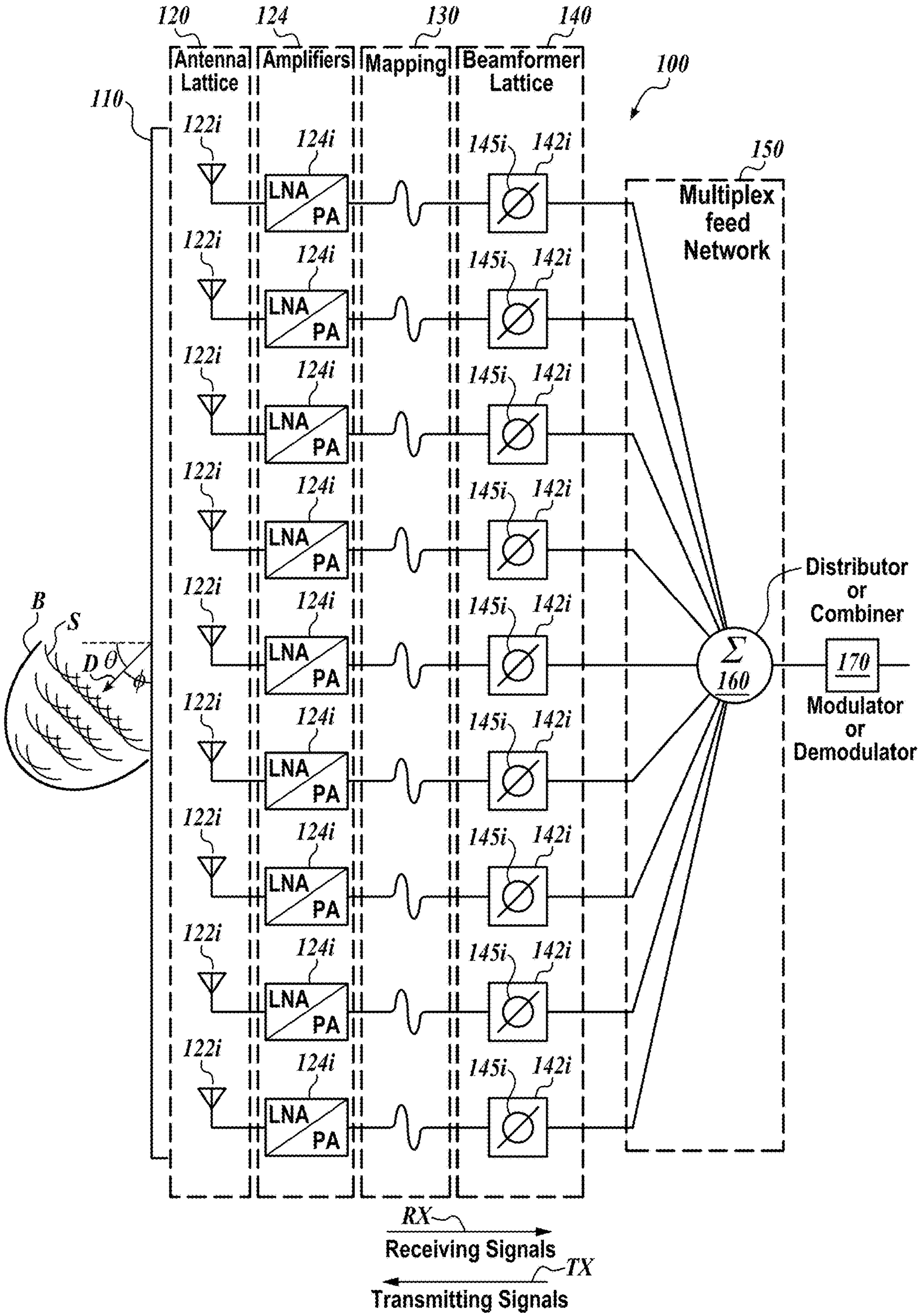
FIG. 1A illustrates a schematic of an electrical configuration for a phased array antenna system in accordance with one embodiment of the present disclosure including an antenna lattice defining an antenna aperture, mapping, a beamformer lattice, a multiplex feed network, a distributor or combiner, and a modulator or demodulator.

Embodiments of apparatuses and methods related to hierarchical network signal routing and power splitters/combiners are described herein. In embodiments, a substrate for phased array antennas includes a first layer having a first plurality of electrically conductive traces of a first portion of a plurality of hierarchical networks, and a second layer having a second plurality of electrically conductive traces of a second portion of the plurality of hierarchical networks. The first plurality of traces is orientated in a first direction and the second plurality of traces is orientated in a second direction different from the first direction. A plurality of vias electrically connects the first plurality of traces of the first layer to the respective second plurality of traces of the second layer to define the plurality of hierarchical networks. These and other aspects of the present disclosure will be more fully described below.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Additionally, it should be appreciated that items included in a list in the form of "at least one A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C).

Language such as "top surface", "bottom surface", "vertical", "horizontal", and "lateral" in the present disclosure is meant to provide orientation for the reader with reference to the drawings and is not intended to be the required orientation of the components or to impart orientation limitations into the claims.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, it may not be included or may be combined with other features.

Many embodiments of the technology described herein may take the form of computer- or controller-executable instructions, including routines executed by a programmable computer or controller. Those skilled in the relevant art will appreciate that the technology can be practiced on computer/controller systems other than those shown and described above. The technology can be embodied in a special-purpose computer, controller or data processor that is specifically programmed, configured or constructed to perform one or more of the computer-executable instructions described above. Accordingly, the terms "computer" and "controller" as generally used herein refer to any data processor and can include Internet appliances and hand-held devices (including palm-top computers, wearable computers, cellular or mobile phones, multi-processor systems, processor-based or programmable consumer electronics, network computers, mini computers and the like). Information handled by these computers can be presented at any suitable display medium, including a cathode ray tube (CRT) display or liquid crystal display (LCD).

FIG. 1A is a schematic illustration of a phased array antenna system 100 in accordance with embodiments of the present disclosure. The phased array antenna system 100 is designed and configured to transmit or receive a combined beam B composed of signals S (also referred to as electromagnetic signals, wavefronts, or the like) in a preferred direction D from or to an antenna aperture 110. (Also see the combined beam B and antenna aperture 110 in FIG. 1B). The direction D of the beam B may be normal to the antenna aperture 110 or at an angle θ from normal.

Referring to FIG. 1A, the illustrated phased array antenna system 100 includes an antenna lattice 120, a mapping system 130, a beamformer lattice 140, a multiplex feed network 150 (or a hierarchical network or an H-network), a combiner or distributor 160 (a combiner for receiving signals or a distributor for transmitting signals), and a modulator or demodulator 170. The antenna lattice 120 is configured to transmit or receive a combined beam B of radio frequency signals S having a radiation pattern from or to the antenna aperture 110.

In accordance with embodiments of the present disclosure, the phased array antenna system 100 may be a multibeam phased array antenna system, in which each beam of the multiple beams may be configured to be at different angles, different frequency, and/or different polarization.

In the illustrated embodiment, the antenna lattice 120 includes a plurality of antenna elements 122*i*. A corresponding plurality of amplifiers 124*i* are coupled to the plurality of antenna elements 122*i*. The amplifiers 124*i* may be low noise amplifiers (LNAs) in the receiving direction RX or power amplifiers (PAs) in the transmitting direction TX. The plurality of amplifiers 124*i* may be combined with the plurality of antenna elements 122*i* in for example, an antenna module or antenna package. In some embodiments, the plurality of amplifiers 124*i* may be located in another lattice separate from the antenna lattice 120.

Figure 1B:
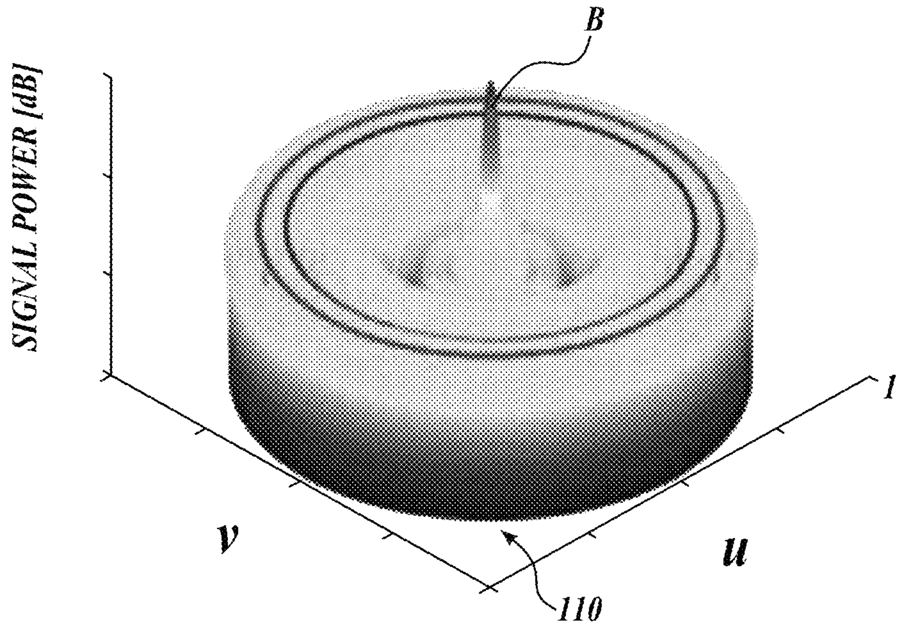
FIG. 1B illustrates a signal radiation pattern achieved by a phased array antenna aperture in accordance with one embodiment of the present disclosure.

Multiple antenna elements 122*i* in the antenna lattice 120 are configured for transmitting signals (see the direction of arrow TX in FIG. 1A for transmitting signals) or for receiving signals (see the direction of arrow RX in FIG. 1A for receiving signals). Referring to FIG. 1B, the antenna aperture 110 of the phased array antenna system 100 is the area through which the power is radiated or received. In accordance with one embodiment of the present disclosure, an exemplary phased array antenna radiation pattern from a phased array antenna system 100 in the u/v plane is provided in FIG. 1B. The antenna aperture has desired pointing angle D and an optimized beam B, for example, reduced side lobes Ls to optimize the power budget available to the main lobe Lm or to meet regulatory criteria for interference, as per regulations issued from organizations such as the Federal Communications Commission (FCC) or the International Telecommunication Union (ITU). (See FIG. 1F for a description of side lobes Ls and the main lobe Lm.)

Figure 1C:
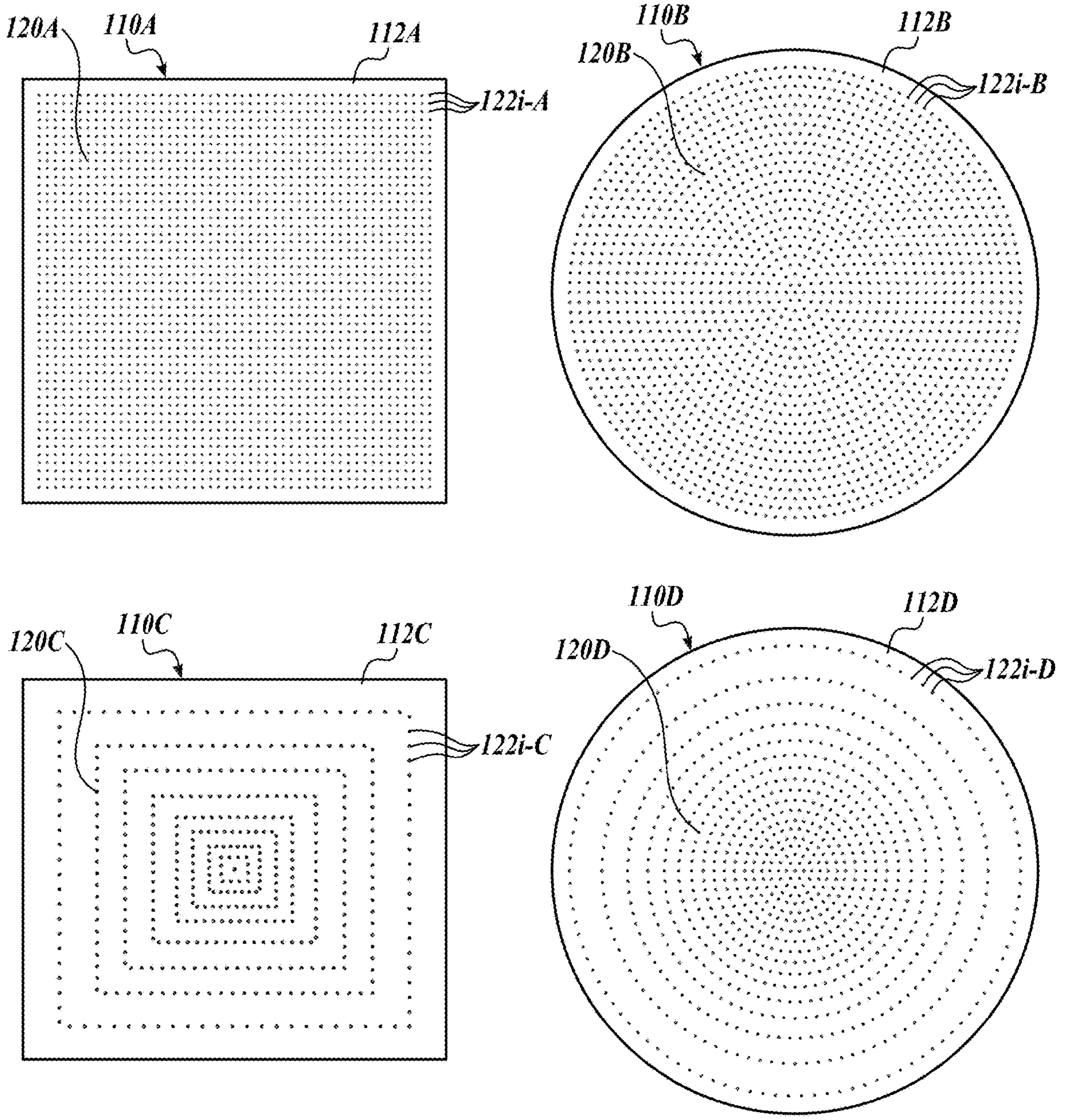
FIG. 1C illustrates schematic layouts of individual antenna elements of phased array antennas to define various antenna apertures in accordance with embodiments of the present disclosure (e.g., rectangular, circular, space tapered).

Referring to FIG. 1C, in some embodiments (see embodiments 120A, 120B, 120C, 120D), the antenna lattice 120 defining the antenna aperture 110 may include the plurality of antenna elements 122*i* arranged in a particular configuration on a printed circuit board (PCB), ceramic, plastic, glass, or other suitable substrate, base, carrier, panel, or the like (described herein as a carrier 112). The plurality of antenna elements 122*i*, for example, may be arranged in concentric circles, in a circular arrangement, in columns and rows in a rectilinear arrangement, in a radial arrangement, in equal or uniform spacing between each other, in non-uniform spacing between each other, or in any other arrangement. Various example arrangements of the plurality of antenna elements 122*i* in antenna lattices 120 defining antenna apertures (110A, 110B, 110C, and 110D) are shown, without limitation, on respective carriers 112A, 112B, 112C, and 112D in FIG. 1C.

The beamformer lattice 140 includes a plurality of beamformers 142*i* including a plurality of phase shifters 145*i*. In the receiving direction RX, the beamformer function is to delay the signals arriving from each antenna element so the signals all arrive to the combining network at the same time. In the transmitting direction TX, the beamformer function is to delay the signal sent to each antenna element such that all signals arrive at the target location at the same time. This delay can be accomplished by using "true time delay" or a phase shift at a specific frequency.

Following the transmitting direction of arrow TX in the schematic illustration of FIG. 1A, in a transmitting phased array antenna system 100, the outgoing radio frequency (RF) signals are routed from the modulator 170 via the distributer 160 to a plurality of individual phase shifters 145*i* in the beamformer lattice 140. The RF signals are phase-offset by the phase shifters 145*i* by different phases, which vary by a predetermined amount from one phase shifter to another. Each frequency needs to be phased by a specific amount in order to maintain the beam performance. If the phase shift applied to different frequencies follows a linear behavior, the phase shift is referred to as "true time delay". Common phase shifters, however, apply a constant phase offset for all frequencies.

For example, the phases of the common RF signal can be shifted by 0° at the bottom phase shifter 145*i* in FIG. 1A, by 4*a* at the next phase shifter 145*i* in the column, by 24*a* at the next phase shifter, and so on. As a result, the RF signals that arrive at amplifiers 124*i* (when transmitting, the amplifiers are power amplifiers "PAs") are respectively phase-offset from each other. The PAs 124*i* amplify these phase-offset RF signals, and antenna elements 122*i* emit the RF signals S as electromagnetic waves.

Because of the phase offsets, the RF signals from individual antenna elements 122*i* are combined into outgoing wave fronts that are inclined at angle $\phi$ from the antenna aperture 110 formed by the lattice of antenna elements 122*i*. The angle $\phi$ is called an angle of arrival (AoA) or a beamforming angle. Therefore, the choice of the phase offset $\Delta\alpha$ determines the radiation pattern of the combined signals S defining the wave front. In FIG. 1B, an exemplary phased array antenna radiation pattern of signals S from an antenna aperture 110 in accordance with one embodiment of the present disclosure is provided.

Following the receiving direction of arrow RX in the schematic illustration of FIG. 1A, in a receiving phased array antenna system 100, the signals S defining the wave front are detected by individual antenna elements 122*i*, and amplified by amplifiers 124*i* (when receiving signals the amplifiers are low noise amplifiers "LNAs"). For any non-zero AoA, signals S comprising the same wave front reach the different antenna elements 122*i* at different times. Therefore, the received signal will generally include phase offsets from one antenna element of the receiving (RX) antenna element to another. Analogously to the emitting phased array antenna case, these phase offsets can be adjusted by phase shifters 145*i* in the beamformer lattice 140. For example, each phase shifter 145*i* (e.g., a phase shifter chip) can be programmed to adjust the phase of the signal to the same reference, such that the phase offset among the individual antenna elements 122*i* is canceled in order to combine the RF signals corresponding to the same wave front. As a result of this constructive combining of signals, a higher signal to noise ratio (SNR) can be attained on the received signal, which results in increased channel capacity.

Still referring to FIG. 1A, a mapping system 130 may be disposed between the antenna lattice 120 and the beamformer lattice 140 to provide length matching for equidistant electrical connections between each antenna element 122*i* of the antenna lattice 120 and the phase shifters 145*i* in the beamformer lattice 140, as will be described in greater detail below. A multiplex feed or hierarchical network 150 may be disposed between the beamformer lattice 140 and the distributor/combiner 160 to distribute a common RF signal to the phase shifters 145*i* of the beamformer lattice 140 for respective appropriate phase shifting and to be provided to the antenna elements 122*i* for transmission, and to combine RF signals received by the antenna elements 122*i*, after appropriate phase adjustment by the beamformers 142*i*.

In accordance with some embodiments of the present disclosure, the antenna elements 122*i* and other components of the phased array antenna system 100 may be contained in an antenna module to be carried by the carrier 112. (See, for example, antenna modules 226*a* and 226*b* in FIG. 2B). In the illustrated embodiment of FIG. 2B, there is one antenna element 122*i* per antenna module 226*a*. However, in other embodiments of the present disclosure, antenna modules 226*a* may incorporate more than one antenna element 122*i*.

Figure 1D:
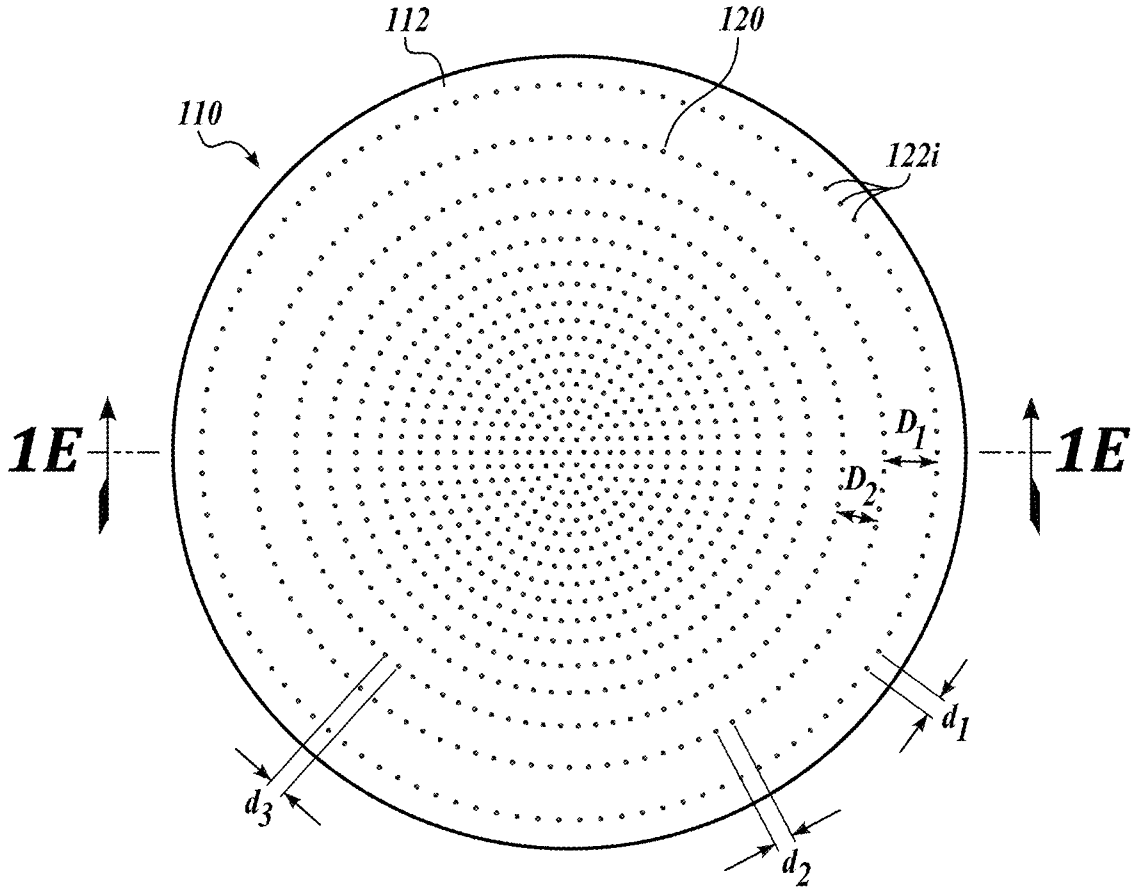
FIG. 1D illustrates individual antenna elements in a space tapered configuration to define an antenna aperture in accordance with embodiments of the present disclosure.
Figure 1E:
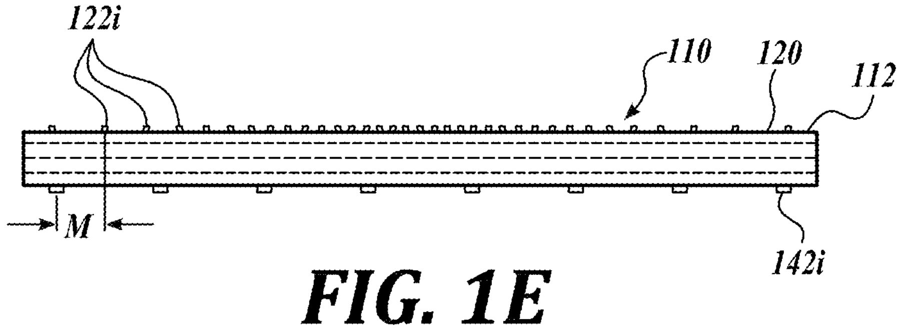
FIG. 1E is a cross-sectional view of a panel defining the antenna aperture in FIG. 1D.

Referring to FIGS. 1D and 1E, an exemplary configuration for an antenna aperture 120 in accordance with one embodiment of the present disclosure is provided. In the illustrated embodiment of FIGS. 1D and 1E, the plurality of antenna elements 122*i* in the antenna lattice 120 are distributed with a space taper configuration on the carrier 112. In accordance with a space taper configuration, the number of antenna elements 122*i* changes in their distribution from a center point of the carrier 112 to a peripheral point of the carrier 112. For example, compare spacing between adjacent antenna elements 122*i*, D1 to D2, and compare spacing between adjacent antenna elements 122*i*, d1, d2, and d3. Although shown as being distributed with a space taper configuration, other configurations for the antenna lattice are also within the scope of the present disclosure.

The system 100 includes a first portion carrying the antenna lattice 120 and a second portion carrying a beamformer lattice 140 including a plurality of beamformer elements. As seen in the cross-sectional view of FIG. 1E, multiple layers of the carrier 112 carry electrical and electromagnetic connections between elements of the phased array antenna system 100. In the illustrated embodiment, the antenna elements 122*i* are located the top surface of the top layer and the beamformer elements 142*i* are located on the bottom surface of the bottom layer. While the antenna elements 122*i* may be configured in a first arrangement, such as a space taper arrangement, the beamformer elements 142*i* may be arranged in a second arrangement different from the antenna element arrangement. For example, the number of antenna elements 122*i* may be greater than the number of beamformer elements 142*i*, such that multiple antenna elements 122*i* correspond to one beamformer element 142*i*. As another example, the beamformer elements 142*i* may be laterally displaced from the antenna elements 122*i* on the carrier 112, as indicated by distance M in FIG. 1E. In one embodiment of the present disclosure, the beamformer elements 142*i* may be arranged in an evenly spaced or organized arrangement, for example, corresponding to an H-network, or a cluster network, or an unevenly spaced network such as a space tapered network different from the antenna lattice 120. In some embodiments, one or more additional layers may be disposed between the top and bottom layers of the carrier 112. Each of the layers may comprise one or more PCB layers.

Figure 1F:
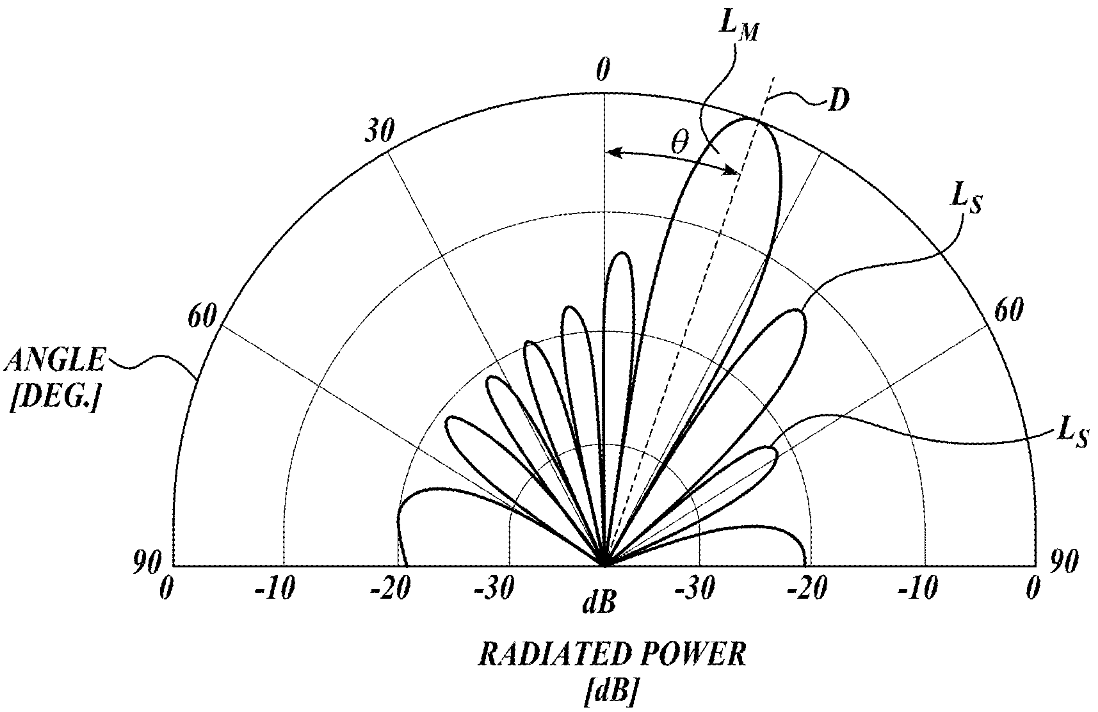
FIG. 1F is a graph of a main lobe and undesirable side lobes of an antenna signal.

Referring to FIG. 1F, a graph of a main lobe Lm and side lobes Ls of an antenna signal in accordance with embodiments of the present disclosure is provided. The horizontal (also the radial) axis shows radiated power in dB. The angular axis shows the angle of the RF field in degrees. The main lobe Lm represents the strongest RF field that is generated in a preferred direction by a phased array antenna system 100. In the illustrated case, a desired pointing angle D of the main lobe Lm corresponds to about 20°. Typically, the main lobe Lm is accompanied by a number of side lobes Ls. However, side lobes Ls are generally undesirable because they derive their power from the same power budget thereby reducing the available power for the main lobe Lm. Furthermore, in some instances the side lobes Ls may reduce the SNR of the antenna aperture 110. Also, side lobe reduction is important for regulation compliance.

One approach for reducing side lobes Ls is arranging elements 122*i* in the antenna lattice 120 with the antenna elements 122*i* being phase offset such that the phased array antenna system 100 emits a waveform in a preferred direction D with reduced side lobes. Another approach for reducing side lobes Ls is power tapering. However, power tapering is generally undesirable because by reducing the power of the side lobe Ls, the system has increased design complexity of requiring of "tunable and/or lower output" power amplifiers.

In addition, a tunable amplifier 124*i* for output power has reduced efficiency compared to a non-tunable amplifier. Alternatively, designing different amplifiers having different gains increases the overall design complexity and cost of the system.

Yet another approach for reducing side lobes Ls in accordance with embodiments of the present disclosure is a space tapered configuration for the antenna elements 122*i* of the antenna lattice 120. (See the antenna element 122*i* configuration in FIGS. 1C and 1D.) Space tapering may be used to reduce the need for distributing power among antenna elements 122*i* to reduce undesirable side lobes Ls. However, in some embodiments of the present disclosure, space taper distributed antenna elements 122*i* may further include power or phase distribution for improved performance.

In addition to undesirable side lobe reduction, space tapering may also be used in accordance with embodiments of the present disclosure to reduce the number of antenna elements 122*i* in a phased array antenna system 100 while still achieving an acceptable beam B from the phased array antenna system 100 depending on the application of the system 100. (For example, compare in FIG. 1C the number of space-tapered antenna elements 122*i* on carrier 112D with the number of non-space tapered antenna elements 122*i* carried by carrier 112B.)

Figure 1G:
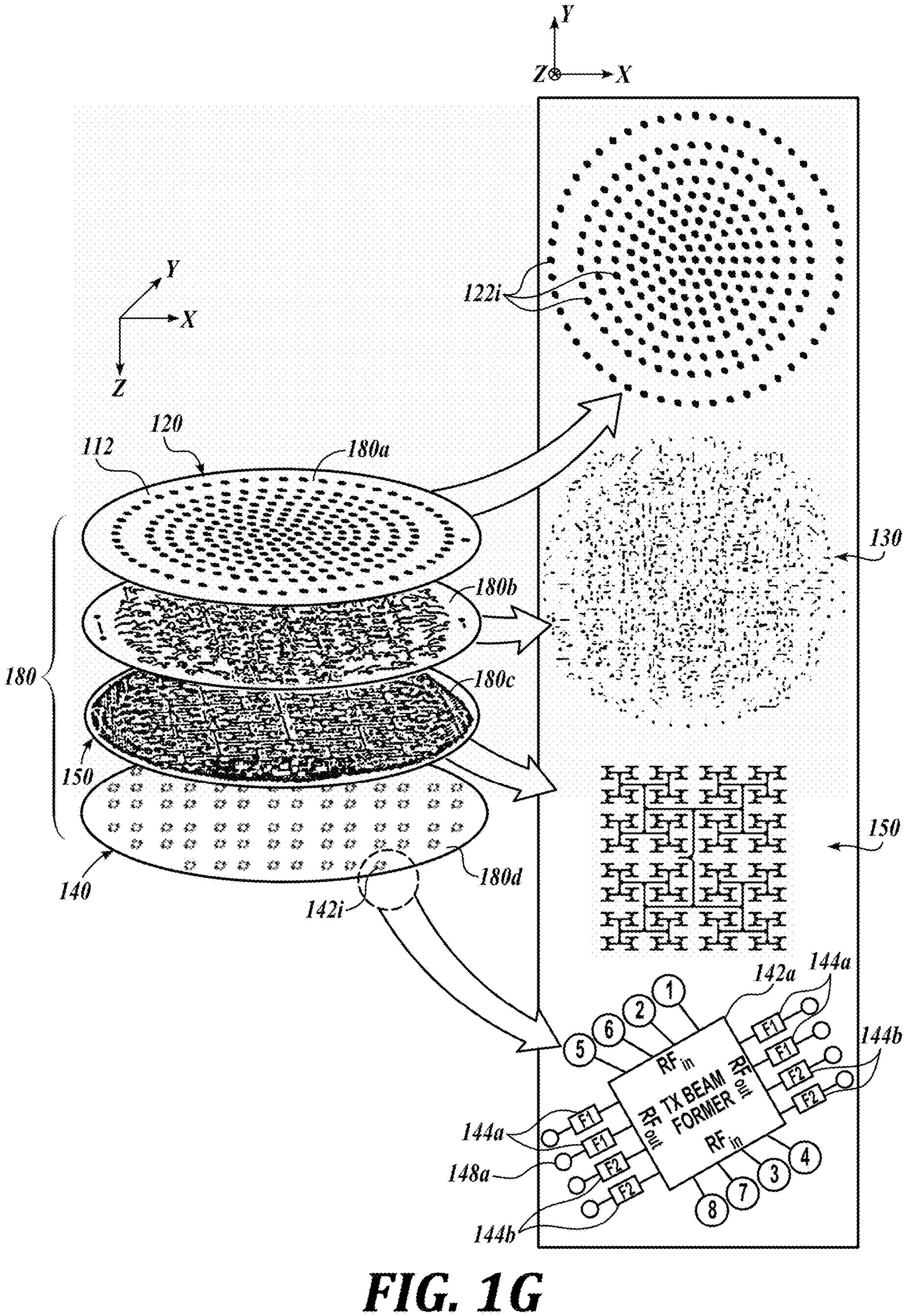
FIG. 1G illustrates an isometric view of a plurality of stack-up layers which make up a phased array antenna system in accordance with one embodiment of the present disclosure.

FIG. 1G depicts an exemplary configuration of the phased array antenna system 100 implemented as a plurality of PCB layers in lay-up 180 in accordance with embodiments of the present disclosure. The plurality of PCB layers in lay-up 180 may comprise a PCB layer stack including an antenna layer 180*a*, a mapping layer 180*b*, a multiplex feed network layer 180*c*, and a beamformer layer 180*d*. In the illustrated embodiment, mapping layer 180*b* is disposed between the antenna layer 180*a* and multiplex feed network layer 180*c*, and the multiplex feed network layer 180*c* is disposed between the mapping layer 180*b* and the beamformer layer 180*d*.

Although not shown, one or more additional layers may be disposed between layers 180*a* and 180*b*, between layers 180*b* and 180*c*, between layers 180*c* and 180*d*, above layer 180*a*, and/or below layer 180*d*. Each of the layers 180*a*, 180*b*, 180*c*, and 180*d* may comprise one or more PCB sub-layers. In other embodiments, the order of the layers 180*a*, 180*b*, 180*c*, and 180*d* relative to each other may differ from the arrangement shown in FIG. 1G. For instance, in other embodiments, beamformer layer 180*d* may be disposed between the mapping layer 180*b* and multiplex feed network layer 180*c*.

Layers 180*a*, 180*b*, 180*c*, and 180*d* may include electrically conductive traces (such as metal traces that are mutually separated by electrically isolating polymer or ceramic), electrical components, mechanical components, optical components, wireless components, electrical coupling structures, electrical grounding structures, and/or other structures configured to facilitate functionalities associated with the phase array antenna system 100. Structures located on a particular layer, such as layer 180*a*, may be electrically interconnected with vertical vias (e.g., vias extending along the z-direction of a Cartesian coordinate system) to establish electrical connection with particular structures located on another layer, such as layer 180*d*.

Antenna layer 180*a* may include, without limitation, the plurality of antenna elements 122*i* arranged in a particular arrangement (e.g., a space taper arrangement) as an antenna lattice 120 on the carrier 112. Antenna layer 180*a* may also include one or more other components, such as corresponding amplifiers 124*i*. Alternatively, corresponding amplifiers 124*i* may be configured on a separate layer. Mapping layer 180*b* may include, without limitation, the mapping system 130 and associated carrier and electrical coupling structures. Multiplex feed network layer 180*c* may include, without limitation, the multiplex feed network 150 and associated carrier and electrical coupling structures. Beamformer layer 180*d* may include, without limitation, the plurality of phase shifters 145*i*, other components of the beamformer lattice 140, and associated carrier and electrical coupling structures. Beamformer layer 180*d* may also include, in some embodiments, modulator/demodulator 170 and/or coupler structures. In the illustrated embodiment of FIG. 1G, the beamformers 142*i* are shown in phantom lines because they extend from the underside of the beamformer layer 180*d*.

Although not shown, one or more of layers 180*a*, 180*b*, 180*c*, or 180*d* may itself comprise more than one layer. For example, mapping layer 180*b* may comprise two or more layers, which in combination may be configured to provide the routing functionality discussed above. As another example, multiplex feed network layer 180*c* may comprise two or more layers, depending upon the total number of multiplex feed networks included in the multiplex feed network 150.

In accordance with embodiments of the present disclosure, the phased array antenna system 100 may be a multi-beam phased array antenna system. In a multi-beam phased array antenna configuration, each beamformer 142*i* may be electrically coupled to more than one antenna element 122*i*.

Figure 2A:
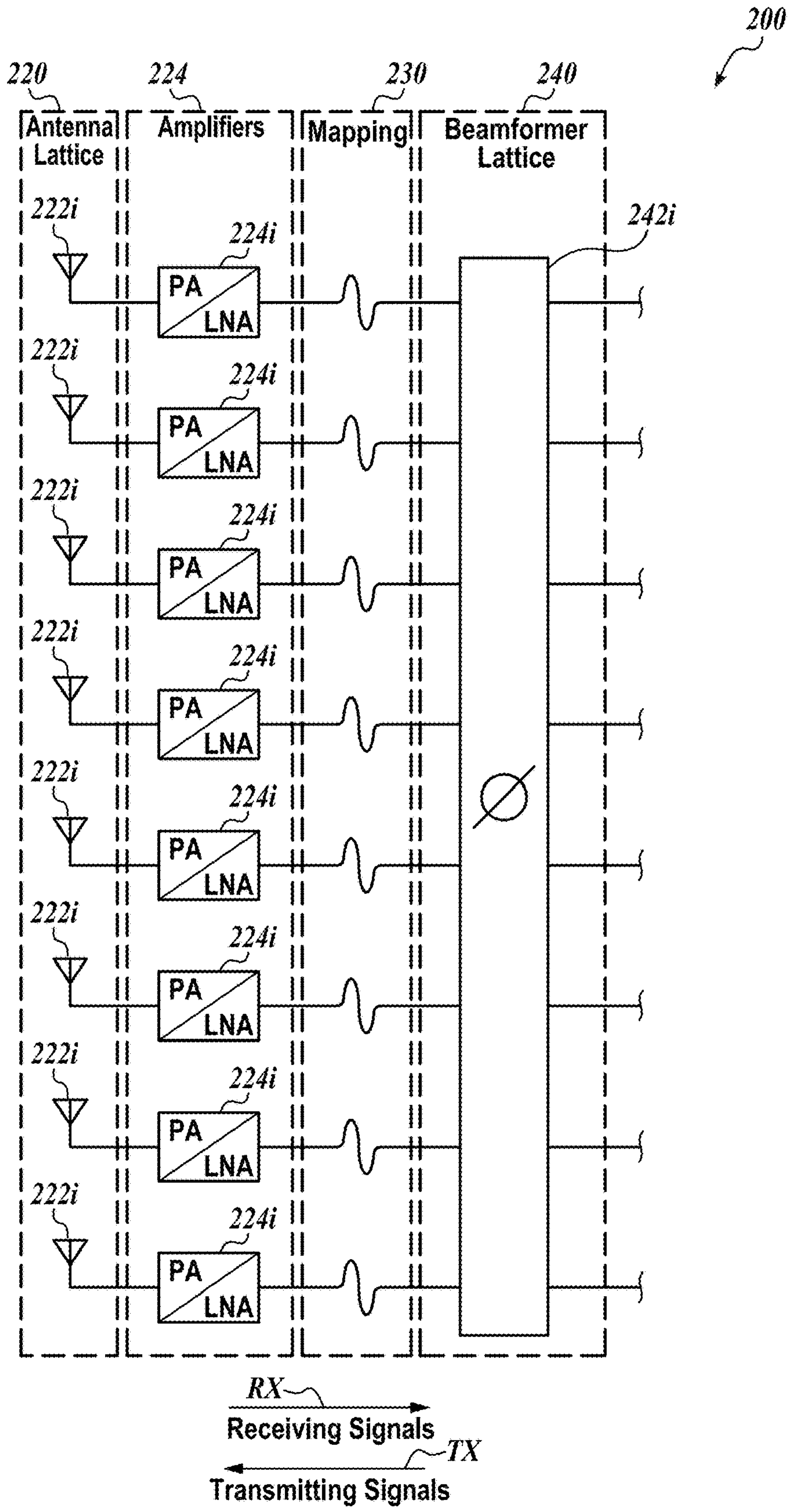
FIG. 2A illustrates a schematic of an electrical configuration for multiple antenna elements in an antenna lattice coupled to a single beamformer in a beamformer lattice in accordance with one embodiment of the present disclosure.

The total number of beamformer 142*i* may be smaller than the total number of antenna elements 122*i*. For example, each beamformer 142*i* may be electrically coupled to four antenna elements 122*i* or to eight antenna elements 122*i*. FIG. 2A illustrates an exemplary multi-beam phased array antenna system in accordance with one embodiment of the present disclosure in which eight antenna elements 222*i* are electrically coupled to one beamformer 242*i*. In other embodiments, each beamformer 142*i* may be electrically coupled to more than eight antenna elements 122*i*.

Figure 2B:
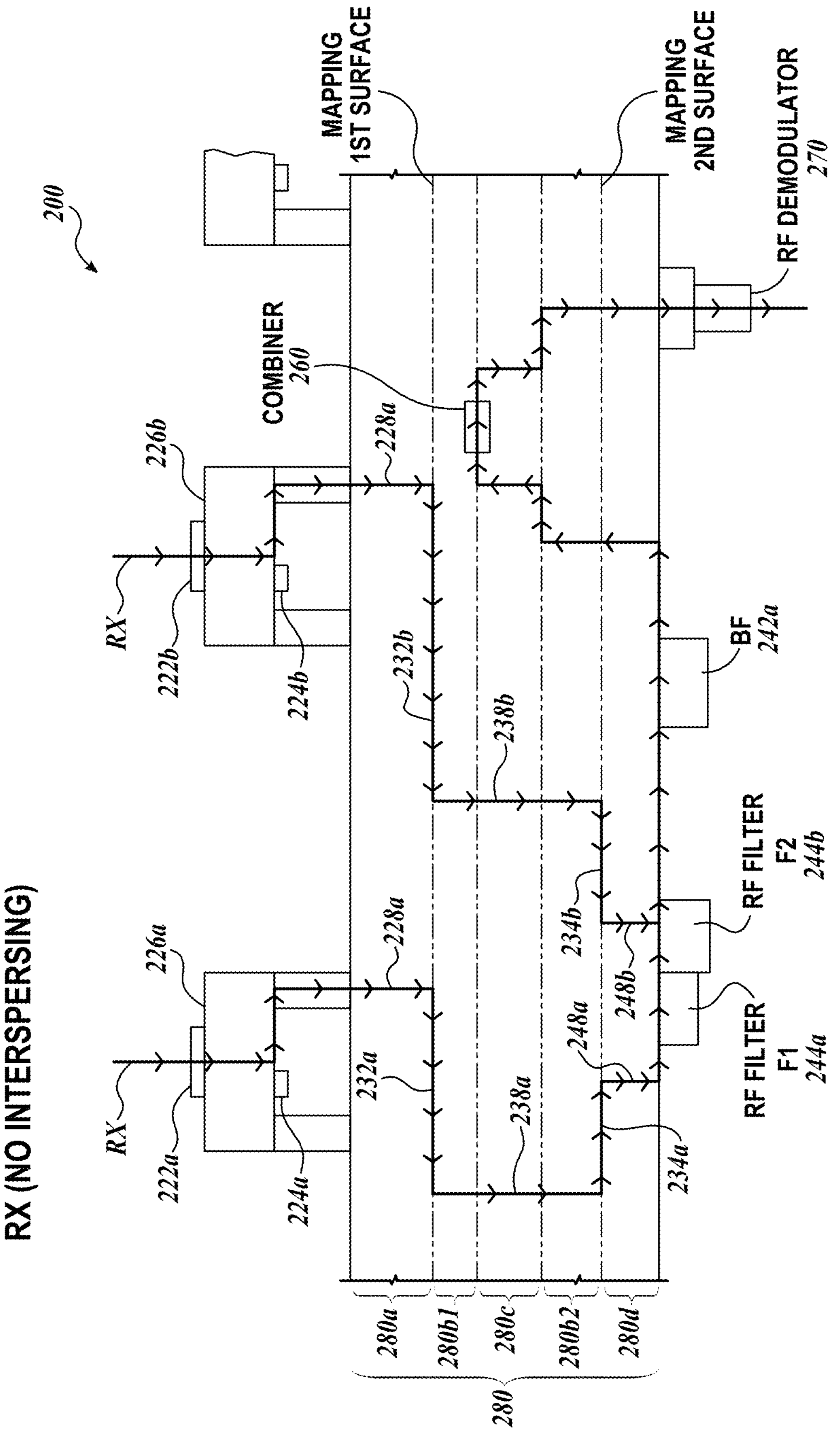
FIG. 2B illustrates a schematic cross section of a plurality of stack-up layers which make up a phased array antenna system in an exemplary receiving system in accordance with the electrical configuration of FIG. 2A.

FIG. 2B depicts a partial, close-up, cross-sectional view of an exemplary configuration of the phased array antenna system 200 of FIG. 2A implemented as a plurality of PCB layers 280 in accordance with embodiments of the present disclosure. Like part numbers are used in FIG. 2B as used in FIG. 1G with similar numerals, but in the 200 series.

In the illustrated embodiment of FIG. 2B, the phased array antenna system 200 is in a receiving configuration (as indicated by the arrows RX). Although illustrated as in a receiving configuration, the structure of the embodiment of FIG. 2B may be modified to be also be suitable for use in a transmitting configuration.

Signals are detected by the individual antenna elements 222*a* and 222*b*, shown in the illustrated embodiment as being carried by antenna modules 226*a* and 226*b* on the top surface of the antenna lattice layer 280*a*. After being received by the antenna elements 222*a* and 222*b*, the signals are amplified by the corresponding low noise amplifiers (LNAs) 224*a* and 224*b*, which are also shown in the illustrated embodiment as being carried by antenna modules 226*a* and 226*b* on a top surface of the antenna lattice layer 280*a*.

In the illustrated embodiment of FIG. 2B, a plurality of antenna elements 222*a* and 222*b* in the antenna lattice 220 are coupled to a single beamformer 242*a* in the beamformer lattice 240 (as described with reference to FIG. 2A). However, a phased array antenna system implemented as a plurality of PCB layers having a one-to-one ratio of antenna elements to beamformer elements or having a greater than one-to-one ratio are also within the scope of the present disclosure. In the illustrated embodiment of FIG. 2B, the beamformers 242*i* are coupled to the bottom surface of the beamformer layer 280*d*.

In the illustrated embodiment, the antenna elements 222*i* and the beamformer elements 242*i* are configured to be on opposite surfaces of the lay-up of PCB layers 280. In other embodiments, beamformer elements may be co-located with antenna elements on the same surface of the lay-up. In other embodiments, beamformers may be located within an antenna module or antenna package.

As previously described, electrical connections coupling the antenna elements 222*a* and 222*b* of the antenna lattice 220 on the antenna layer 280*a* to the beamformer elements 242*a* of the beamformer lattice 240 on the beamformer layer 280*d* are routed on surfaces of one or more mapping layers 280*b*1 and 280*b*2 using electrically conductive traces. Exemplary mapping trace configurations for a mapping layer are provided in layer 130 of FIG. 1G.

In the illustrated embodiment, the mapping is shown on top surfaces of two mapping layers 280*b*1 and 280*b*2. However, any number of mapping layers may be used in accordance with embodiments of the present disclosure, including a single mapping layer. Mapping traces on a single mapping layer cannot cross other mapping traces. Therefore, the use of more than one mapping layer can be advantageous in reducing the lengths of the electrically conductive mapping traces by allowing mapping traces in horizontal planes to cross an imaginary line extending through the lay-up 280 normal to the mapping layers and in selecting the placement of the intermediate vias between the mapping traces.

In addition to mapping traces on the surfaces of layers 280*b*1 and 280*b*2, mapping from the antenna lattice 220 to the beamformer lattice 240 further includes one or more electrically conductive vias extending vertically through one or more of the plurality of PCB layers 280.

In the illustrated embodiment of FIG. 2B, a first mapping trace 232*a* between first antenna element 222*a* and beamformer element 242*a* is formed on the first mapping layer 280*b*1 of the lay-up of PCB layers 280. A second mapping trace 234*a* between the first antenna element 222*a* and beamformer element 242*a* is formed on the second mapping layer 280*b*2 of the lay-up of PCB layers 280. An electrically conductive via 238*a* connects the first mapping trace 232*a* to the second mapping trace 234*a*. Likewise, an electrically conductive via 228*a* connects the antenna element 222*a* (shown as connecting the antenna module 226*a* including the antenna element 222*a* and the amplifier 224*a*) to the first mapping trace 232*a*. Further, an electrically conductive via 248*a* connects the second mapping trace 234*a* to RF filter 244*a* and then to the beamformer element 242*a*, which then connects to combiner 260 and RF demodulator 270.

Of note, via 248*a* corresponds to via 148*a* and filter 244*a* corresponds to filter 144*a*, both shown on the surface of the beamformer layer 180*d* in the previous embodiment of FIG. 1G. In some embodiments of the present disclosure, filters may be omitted depending on the design of the system.

Similar mapping connects the second antenna element 222*b* to RF filter 244*b* and then to the beamformer element 242*a*. The second antenna element 222*b* may operate at the same or at a different value of a parameter than the first antenna element 222*a* (for example at different frequencies). If the first and second antenna elements 222*a* and 222*b* operate at the same value of a parameter, the RF filters 244*a* and 244*b* may be the same. If the first and second antenna elements 222*a* and 222*b* operate at different values, the RF filters 244*a* and 244*b* may be different.

Mapping traces and vias may be formed in accordance with any suitable methods. In one embodiment of the present disclosure, the lay-up of PCB layers 280 is formed after the multiple individual layers 280*a*, 280*b*, 280*c*, and 280*d* have been formed. For example, during the manufacture of layer 280*a*, electrically conductive via 228*a* may be formed through layer 280*a*. Likewise, during the manufacture of layer 280*d*, electrically conductive via 248*a* may be formed through layer 280*d*. When the multiple individual layers 280*a*, 280*b*, 280*c*, and 280*d* are assembled and laminated together, the electrically conductive via 228*a* through layer 280*a* electrically couples with the trace 232*a* on the surface of layer 280*b*1, and the electrically conductive via 248*a* through layer 280*d* electrically couples with the trace 234*a* on the surface of layer 280*b*2.

Other electrically conductive vias, such as via 238*a* coupling trace 232*a* on the surface of layer 280*b*1 and trace 234*a* on the surface of layer 280*b*2 can be formed after the multiple individual layers 280*a*, 280*b*, 280*c*, and 280*d* are assembled and laminated together. In this construction method, a hole may be drilled through the entire lay-up 280 to form the via, metal is deposited in the entirety of the hole forming an electrically connection between the traces 232*a* and 234*a*. In some embodiments of the present disclosure, excess metal in the via not needed in forming the electrical connection between traces 232*a* and 234*a* can be removed by back-drilling the metal at the top and/or bottom portions of the via. In some embodiments, back-drilling of the metal is not performed completely, leaving a via "stub". Tuning may be performed for a lay-up design with a remaining via "stub". In other embodiments, a different manufacturing process may produce a via that does not span more than the needed vertical direction.

As compared to the use of one mapping layer, the use of two mapping layers **280*b*1 and 280*b*2 separated by intermediate vias 238*a* and 238*b* as seen in the illustrated embodiment of FIG. 2B allows for selective placement of the intermediate vias 238*a* and 238*b*. If these vias are drilled though all the layers of the lay-up 280, they can be selectively positioned to be spaced from other components on the top or bottom surfaces of the lay-up 280**.

Figure 3A:
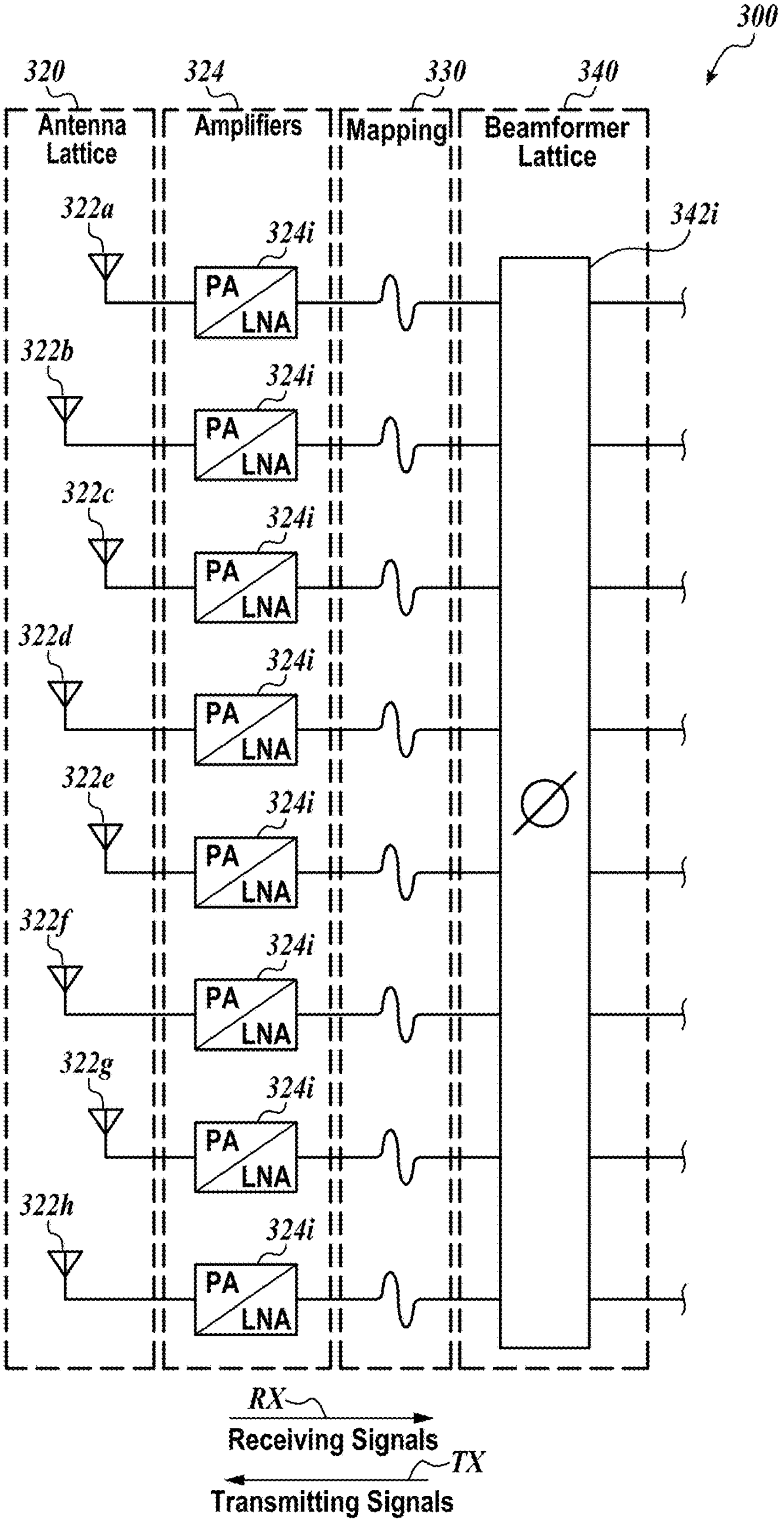
FIG. 3A illustrates a schematic of an electrical configuration for multiple interspersed antenna elements in an antenna lattice coupled to a single beamformer in a beamformer lattice in accordance with one embodiment of the present disclosure.
Figure 3B:
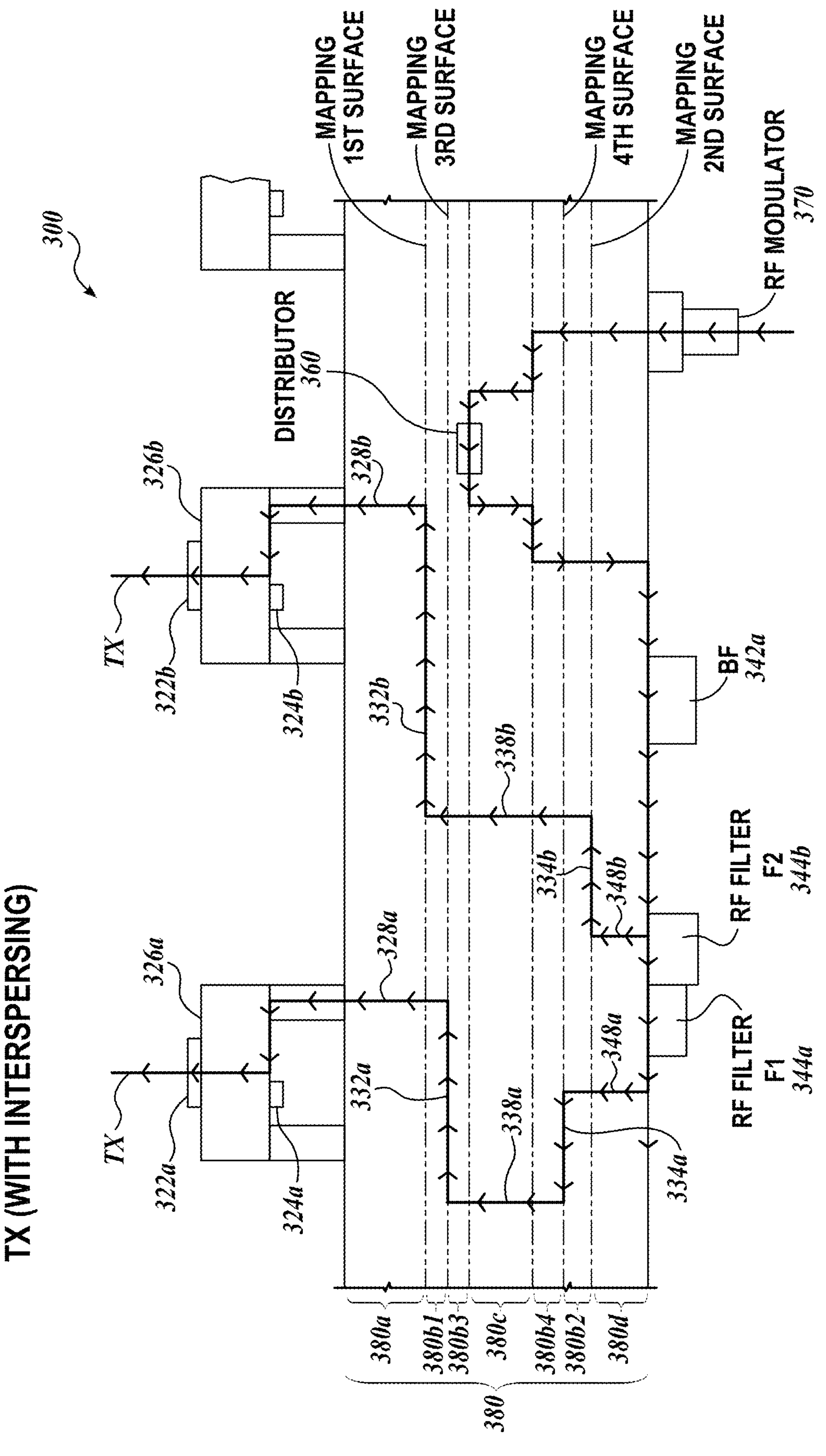
FIG. 3B illustrates a schematic cross section of a plurality of stack-up layers which make up a phased array antenna system in an exemplary transmitting and interspersed system in accordance with the electrical configuration of FIG. 3A.

FIGS. 3A and 3B are directed to another embodiment of the present disclosure. FIG. 3A illustrates an exemplary multi-beam phased array antenna system in accordance with one embodiment of the present disclosure in which eight antenna elements **322*i* are electrically coupled to one beamformer 342*i*, with the eight antenna elements 322*i* being into two different groups of interspersed antenna elements 322*a* and 322*b***.

FIG. 3B depicts a partial, close-up, cross-sectional view of an exemplary configuration of the phased array antenna system 300 implemented as a stack-up of a plurality of PCB layers 380 in accordance with embodiments of the present disclosure. The embodiment of FIG. 3B is similar to the embodiment of FIG. 2B, except for differences regarding interspersed antenna elements, the number of mapping layers, and the direction of signals, as will be described in greater detail below. Like part numbers are used in FIG. 3B as used in FIG. 3A with similar numerals, but in the 300 series.

In the illustrated embodiment of FIG. 3B, the phased array antenna system 300 is in a transmitting configuration (as indicated by the arrows TX). Although illustrated as in a transmitting configuration, the structure of the embodiment of FIG. 3B may be modified to also be suitable for use in a receiving configuration.

In some embodiments of the present disclosure, the individual antenna elements **322*a* and 322*b*** may be configured to receive and/or transmit data at different values of one or more parameters (e.g., frequency, polarization, beam orientation, data streams, receive (RX)/transmit (TX) functions, time multiplexing segments, etc.). These different values may be associated with different groups of the antenna elements. For example, a first plurality of antenna elements carried by the carrier is configured to transmit and/or receive signals at a first value of a parameter. A second plurality of antenna elements carried by the carrier are configured to transmit and/or receive signals at a second value of the parameter different from the first value of the parameter, and the individual antenna elements of the first plurality of antenna elements are interspersed with individual antenna elements of the second plurality of antenna elements.

As a non-limiting example, a first group of antenna elements may receive data at frequency f1, while a second group of antenna elements may receive data at frequency f2.

The placement on the same carrier of the antenna elements operating at one value of the parameter (e.g., first frequency or wavelength) together with the antenna elements operating at another value of the parameter (e.g., second frequency or wavelength) is referred to herein as "interspersing". In some embodiments, the groups of antenna elements operating at different values of parameter or parameters may be placed over separate areas of the carrier in a phased array antenna. In some embodiments, at least some of the antenna elements of the groups of antenna elements operating at different values of at least one parameter are adjacent or neighboring one another. In other embodiments, most or all of the antenna elements of the groups of antenna elements operating at different values of at least one parameter are adjacent or neighboring one another.

In the illustrated embodiment of FIG. 3A, antenna elements **322*a* and 322*b* are interspersed antenna elements with first antenna element 322*a* communicating at a first value of a parameter and second antenna element 322*a*** communicating at a second value of a parameter.

Although shown in FIG. 3A as two groups of interspersed antenna elements **322*a* and 322*b* in communication with a single beamformer 342*a*, the phased array antenna system 300** may be also configured such that one group of interspersed antenna elements communicate with one beamformer and another group of interspersed antenna elements communicate with another beamformer.

In the illustrated embodiment of FIG. 3B, the lay-up 380 includes four mapping layers **380*b*1, 380*b*2, 380*b*3, and 380*b*4, compared to the use of two mapping layers 280*b*1 and 280*b*2 in FIG. 2B. Mapping layers 380*b*1 and 380*b*2 are connected by intermediate via 338*a*. Mapping layers 380*b*3 and 380*b*4 are connected by intermediate via 338*b*. Like the embodiment of FIG. 2B, the lay-up 380 of the embodiment of FIG. 3B can allow for selective placement of the intermediate vias 338*a* and 338*b*, for example, to be spaced from other components on the top or bottom surfaces of the lay-up 380**.

The mapping layers and vias can be arranged in many other configurations and on other sub-layers of the lay-up 180 than the configurations shown in FIGS. 2B and 3B. The use of two or more mapping layers can be advantageous in reducing the lengths of the electrically conductive mapping traces by allowing mapping traces in horizontal planes to cross an imaginary line extending through the lay-up normal to the mapping layers and in selecting the placement of the intermediate vias between the mapping traces. Likewise, the mapping layers can be configured to correlate to a group of antenna elements in an interspersed configuration. By maintaining consistent via lengths for each grouping by using the same mapping layers for each grouping, trace length is the only variable in length matching for each antenna to beamformer mapping for each grouping.

Two-Layer Multiplex Feed Networks

Figure 4A:
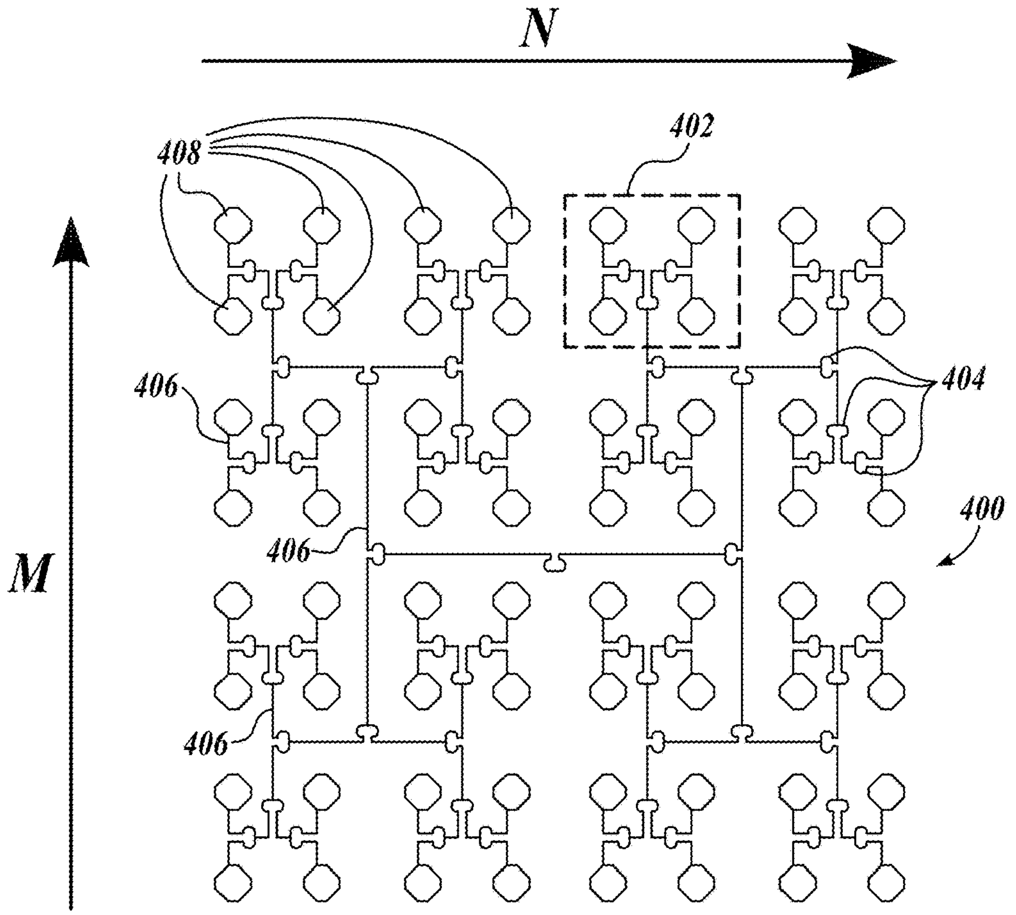
FIG. 4A depicts an example of a signal feed network according to some embodiments of the present disclosure.
Figure 4B:
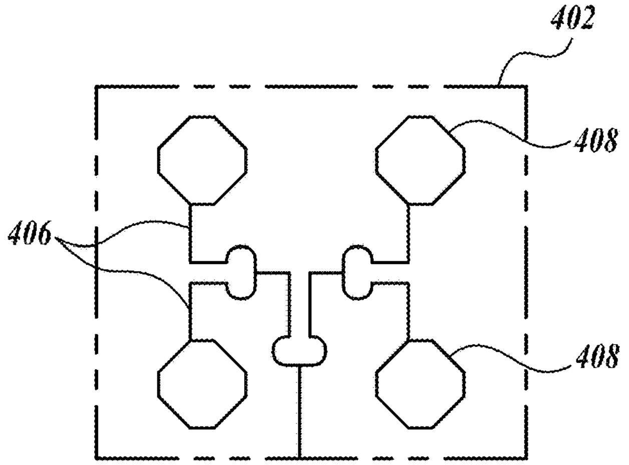
FIG. 4B depicts additional details of a portion of the signal feed network of FIG. 4A according to some embodiments of the present disclosure.

FIG. 4A depicts an example of a signal feed network 400 according to some embodiments of the present disclosure. FIG. 4B depicts additional details of a portion 402 of the signal feed network 400 according to some embodiments of the present disclosure. In the example network of FIG. 4A, signal feed network 400 may comprise a single H-network having a plurality of pads 408 and a plurality of signal combiners or splitters 404 interconnected to each other via a respective plurality of traces 406. Network 400 may include a plurality of H-network portions 402, in which a number of portions 402 in a first direction (N) may be the same or different from a number of portions 402 in a second direction perpendicular to the first direction (M).

Figure 5:
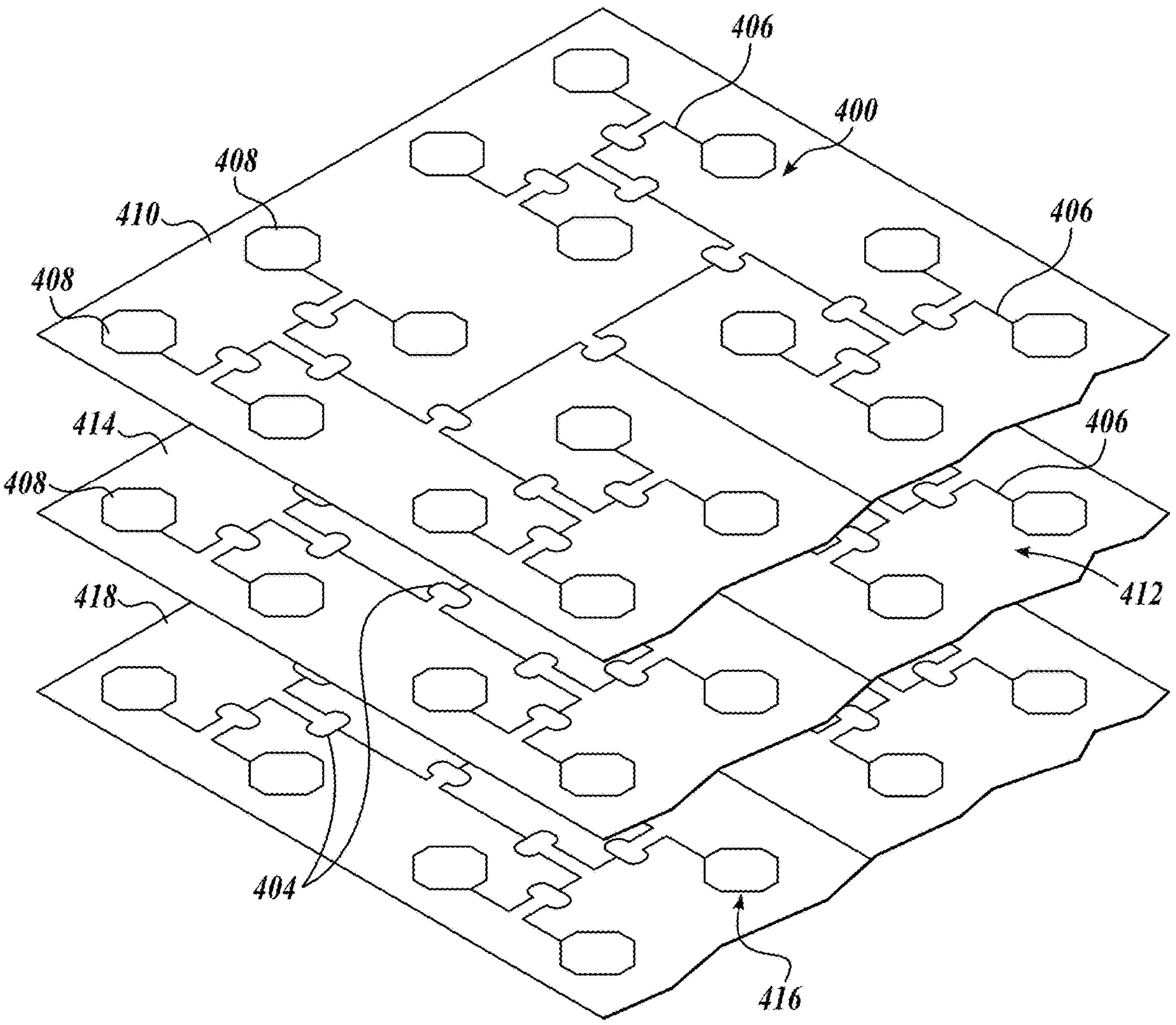
FIG. 5 depicts each signal feed network of a plurality of signal feeder networks provided on a separate base, in accordance with conventional technology.

If a plurality of signal feed networks is to be implemented, each signal feed network of the plurality of signal feed networks may be provided on a separate base or layer, as depicted in FIG. 5. The configuration of FIG. 5 may comprise a conventional scheme for implementing a plurality of signal feed networks.

For example, network 400 of FIG. 4B (e.g., one H-network) may be provided on a base/layer 410, a H-network 412 may be provided on a base/layer 414, and a H-network 416 may be provided on a base/layer 418. Base/layer 414 may be disposed between bases/layers 410 and 418 in a direction perpendicular to the major plane of base/layer 414. Bases/layers 410, 414, 418 may comprise printed circuit boards (PCBs). The number of H-network portions (e.g., portion 402) associated with each of networks 400, 412, 416 may be the same as each other.

Since each signal feeder network requires a distinct base or layer, as the number of such networks increases, so does the number of layers required for networks to be formed. For instance, if 16 signal feeder networks may be required for an antenna system, then 16 layers of signal feeder network PCBs may be included in the antenna system. Inclusion of greater number of PCB layers introduces signal degradation or loss potential, higher costs, higher manufacturing time, assembly complexity, increased weight, increased size, misalignment potential, and/or the like.

Instead of configuring a single signal feeder network per layer, a plurality of signal feeder networks may be provided on two layers, which results in reduction in the total number of layers required for networks. Signal feeder networks may also be referred to as multiplex feed networks or the like.

In some embodiments, multiplex feed network layer 180*c* in FIG. 1G may comprise a plurality of multiplex feed networks arranged on more than one layer. For example, multiplex feed network layer 180*c* may include four, five, eight, or more multiplex feed networks. Each multiplex feed network of the plurality of multiplex feed networks may comprise, without limitation, electrically conductive traces arranged or configured as a hierarchical network, a fractal network, a self-similar fractal network, a tree network, a star network, a hybrid network, a rectilinear network, a curvilinear network, a H-network (also referred to as a H-tree network), a rectilinear H-network, a curvilinear H-network, or other networks in which each signal inputted to a network traverses through the same length of traces to avoid spurious signal delays caused by different trace lengths.

In some embodiments, for three or more multiplex feed networks included in the multiplex feed network layer 180*c*, the number of layers used to provide the electrical conductive traces (also referred to as traces) of all the multiplex feed networks may be equal to the number of different or unique orientations or directions of the traces of the plurality of multiplex feed networks. All of the multiplex feed networks included in the multiplex feed network layer 180*c* may be decomposed or deconstructed in accordance with different/unique orientations or directions of the traces in respective layers.

As an example, if the multiplex feed network layer 180*c* comprises a plurality of H-networks, all of the traces of the H-networks may be formed on two layers. Hence, if the multiplex feed network layer 180*c* comprises four H-networks, for example, all of the traces associated with the four H-networks may be formed using two layers instead of four layers as in the conventional scheme (one layer for each of the four H-networks). Similarly, if the multiplex feed network layer 180*c* comprises eight H-networks, for example, all of the traces associated with the eight H-networks may be formed using two layers instead of eight layers as in the conventional scheme (one layer for each of the eight H-networks).

Figure 6A:
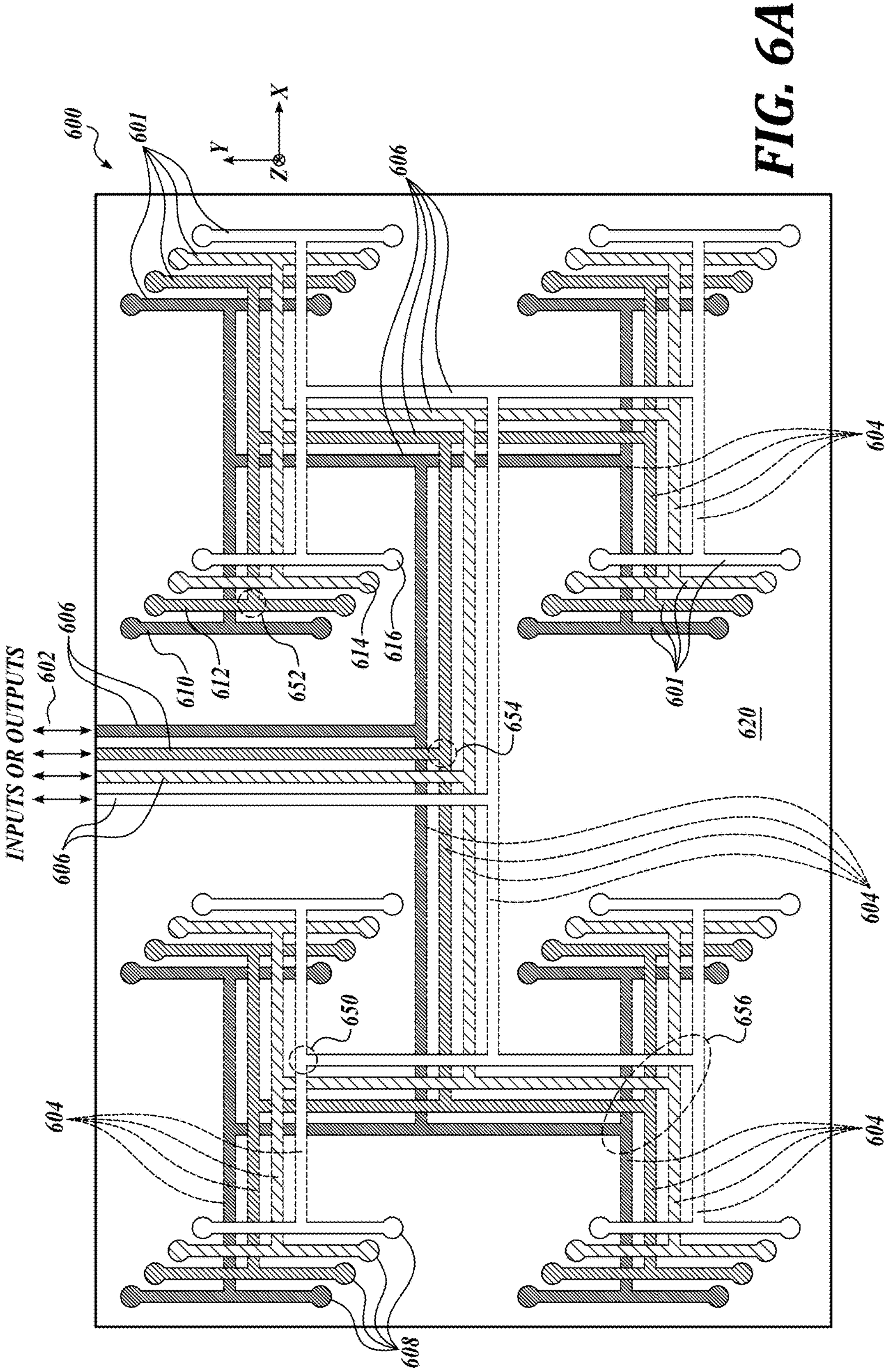
FIG. 6A depicts a top view of an example of the multiplex feed network layer, according to some embodiments of the present disclosure.

FIG. 6A depicts a top view of an example of the multiplex feed network layer 180*c*, according to some embodiments of the present disclosure. A multiplex feed network stack 600 may comprise the multiplex feed network layer 180*c* composed of four H-networks 610, 612, 614, and 616. H-networks 610, 612, 614, 616 may be electrically isolated from each other. In some embodiments, radio frequency (RF) signals 602 may comprise the input signals to the multiplex feed network stack 600. RF signals 602 may be provided by a modulator (e.g., modulator 170) when the multiplex feed network stack 600 is included in a transmitter panel of a phase array antenna system. Stack 600 may be configured to provide or feed the received RF signals 602 to other layers or components (e.g., beamformer layer 180*d* or beamformer lattice 140, 240, or 340) included in the phase array antenna system. RF signals 602 may be the same or different frequencies from each other. If the multiplex feed network stack 600 is configured in a receiver panel of the phase array antenna system, RF signals 602 may comprise output signals received from a beamformer lattice or layer to be inputted to a demodulator (e.g., demodulator 170). Each RF signal of the RF signals 602 may be associated with a different beam or channel.

All of the traces associated with H-networks 610, 612, 614, and 616 may comprise traces arranged in a horizontal direction/orientation (e.g., traces 604 in an x-direction of the Cartesian coordinate system) and traces arranged in a vertical direction/orientation (e.g., traces 606 in a y-direction of the Cartesian coordinate system). Because H-networks 610, 612, 614, 616 may comprise a rectilinear configuration, the shape of traces 604, 606 may be linear or straight lines and the direction/orientation of traces 604 and 606 may be perpendicular to each other in the x-y plane.

Traces extending from the last/end nodes of the H-networks 610, 612, 614, and 616 may be referred to as termination trace segments 601. The ends of the termination trace segments 601 opposite to the last/end nodes may comprise termination ends 608 of the termination trace segments 601. In some embodiments, termination ends 608 may include a pad, end cap, or other structure to facilitate electrical and/or physical coupling with vias that extend between layers (e.g., vias that extend in the z-direction).

Alternatively, H-networks 610, 612, 614, 616 may be configured as a curvilinear network, in which the shape of traces 604 and 606 may be curved or non-linear and the direction/orientation of traces 604, 606 may be perpendicular to each other in the x-y plane.

Figure 6B:
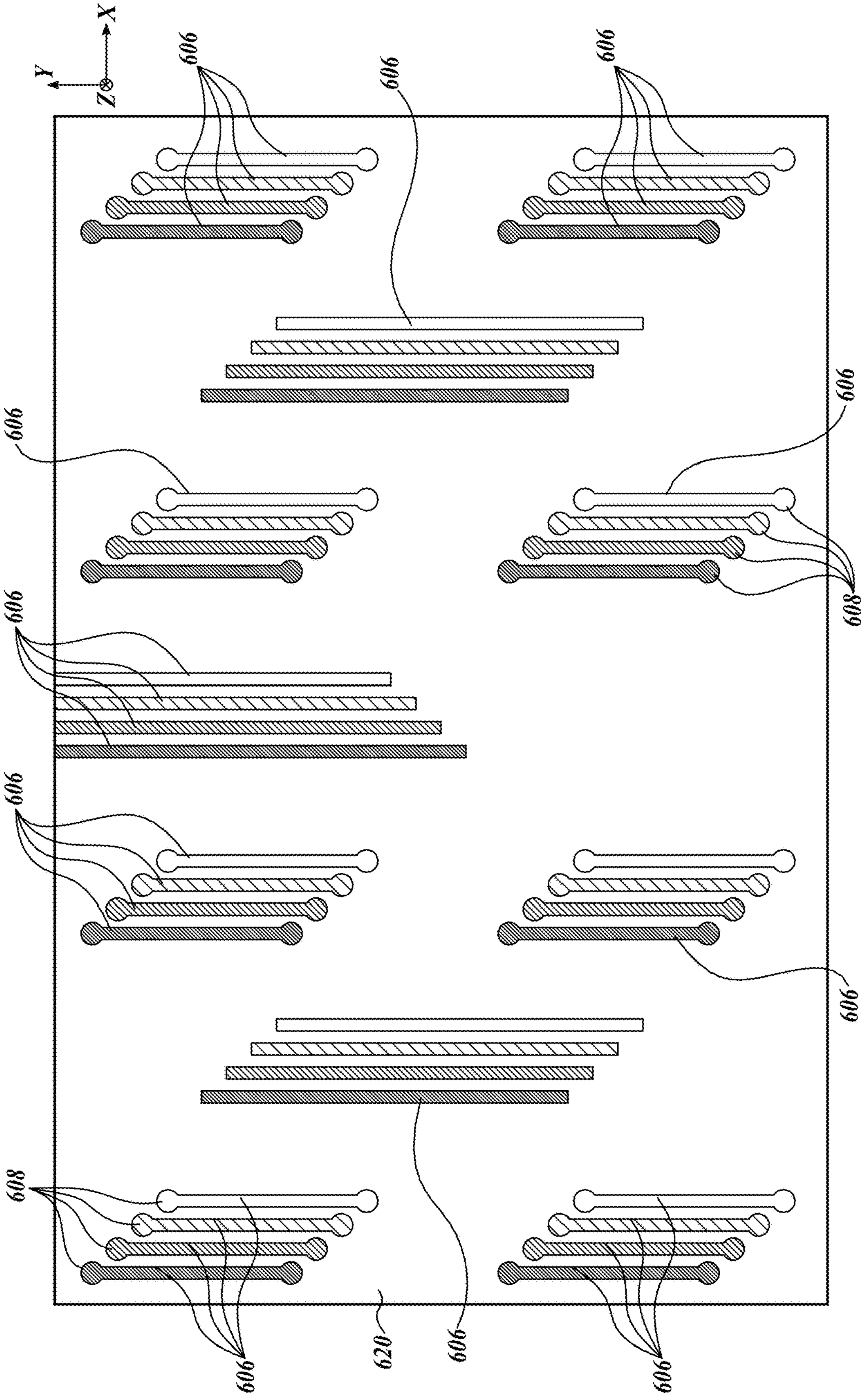
FIGS. 6B-6C depict top views of different layers of the multiplex feed network layer of FIG. 6A, according to some embodiments of the present disclosure.
Figure 6C:
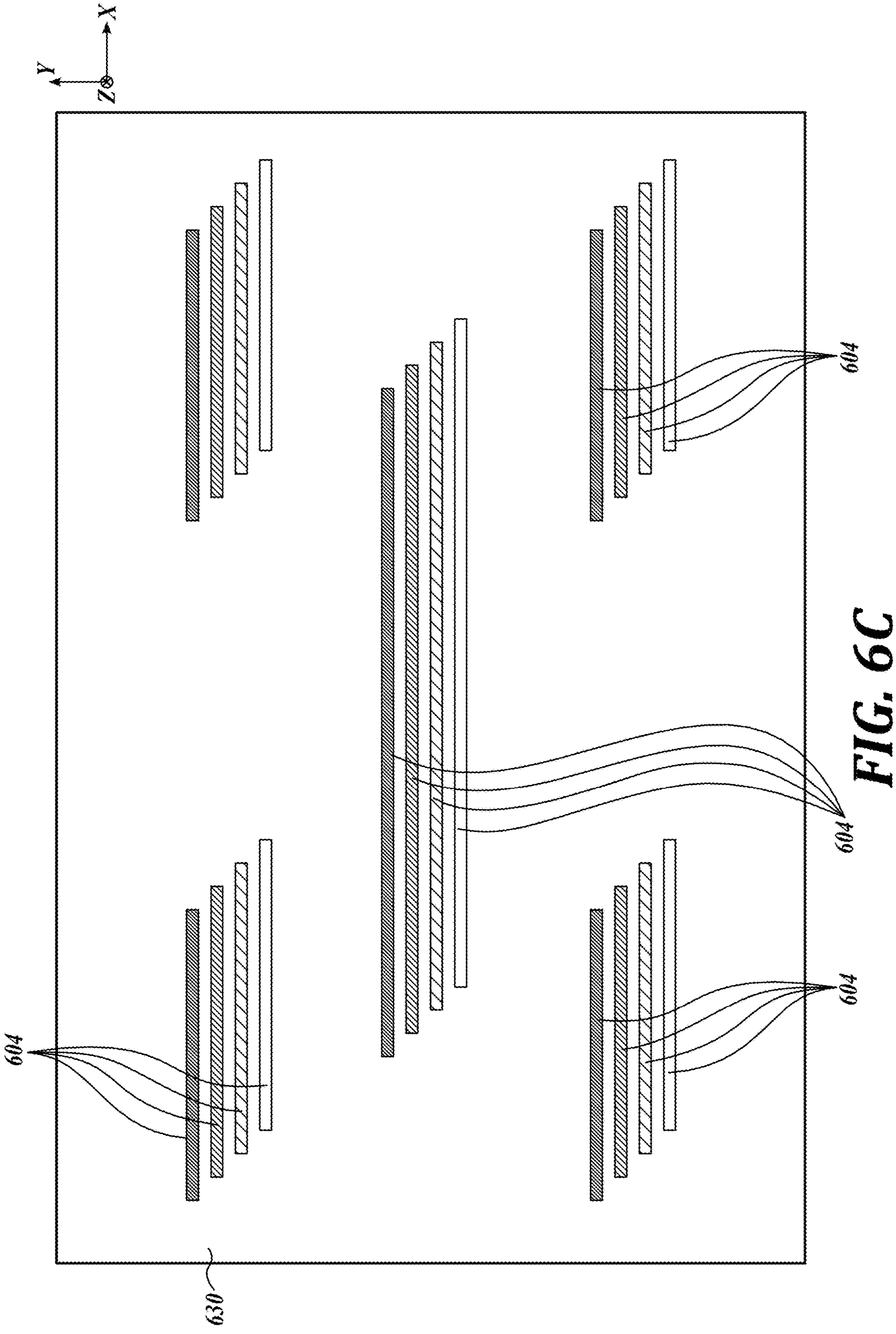

In some embodiments, traces 606 (the vertical traces) of H-networks 610, 612, 614, 616 may be provided on a layer 620, as shown in FIG. 6B, while traces 604 (the horizontal traces) of H-networks 610, 612, 614, 616 may be provided on a layer 630, as shown in FIG. 6C. Layer 620 may be disposed above or over layer 630 along a z-direction of the Cartesian coordinate system, and configured to align traces 604 and 606 associated with respective H-networks 610, 612, 614, and 616 to each other. Each of layers 620, 630 may include a PCB, substrate, base, baseboard, carrier, or other structures in addition to respective traces 606, 604 to facilitate fabrication, electrical isolation, structural support or integrity, and/or grounding of respective traces 606, 604 on separate layers. Thus, traces associated with H-networks 610, 612, 614, 616 may be fabricated using fewer than four layers. Traces having a vertical orientation/direction may be fabricated on a different plane from traces having a horizontal orientation/direction.

Although multiplex feed network stack 600 is shown having layer 620 disposed above layer 630, layer 620 may be disposed below layer 630 in alternative embodiments.

Note that references to “vertical” and “horizontal” herein are used merely to aid in describing the present disclosure.

If multiplex feed network stack 600 is rotated by 90 degrees in the x-y plane, for example, then the designation of "vertical" and "horizontal" would be reversed.

In some embodiments, the number of nodes (or number of termination ends) of H-networks 610, 612, 614, and/or 616 may be the same or different from one or both of number of antenna elements 122*i* included in antenna layer 180*a* and the number of beamformers 142*i* included in beamformer layer 180*d*. The number of nodes of each of H-networks 610, 612, 614, 616 may be $2^N$, and thus, scale as a power of 2, e.g., 16, 32, 64, 128, 256, etc., in which N is the number of stages/levels of a H-network. In cases where the number of termination ends exceeds the number of connections between H-networks 610, 612, 614, and/or 616 to other structures/components of the phase array antenna system, the unused termination ends may be terminated (e.g., terminated to ground) to avoid unwanted signal reflections.

Figure 7A:
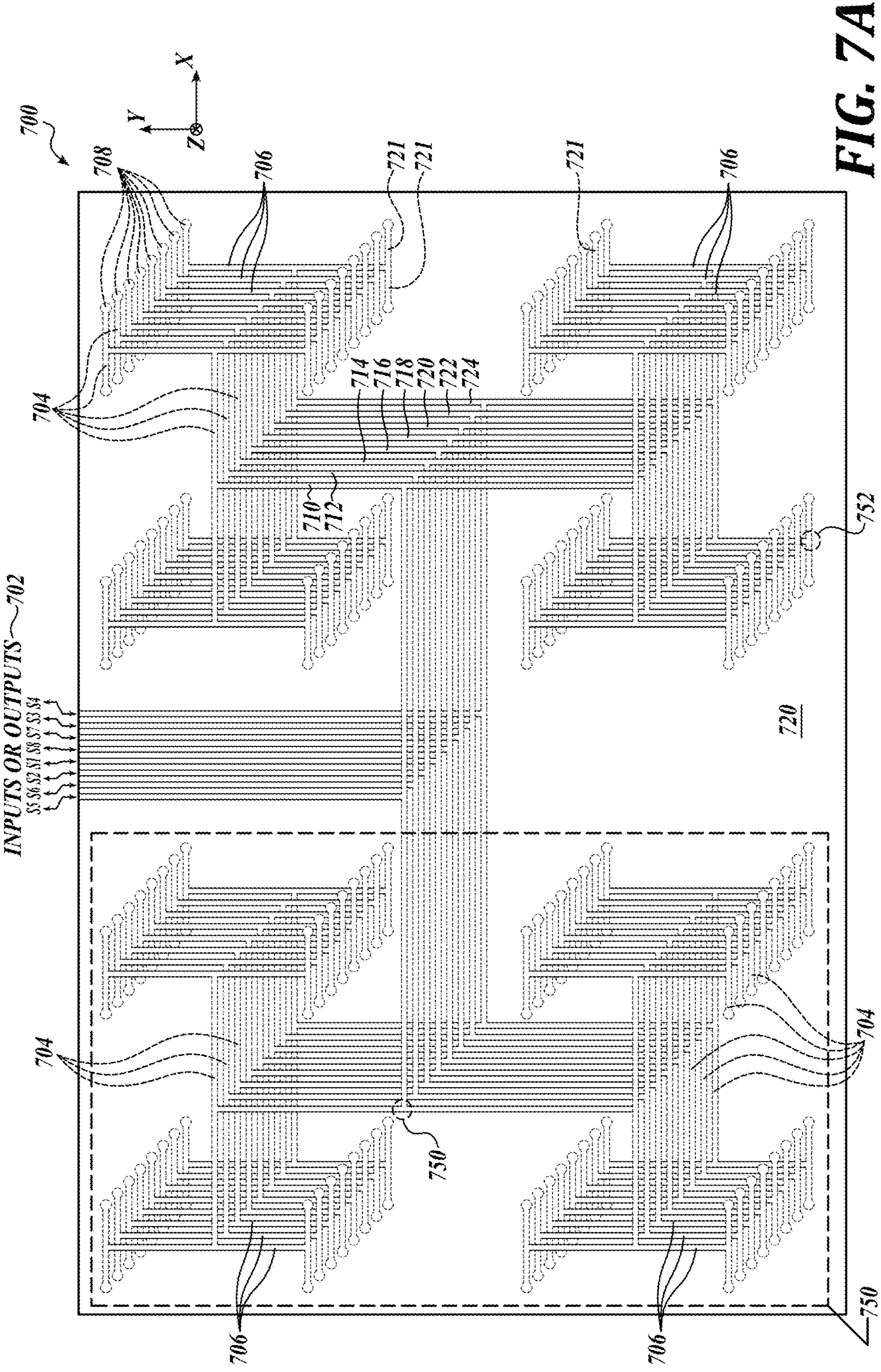
FIG. 7A depicts a top view of another example of the multiplex feed network layer according to some embodiments of the present disclosure.

FIG. 7A depicts a top view of another example of the multiplex feed network layer 180*c*, according to some embodiments of the present disclosure. A multiplex feed network stack 700 may comprise the multiplex feed network layer 180*c* composed of eight H-networks 710, 712, 714, 716, 718, 720, 722, and 724 formed using two layers. H-networks 710, 712, 714, 716, 718, 720, 722, and 724 may be electrically isolated from each other. Multiplex feed network stack 700 may be similar to multiplex feed network stack 600 except a greater number of H-networks may be included than in stack 600.

In some embodiments, radio frequency (RF) signals 702 may comprise the input/output signals to the multiplex feed network stack 700. RF signals 702 may be the same or different frequencies from each other. All of the traces associated with rectilinear H-networks 710, 712, 714, 716, 718, 720, 722, and 724 may comprise traces arranged in a horizontal direction/orientation (e.g., traces 704 in an x-direction of the Cartesian coordinate system) and traces arranged in a vertical direction/orientation (e.g., traces 706 in a y-direction of the Cartesian coordinate system). Each of the traces 704 that comprise a termination or end segment (e.g., termination trace segments 721) of H-networks 710, 712, 714, 716, 718, 720, 722, and 724 may include a termination end 708.

Similar to the discussion above for H-networks 610, 612, 614, 616, H-networks 710, 712, 714, 716, 718, 720, 722, and 724 may alternatively be configured as a curvilinear network, and traces 704, 706 may comprise curved or non-linear shaped traces which may be perpendicular to each other in the x-y plane.

Figure 7B:
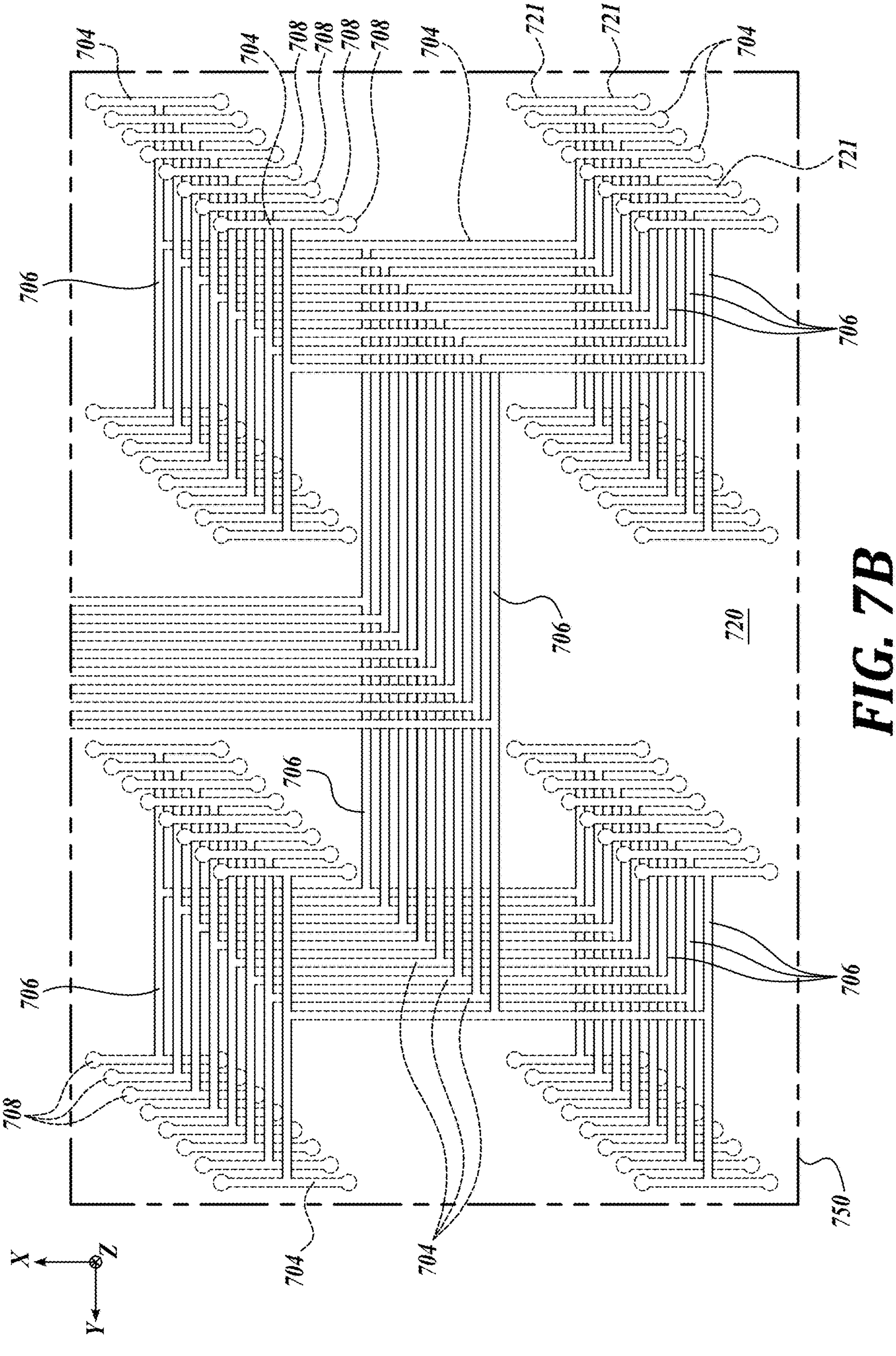
FIG. 7B depicts a top view of a portion of the multiplex feed network layer of FIG. 7A according to some embodiments of the present disclosure.
Figure 7C:
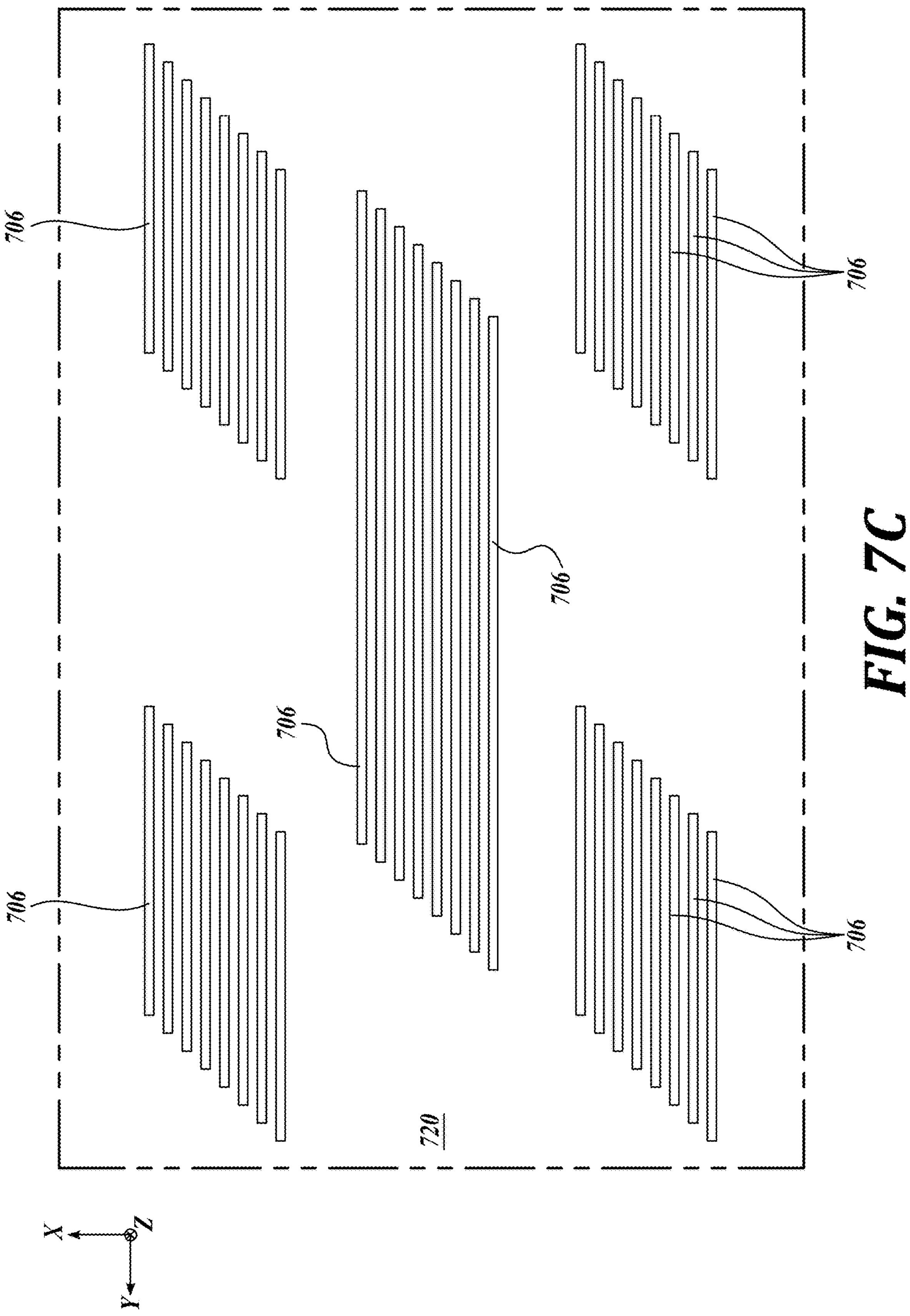
FIGS. 7C-7D depict top views of different layers of the portion of the multiplex feed network layer of FIG. 7B, according to some embodiments of the present disclosure.
Figure 7D:
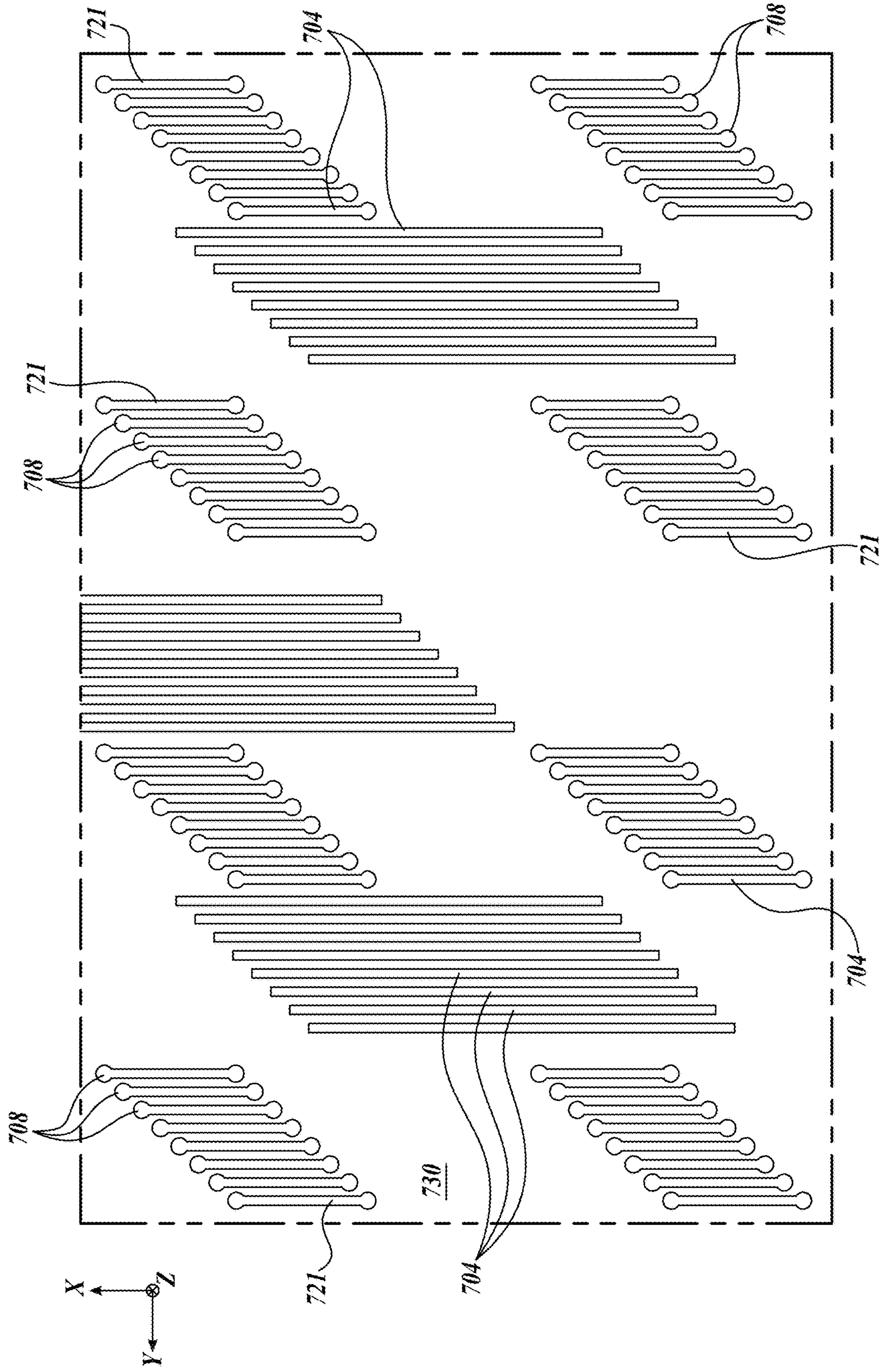

FIG. 7B depicts a top view of a portion 750 of the H-networks 710, 712, 714, 716, 718, 720, 722, 724 shown in FIG. 7A. In some embodiments, traces 706 of H-networks 710, 712, 714, 716, 718, 720, 722, 724 may be provided on a layer 720, as shown in FIG. 7C, while traces 704 of H-networks 710, 712, 714, 716, 718, 720, 722, 724 may be provided on a layer 730, as shown in FIG. 7D. Layer 720 may be disposed above or over layer 730 along a z-direction of the Cartesian coordinate system, and configured to align traces 704 and 706 associated with respective H-networks 710, 712, 714, 716, 718, 720, 722, 724 to each other. Each of layers 720, 730 may include a PCB, substrate, base, baseboard, carrier, or other structures in addition to respective traces 706, 704 to facilitate fabrication, electrical isolation, structural support or integrity, and/or grounding of respective traces 706, 704 on separate layers. Thus, traces associated with H-networks 710, 712, 714, 716, 718, 720, 722, 724 may be fabricated using fewer than eight layers.

In FIG. 7A, each of the H-networks 710, 712, 714, 716, 718, 720, 722, 724 comprises a five stage/level H-network. Since the number of terminating ends of an H-network is $2^N$, for N=5 stages/levels, there are $2^5=32$ terminating ends (e.g., termination ends 708) for each of the eight H-networks. And a combined total of 32*8=256 terminating ends for the eight H-networks. Accordingly, termination or end trace segments 721 may extend from the last nodes (e.g., $5^{th}$ nodes) of each of the H-networks, and terminate or end at termination ends 708. In some embodiments, each of the termination ends 708 may include an end cap, pad, or other structure to facilitate electrical and/or physical coupling with a via that extends between particular inputs of beamformers 142*i* in the beamformer layer 180*d*.

Although five stages/levels are shown, H-networks 710, 712, 714, 716, 718, 720, 722, 724 may comprise fewer or more than five stages/levels. H-networks 710, 712, 714, 716, 718, 720, 722, 724 may comprise fewer or more than eight networks.

Each of H-networks 710, 712, 714, 716, 718, 720, 722, 724 may include an input or output 702. Input/output 702 may comprise an input when the H-networks are configured in a receiver panel and an output when the H-networks are configured in a transmitter panel. Each input/output 702 may be associated with a signal having particular parameters. For instance, without limitation, the respective signals may differ from each other in frequency. Each input/output 702 or corresponding signal may be associated with a different beam or channel. Hence, a phased antenna array system including eight H-networks may be capable of up to eight channel operation. Signals S5, S6, S2, S1, S8, S7, S3, S4 may be associated with respective inputs/outputs 702 from left to right in FIG. 7A.

Returning to FIG. 7B, termination ends 708 may comprise the outputs/inputs of the H-networks 710, 712, 714, 716, 718, 720, 722, 724. For example, if input/output 702 associated with signal S1 is configured as the input for the particular H-network associated with signal S1, then termination ends 708 included in such H-network may be considered to be outputs of such H-network. Conversely, if input/output 702 associated with signal S1 is configured as the output for the particular H-network associated with signal S1, termination ends 708 included in such H-network may be considered to be inputs of such H-network.

Although multiplex feed network stack 700 is shown having layer 720 disposed above layer 730, layer 720 may be disposed below layer 730 in alternative embodiments.

In embodiments in which the multiplex feed network may include traces in more than two different orientations/directions, the number of different layers or planes in which the traces may be fabricated may be in accordance with the number of different orientations/directions of the traces. For instance, if the multiplex feed network comprises traces in three different orientations/directions, then three layers may be implemented to provide the traces. The traces of the multiplex feed network also need not be linear. Non-linear or curved traces may also be decomposed from the rest of the traces of the multiplex feed network in different layers from each other.

Figure 8:
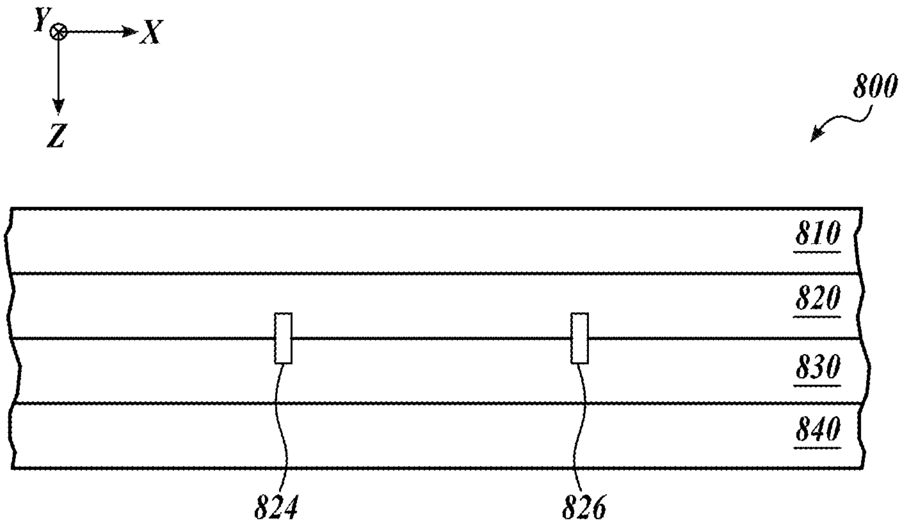
FIG. 8 depicts a cross-sectional view of an example multiplex feed network stack according to some embodiments of the present disclosure.

FIG. 8 depicts a cross-sectional view of an example multiplex feed network stack 800, according to some embodiments of the present disclosure. Multiplex feed network stack 800 may comprise multiplex feed network stack 600 or 700. Multiplex feed network stack 800 may comprise layers 810, 820, 830, and 840, in which layer 830 may be disposed between layers 820 and 840, and layer 820 may be disposed between layers 810 and 830. Layer 810 may comprise a top layer of the stack 800 and layer 840 may comprise a bottom layer of the stack 800.

In some embodiments, layer 820 may be similar to layer 620 or 720, and layer 830 may be similar to layer 630 or 730. In addition to the two trace layers 820, 830, a plurality of vias, such as vias 824 and 826, may be located in and/or extend between layers 820 and 830. Vias 824 and 826 may comprise electrically conductive vias configured to electrically interconnect traces located in layers 820 to traces located in layer 830. As described in more detail below, at least one via of the plurality of vias may be associated with each combination of a vertical trace and a horizontal trace of H-networks included in the stack 800 where an intersection may occur if the vertical and horizontal traces were located on the same plane. In other words, each perpendicular path (e.g., along the z-axis) from a vertical trace of layer 820 to a horizontal trace of layer 830 may identify an electrical interconnection or coupling location to be provided by one or more vias. Examples of such "intersection" areas are depicted as intersection areas 650, 652, 654 in FIG. 6A and intersection areas 750, 752 in FIG. 7A.

Each of layers 810 and 840 may include a ground layer or plane, an electrical isolation layer, an adhesive layer, and/or the like. In some embodiments, layers 810 and/or 840 may include structures such as electrical isolation vias or Faraday cage structures. Layer 810 may be optional, for example, if no layer may be disposed above stack 800. Likewise, layer 840 may be optional, for example, if no layer may be disposed below stack 800.

Layers 810, 820, 830, and/or 840 may include a PCB, substrate, base, baseboard, carrier, or other material in addition to the structures/components discussed above to facilitate fabrication, electrical isolation, structural support or integrity, and/or grounding of respective structures/components includes in respective layers.

Although not shown, in some embodiments, stack 800 may include one or more additional layers. For instance, a pad layer comprising a plurality of conductive pads distributed to align with termination area or end caps 608 and/or 708. As another example, one or more layers including routing and/or interconnect structures to electrically couple with layer(s) including beam forming components, phase shifting components, or the like.

Multi-Layer Power Splitter/Combiner

Figure 9:
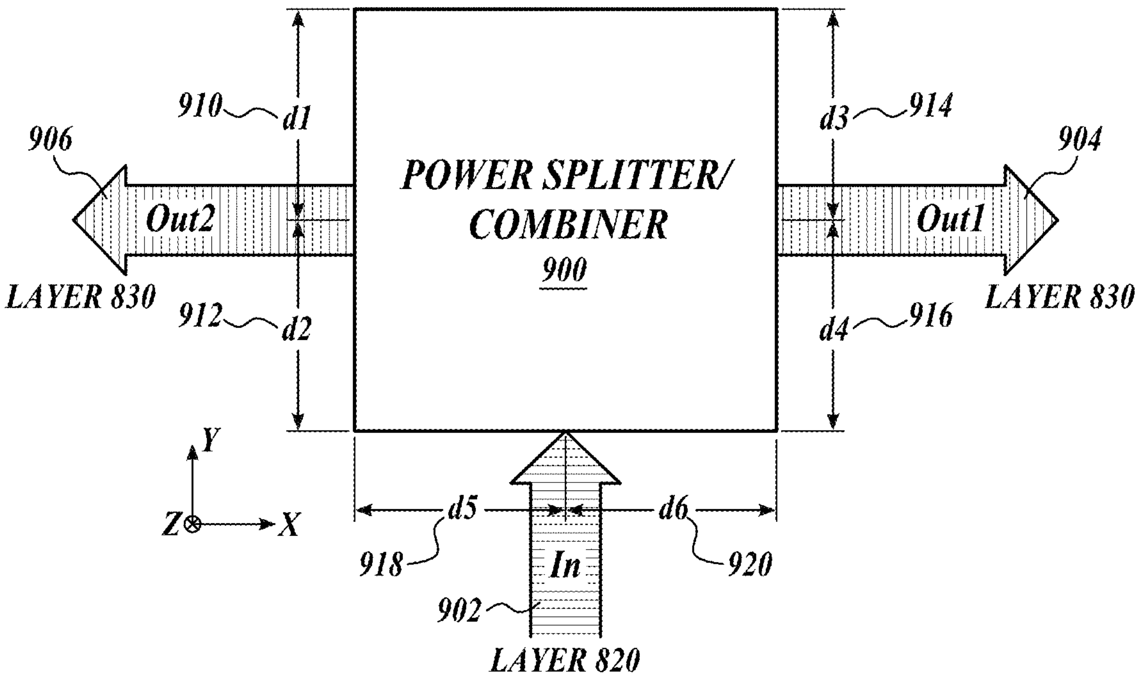
FIG. 9 depicts a block diagram of an example power divider included in the stack of FIG. 8 according to some embodiments of the present disclosure.

FIG. 9 depicts a block diagram of an example power splitter/combiner 900 included in the stack 800, according to some embodiment of the present disclosure. Each "intersection" or junction between a trace of layer 820 and a trace of layer 830 (e.g., at intersection area 650, 652, 654, 750, or 752) may be associated with a power splitter/combiner 900 configured to handle the routing of the RF signal at that location between the different layers 820 and 830. Accordingly, a plurality of power splitters/combiners may be included in the stack 800, each power splitter/combiner of the plurality of power splitters/combiners associated with a respective "intersection" of vertical and horizontal traces of the multiplex feed networks.

In some embodiments, power splitter/combiner 900 may be configured to divide or split an incoming/input RF signal provided in a first layer into two output RF signals outputted at a second layer different from the first layer, in which each of the two output RF signals has half the power of the power associated with the incoming RF signal, each of the two output RF signals has the same frequency as the input RF signal, impedance match is maintained among all of the three lines or ports of the power splitter/combiner 900 (the input line/port in which the incoming RF signal is received and the two output lines/ports in which the two output RF signals are outputted), and electrical isolation is maintained among the lines or ports.

As shown in FIG. 9, a trace 902 included in layer 820 of stack 800 may provide the input RF signal to the power splitter/combiner 900. Trace 902 may be electrically coupled to an input line/port/trace of the power splitter/combiner 900. Trace 902 may comprise, for example, a single trace 606 or 706. Traces 904, 906 included in layer 830 of stack 800 may receive respective first and second output RF signals generated by the power splitter/combiner 900. Traces 904, 906 may be electrically coupled to respective first and second output lines/ports/traces of the power splitter/combiner 900. Traces 904 and 906 together may comprise, for example, a single trace 604 or 704 with an isolation resistor included (as described in detail below in connection with FIG. 10) to ensure isolation of the first and second output RF signals from each other. Power splitter/combiner 900 may be located in layers 820 and 830, as described in detail below.

In some embodiments, the overall dimensions of the power splitter/combiner 900 may be symmetrical and the power splitter/combiner 900 may be centered in the x-y plane with respect to traces 902, 904, and 906. Dimensions 910 (d1), 912 (d2), 914 (d3), 916 (d4), 918 (d5), and 920 (d6) of the power splitter/combiner 900 may be equal to each other. Alternatively, one or more of dimensions 910-920 may be different from each other. In this configuration, power splitter/combiner 900 may be slightly larger since the output lines may include a (further) curvature. In some embodiments, the overall dimensions or size of the power splitter/combiner 900 may determine the distance between adjacent traces of the multiplex feed network, and thus the density of the multiplex feed networks. The smaller the size of the power splitter/combiner 900, the greater the multiplex feed network density may be possible.

Power splitter/combiner 900 may also be referred to as a power splitter, signal divider, signal splitter, power or signal combiner, power divider/combiner, a signal splitter/combiner, a signal divider/combiner, multiple-input and multiple-output (MIMO) power splitter/combiner/splitter/combiner, Wilkinson splitter/divider or combiner, or the like. Power splitter/combiner 900 may comprise a reciprocal component in which signal propagation may also occur in reverse from that described above such that the power splitter/combiner 900 may function as a power or signal combiner. Two input RF signals may be received by the power splitter/combiner 900 (from traces 904, 906) and the power splitter/combiner 900 may generate a single output RF signal outputted to trace 902 having the combined power of the powers associated with the two input RF signals, while impedance match and electrical isolation are maintained among all the lines/ports/traces of the power splitter/combiner 900.

Figure 10:
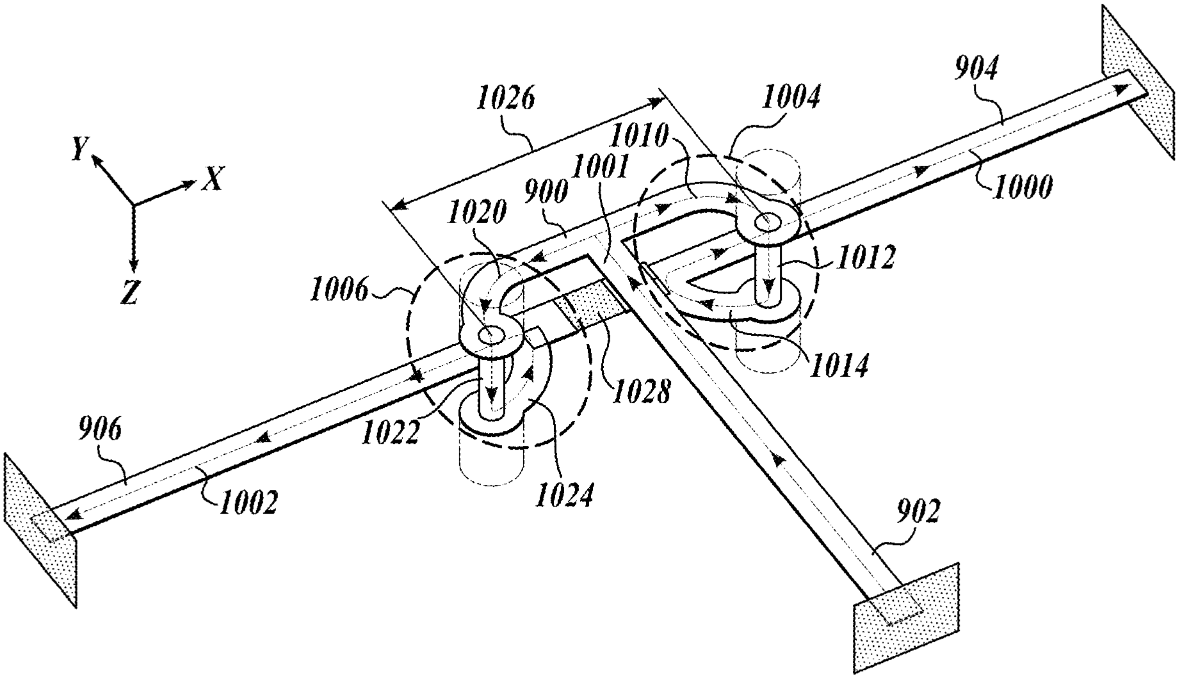
FIG. 10 depicts an isometric view of the power divider and associated traces, according to some embodiments of the present disclosure.

FIG. 10 depicts an isometric view of the power splitter/combiner 900 and associated traces, according to some embodiments of the present disclosure. In FIG. 10, one or more materials, structures, and/or layers surrounding power splitter/combiner 900 are not shown to ease illustration of the power splitter/combiner 900 structure. In some embodiments, power splitter/combiner 900 may comprise an input line 1001 (also referred to as an input trace or port), a first output line 1004 (also referred to as a first output trace, port, or branch), and a second output line 1006 (also referred to as a second output trace, port, or branch). Input line 1001 may be located in layer 820, and each of first and second output lines 1004, 1006 may be located in layers 820 and 830. Input line 1001 may be electrically coupled to trace 902. First and second output lines 1004, 1006 may be electrically coupled to and extend from each side of the input line 1001, and also electrically couple to traces 904, 906, respectively.

In the illustrated embodiment, first and second output lines 1004, 1006 comprise identical or symmetrical structures which are mirrored on opposing sides of the input line 1001. In some embodiments, first output line 1004 may include a top portion 1010, a mid portion 1012, and a bottom portion 1014. Top portion 1010 may be located in layer 820. Top portion 1010 may comprise a trace having an arc or curved shape that perpendicularly extends from the end of the input line 1001 and curves back toward the input line 1001. Mid portion 1012 may be located in layers 820 and 830. Mid portion 1012 may comprise a via, such as via 824 or 826 shown in FIG. 8. Mid portion 1012 may be configured to electrically interconnect with the end of the top portion 1010 that curves back toward the input line 1001 and with an end of the bottom portion 1014. Bottom portion 1014 may be located in layer 830. Bottom portion 1014 may comprise a trace having an arc or curved shape that (perpendicularly) intersects with trace 904. Top and bottom portions 1010, 1014 may be oriented parallel to a major surface of layers 820, 830, respectively, and mid portion 1012 may be oriented, at least in part, perpendicular to a major surface of layer 820. Accordingly, an input RF signal provided by the trace 902 may be converted into a first output RF signal by the first output line 1004 via traversal of a signal pathway 1000.

Second output line 1006 may be similar to first output line 1004 except mirrored around the opposite side of the input line 1001. Second output line 1004 may include a top portion 1020 similar to top portion 1010, a mid portion 1022 similar to mid portion 1012, and a bottom portion 1024 similar to bottom portion 1014. The input RF signal provided by the trace 902 may be converted into a second output RF signal by the second output line 1006 via traversal of a signal pathway 1002.

Input line 1001, top portions 1010, 1020, and/or bottom portions 1014, 1024 may comprise electrical conductive traces which may be fabricated simultaneously as a continuous trace with traces 902, 904, and/or 906 in respective layers 820, 830. For example, trace 902, input line 1001, top portion 1010, and top portion 1020 may be formed simultaneously as a continuous trace in layer 820. Bottom portion 1014, bottom portion 1024, trace 904, and trace 906 may be formed simultaneously as a continuous trace in layer 830. Mid portions 1012, 1022 may be formed by selectively drilling or etching into the material of layers 820 and/or 830 and filling (or at least coating the inner surfaces) with conductive material to form vias that extend between layers 820 and 830.

Accordingly, power splitter/combiner 900 may also be referred to as a symmetric double curve power splitter/combiner or symmetric double curve multiplex power splitter/combiner. In some embodiments, a signal pathway length associated with each of the first and second output lines 1004, 1006 may comprise λ/4, and thus, lines 1004, 1006 may also be referred to as quarter wave lines. The signal pathway length (also referred to as an electrical pathway length, signal length, output length, or the like) associated with the first output line 1004 may extend from one end of the first output line 1004 from the intersection/junction of the input line 1001 and first and second output lines 1004, 1006 in layer 820 to the opposite end of the first output line 1004 that intersects with trace 904 in layer 830. A similar signal pathway length may also be defined for the second output line 1006. In some embodiments, a distance 1026 between mid portions 1012 and 1022 may be approximately 2.5 mm and a width of the input line 1001, trace 902, first input line 1004, second input line 1006, trace 904, or trace 906 may be in the range of 0.4-1.5 mm.

In some embodiments, an isolation resistor 1028 may be included in an area in layer 830 located approximately perpendicular below the intersection of input line 1001 with first and second output lines 1004, 1006, and which coincides with the intersection of traces 904 and 906. As mentioned above, traces 904 and 906 may comprise a single trace 604 or 704. Isolation resistor 1028 may be configured to "cut" the single trace into two traces, at least for purposes of electrically isolating first and second output RF signals from each other. Alternatively, traces 904, 906 may be formed as separate traces and isolation resistor 1028 may be formed between traces 904, 906 within layer 830. As another alternative, isolation resistor 1028 may be optional if traces 904, 906 may be electrically isolated from each other. Isolation resistor 1028 may comprise a resistive material printed in layer 830, having a same width as traces 904, 906, and/or a 100 ohm resistance.

In some embodiments, a resistance associated with each of the input line 1001 and first and second output lines 1004, 1006 may be 50 Ohm.

Power splitter/combiner 900 may, thus, comprise a first electrically conductive trace 902 included in a first layer, second and third electrically conductive traces 904, 906 included in a second layer disposed above or below the first layer, and first and second electrically conductive vias 1022, 1012. Power splitter/combiner 900 may comprise a three port or branch structure, in which first, second, and third ports intersect with each other. A first port comprises a first portion of the first electrically conductive trace 902 (e.g., input line 1001); a second port comprises a second portion of the first electrically conductive trace 902 (e.g., input line 1001), second electrically conductive trace 906 (e.g., second output line 1006), and first electrically conductive via 1022; and a third port comprises a third portion of the first electrically conductive trace 902 (e.g., input line 1001), third electrically conductive trace 904 (e.g., first output line 1004), and second electrically conductive via 1012.

In this manner, the signal length associated with each of the first and second output lines 1004, 1006 may be longer than otherwise possible given the pitch (distance between adjacent traces) and/or frequency associated with power splitter/combiner 900 than if power splitter/combiner 900 is located all in a single layer of stack 800. The signal length of each of the first and second output lines 1004, 1006 may be larger than a pitch associated with traces 902, 904/906. The curvature, shape, or contour of each of the first and second output lines 1004, 1006 extending between and among layers 820 and 830 may be configured in accordance with a particular pitch, frequency, and/or other design parameters. The configuration of the power splitter/combiner 900 spanning more than one layer or plane may facilitate compact design and higher trace density.

Figure 11:
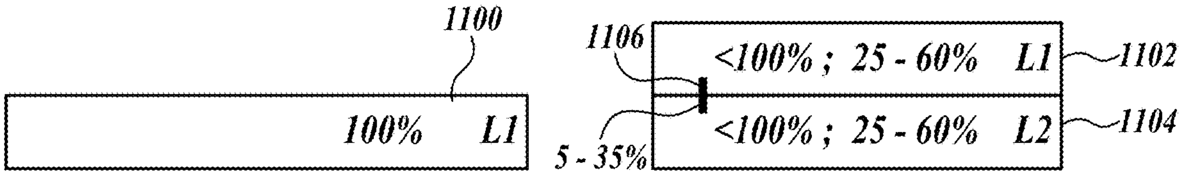
FIG. 11 depicts block diagrams showing trace length distribution among layer(s) of power splitters/combiners according to some embodiments of the present disclosure.

If the second or third output line 1004, 1006 of power splitter/combiner 900 is configured in a single layer or plane, such as layer 1100 (L1) in FIG. 11, then 100% of the length of either of such lines is located in the single layer/plane 1100. In contrast, because each of the second and third output lines 1004, 1006 is provided in at least two layers/planes, the total length of either of such lines may be distributed or spread out among the at least two layers/ planes. The right side of FIG. 11 illustrates a layer 1102 (L1) disposed over a layer 1104 (L2) with a via 1106 disposed at least partially in between layers 1102, 1104. Each of layers 1102, 1104 may carry less than 100% of the total length of either of such lines. In some embodiments, approximately 25-60% of the total length may be located in layer 1102, approximately 25-60% of the total length may be located in layer 1104, and approximately 5-35% of the total length may be located in/by via 1106.

Because less than 100% of the total length of a line/port/branch is implemented in any layer, the corresponding planar area required to locate the line/port/branch in each layer may be smaller than the planar area associated with 100% of the total length implemented in a single layer 1100. Hence, the multi-layer configuration of power splitter/combiner 900 comprises a miniaturization technique. Reduced size power splitters/combiners and/or reduced overall size of an H-network which includes multi-layer power splitters/combiners may be achieved.

Figure 12:
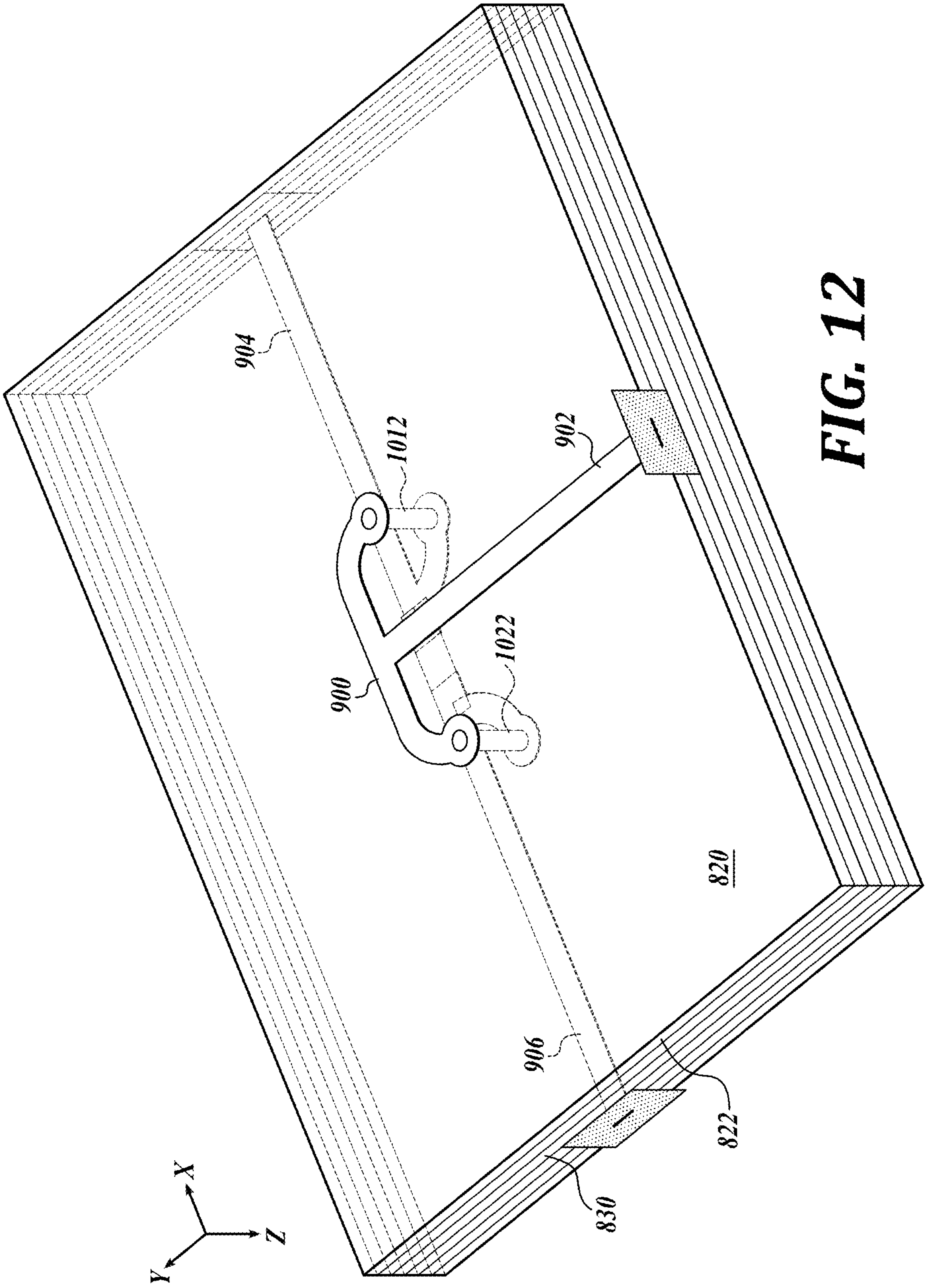
FIG. 12 depicts an isometric view of power divider shown in the context of a plurality of layers according to some embodiments of the present disclosure.

FIG. 12 depicts an isometric view of power splitter/combiner 900 shown in the context of layers 820, 822, and 830, according to some embodiments of the present disclosure. Layer 822 may comprise a dielectric or non-conductive material which may be included to at least provide structure upon which at least portions of the power splitter/combiner 900 included in layer 820 may be formed and/or supported after fabrication. Layer 822 may be disposed between layer 820 and layer 830 of stack 800. In alternative embodiments where portions of the power splitter/combiner 900 included in layer 820 may otherwise be formed and/or be structurally stable without the dielectric or non-conductive material, then such dielectric or non-conductive material may be optional. As still another alternative, dielectric or non-conductive material may be included in layer 820 below the trace 902, input line 1001, and first and second output lines 1004, 1006.

Figure 13A:
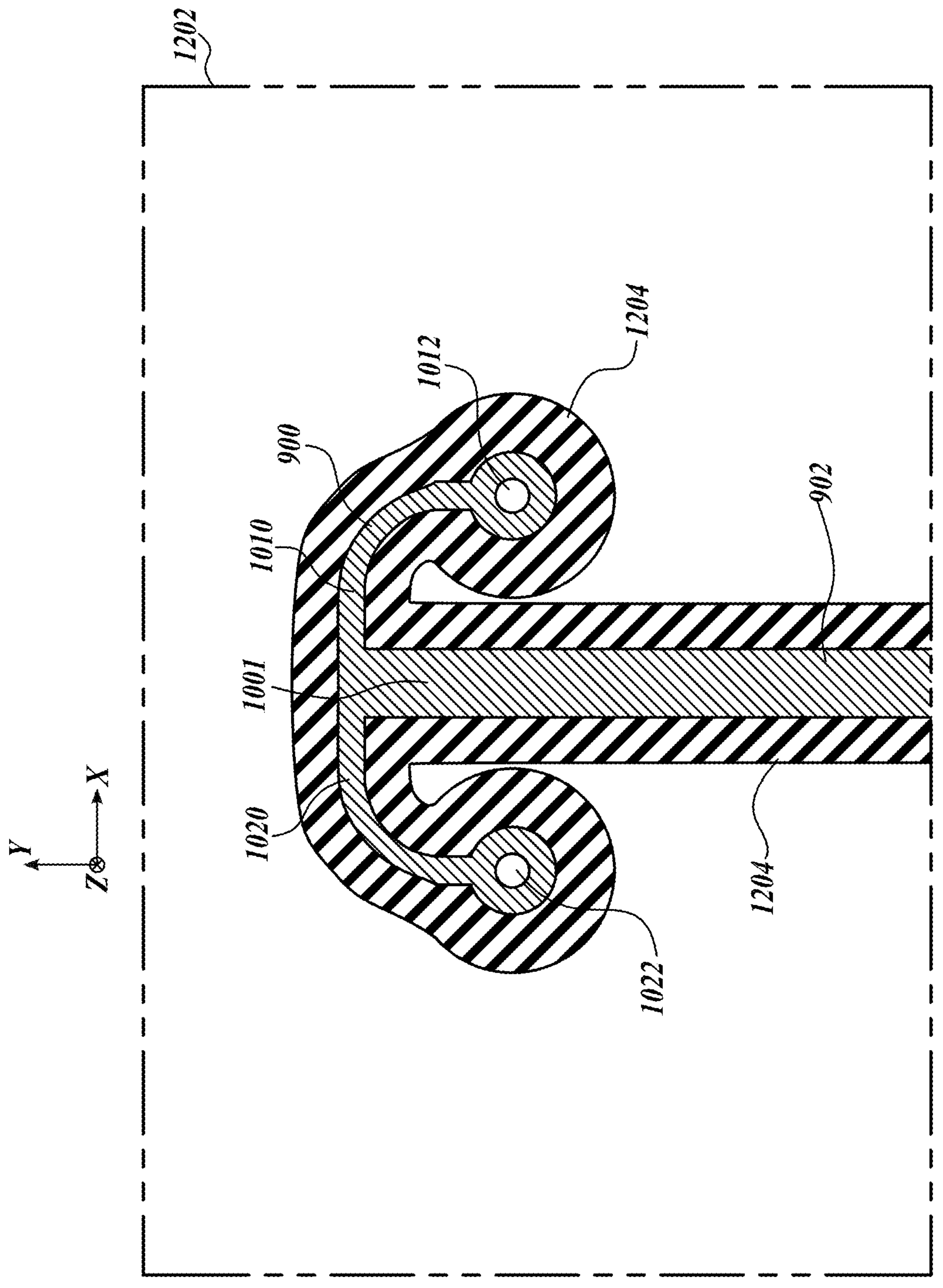
FIG. 13A depicts a top view of the stack showing the top layer of the power divider and at least a portion of another layer according to some embodiments of the present disclosure.

FIG. 13A depicts a top view of the stack 800 showing the top layer of the power splitter/combiner 900 (e.g., layer 820) and at least a portion of the layer 810, according to some embodiments of the present disclosure. In some embodiments, trace 902, input line 1001, top portion 1010, and top portion 1020 may be disposed above dielectric or non-conductive material 1204. Dielectric or non-conductive material 1204 may be formed as a layer and then selectively removed to have a width slightly wider than that of the trace 902, input line 1001, top portion 1010, and top portion 1020, as shown in FIG. 12. Or dielectric or non-conductive material 1204 may be printed having the desired shape and selective removal may be omitted.

In some embodiments, one or more isolation vias may be configured to form a Faraday cage around or electrically isolate one or more portions of the power splitter/combiner 900. Isolation vias may be associated with one or both of the bottom and top layers of the power splitter/combiner 900. Alternatively, isolation vias may be optional.

Figure 13B:
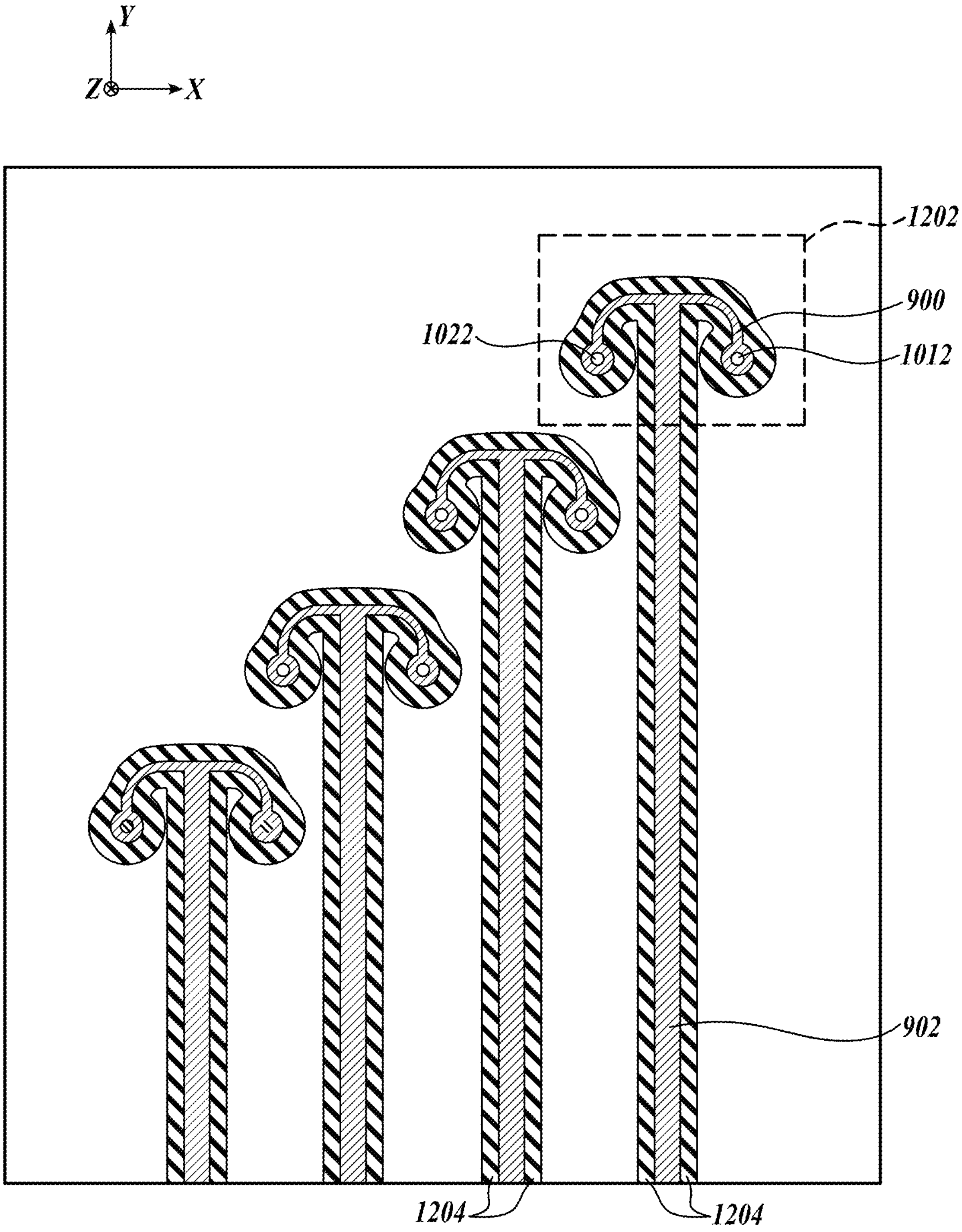
FIG. 13B depicts a top view of a plurality of power dividers associated with four H-networks according to some embodiments of the present disclosure.

FIG. 13B depicts a top view of a plurality of power splitters/combiners associated with four H-networks, according to some embodiments of the present disclosure. Each power splitter/combiner of the plurality of power splitters/combiners along with associated structures—collectively denoted as an area 1202—may correspond to the top view shown in FIG. 13A. The four power splitters/combiners may be associated with a respective "intersection" of vertical and horizontal traces of respective H-networks 610, 612, 614, and 616, which may be denoted as an intersection area 656 in FIG. 6A. Such set of four power splitters/combiners may be provided at each intersection area of H-networks 610, 612, 614, and 616. In this manner, signals may be appropriately split and propagated between layers 820 and 830 at each intersection location. Conversely, signals may be appropriately combined and propagated between layers 820 and 830 for each intersection location.

Figure 14A:
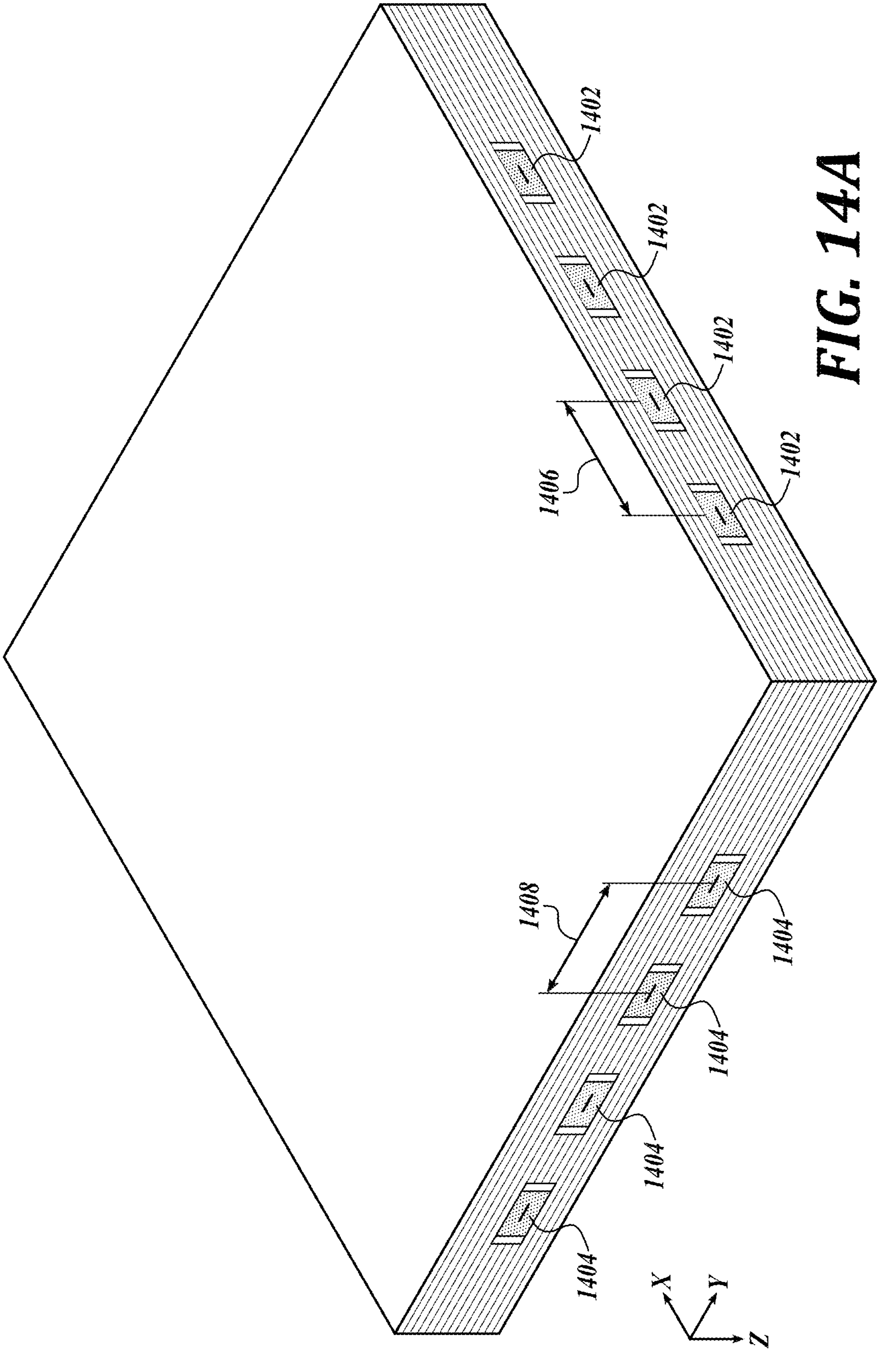
FIGS. 14A-14B depict isometric views of the set of four power dividers of FIG. 13B shown within the context of various layers of the stack according to some embodiments of the present disclosure.
Figure 14B:
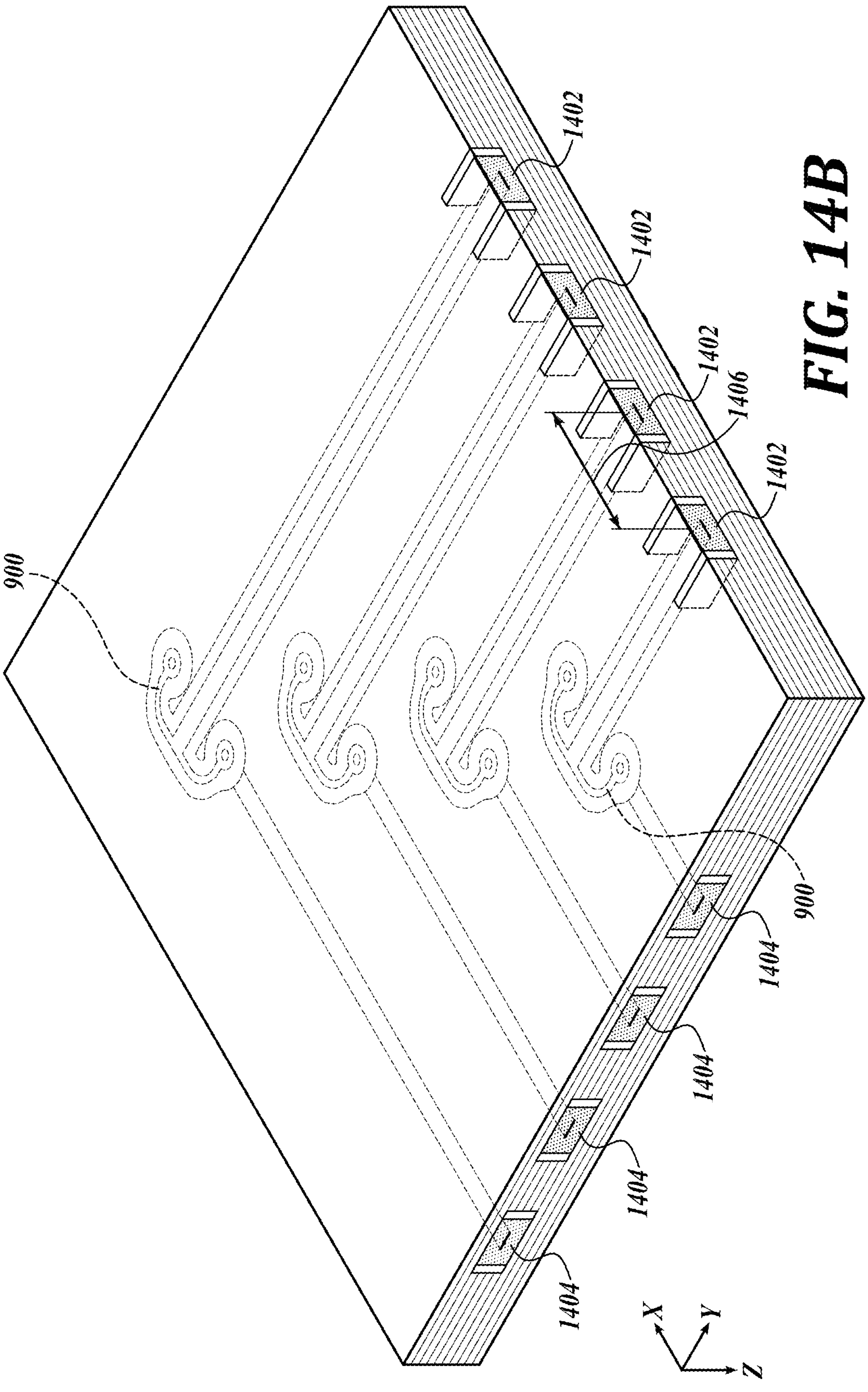

FIGS. 14A-14B depict isometric views of the set of four power splitters/combiners of FIG. 13B shown within the context of various layers of stack 800, according to some embodiments of the present disclosure. In FIGS. 14A-14B, the locations of the vertical traces 1402 and horizontal traces 1404 associated with respective power splitters/combiners are shown. In some embodiments, a distance or pitch 1406 between adjacent power splitters/combiners or vertical traces may be approximately 3 mm (e.g., 2.99 mm to 3.01 mm). Distance or pitch 1406 may also be referred to as an x-direction pitch. A distance or pitch 1408 (also referred to a y-direction pitch) between adjacent power splitters/combiners or horizontal traces may also be approximately 3 mm. The x- and y-direction pitches may be the same or different from each other. In some embodiments, a total width of approximately 10.8 mm may be achieved for four traces (also referred to as transmission lines) located in parallel to each other.

Figure 15A:
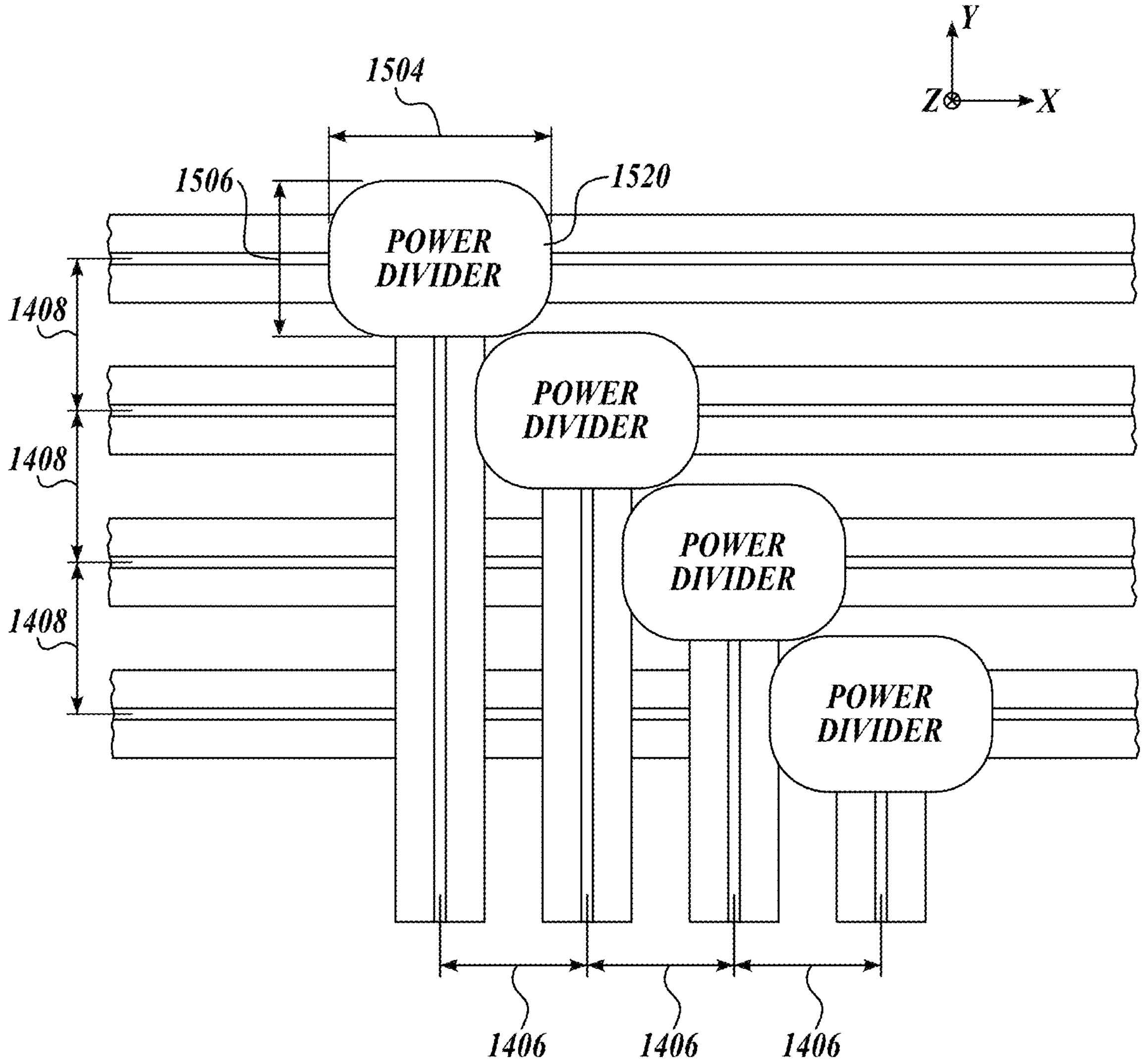
FIGS. 15A-15B denote additional dimensions associated with the set of four power dividers of a four H-network configuration according to some embodiments of the present disclosure.
Figure 15B:
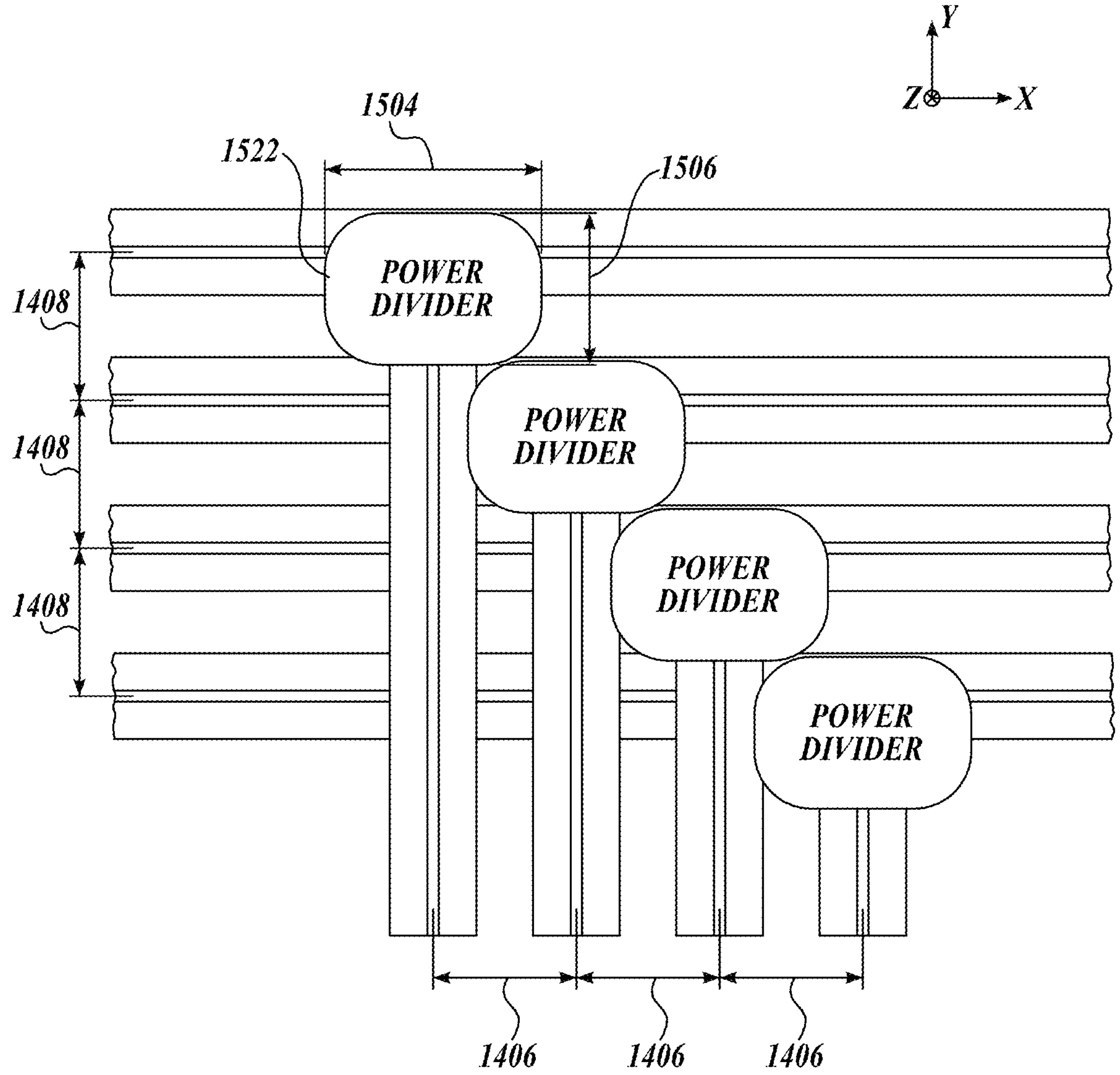

FIGS. 15A-15B depict each of the power splitters/combiners configured in a package or other encasing structure, according to some embodiments of the present disclosure. Dimensions associated with the set of four power splitters/combiners of a four H-network configuration (such as in FIG. 6A) are denoted. FIG. 15A illustrates a plurality of power splitters/combiners 1520 located at intersections of horizontal and vertical traces. Each of the power splitter/combiner 1520 is centered or aligned to the intersection location. The distance between adjacent horizontal traces may define the pitch 1408. The distance between adjacent vertical traces may define the pitch 1406. Each power splitter/combiner 1520, which may be similar to power splitter/combiner 900, may have a first overall dimension 1504 along the x-direction of approximately 4.4 mm and a second overall dimension 1506 along the y-direction of approximately 3.13 mm. FIG. 15B depicts each of the power splitters/combiners, such as a power splitter/combiner 1522 which may comprise an asymmetric single curve multiplex power splitter/combiner, configured in an offset position relative to its associated intersection location. Power splitter/combiner 1522 may be offset in the y-direction to be located (e.g., centered) between its associated horizontal trace and a horizontal trace immediately adjacent or next to the associated horizontal trace. Otherwise, power splitter/combiner 1522 may be similar to power splitter/combiner 1520.

Figure 15C:
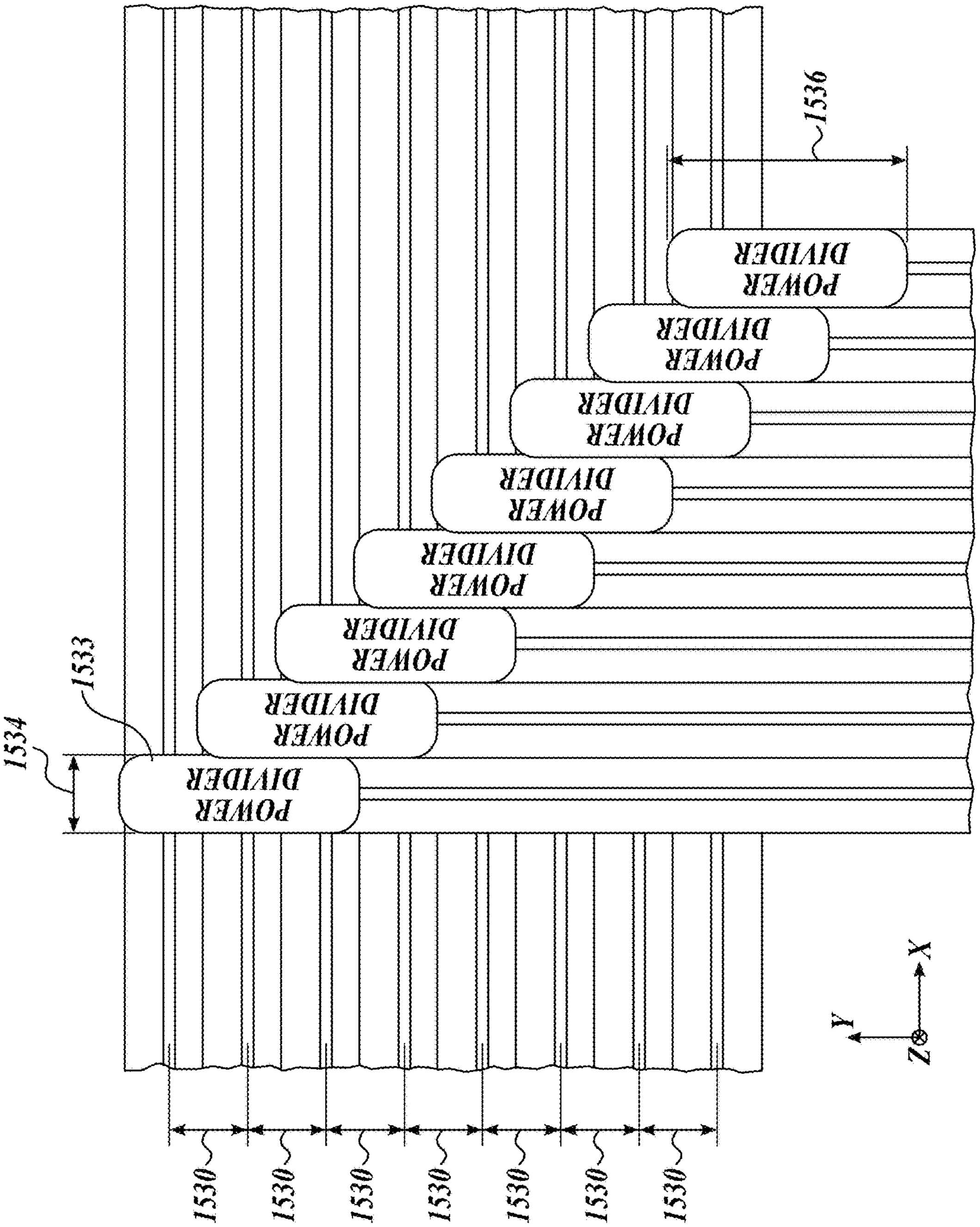
FIG. 15C depicts a block diagram showing a set of eight power dividers associated with an eight H-network configuration according to some embodiments of the present disclosure.

FIG. 15C depicts an example of packaged eight power splitters/combiners associated with an eight H-network configuration (such as shown in FIG. 7A), according to some embodiments of the present disclosure. In some embodiments, a distance or pitch 1530 between adjacent horizontal traces may be approximately 1.5 mm, and a distance or pitch 1532 between adjacent vertical traces may be approximately 1.5 mm. For each of the power splitters/combiners, such as a power splitter/combiner 1533, a first overall dimension 1534 along the x-direction may be approximately 1.52 mm and a second overall dimension 1535 along the y-direction may be approximately 4.71 mm.

Figure 15D:
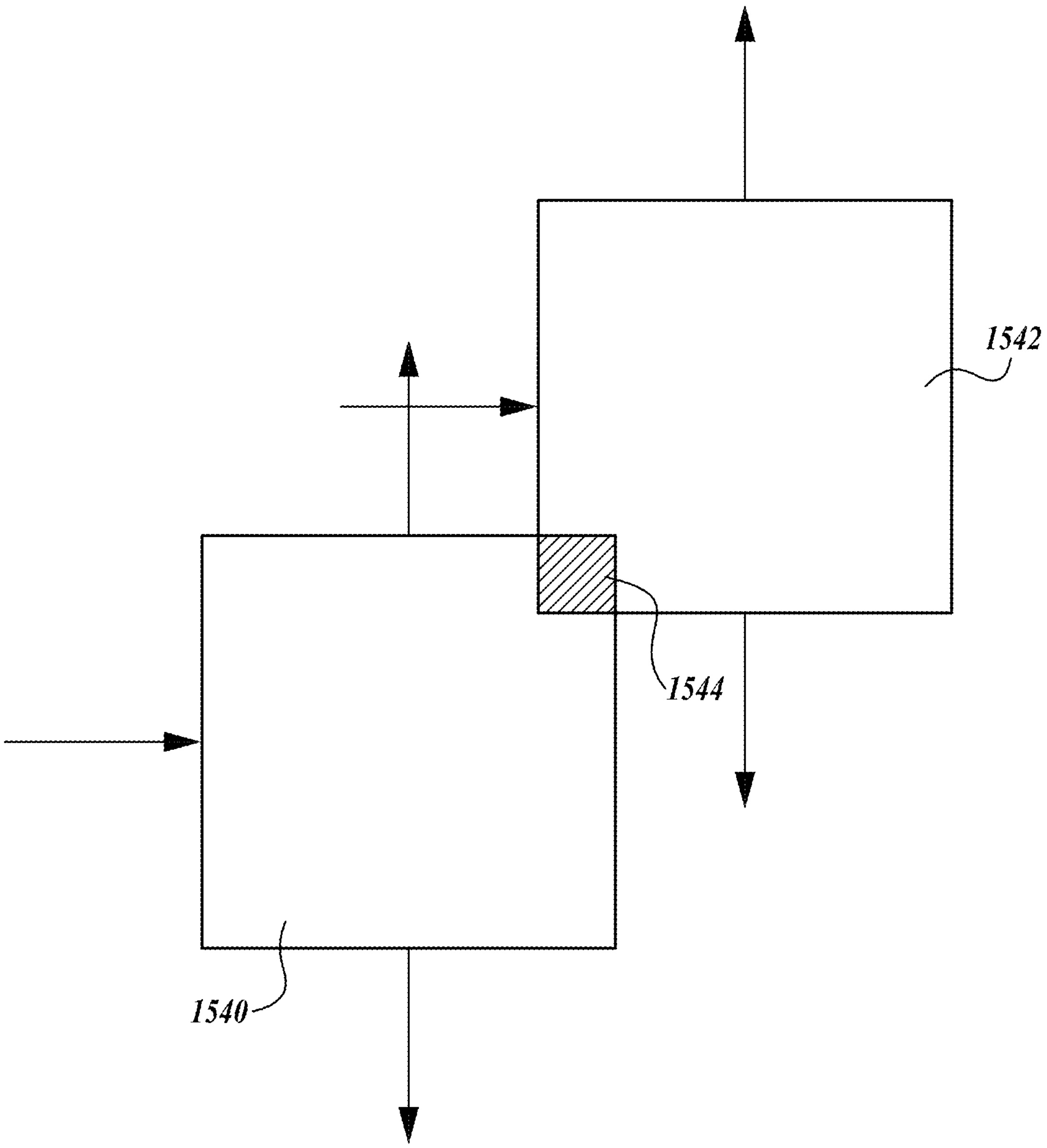
FIG. 15D depicts an example of packaged power splitters/combiners configured in an overlapping configuration, according to some embodiments of the present disclosure.

FIG. 15D depicts an example of packaged power splitters/combiners configured in an overlapping configuration, according to some embodiments of the present disclosure. Power splitters/combiners 1540, 1542 may comprise adjacent power splitters/combiners positioned to provide signal traversal between horizontal and vertical traces. In order to facilitate compact design (e.g., to reduce horizontal and/or vertical pitches of H-networks), the packages associated with the power splitters/combiners 1540, 1542 may be positioned relative to each other to include an overlap area 1544. Overlap area 1544 may comprise an empty spatial area within the package in which no portion of a power splitter/combiner may be located.

A pitch associated with one or both of the vertical and horizontal traces may be approximately 3 mm or less. It is understood that the dimensions disclosed herein are for illustration purposes only and other dimensions may be possible. In some embodiments, a plurality of power splitters/combiners may be packaged together rather than a package of a single power splitter/combiner. For example, for the intersection area 656 in FIG. 6A, a group of four power splitters/combiners may be arranged along a diagonal line consistent with the intersection locations and packaged together. Such a grouped package may include four inputs and eight outputs or, conversely, eight inputs and four outputs. The packaging of power splitters/combiners mentioned above for FIGS. 15A-15D may, in the alternative, comprise outlines or representations of the overall size of the power splitters/combiners and the power splitters/combiners need not be in enclosures or other packaging structures.

Figure 16:
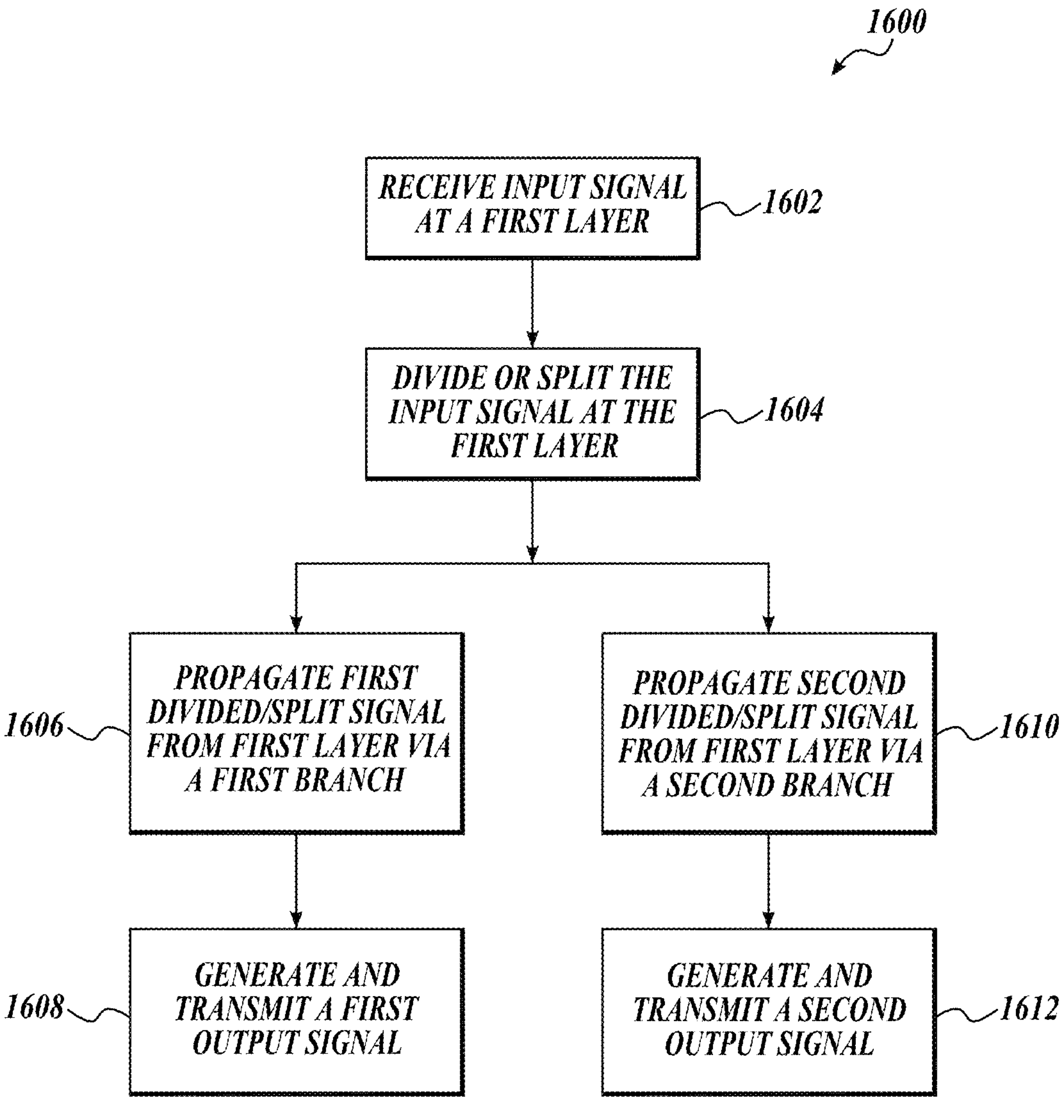
FIG. 16 depicts a flow diagram showing an example process for performing power dividing or splitting of signals using electrical conductive traces or lines located in more than one layers or planes, according to some embodiments of the present disclosure.

FIG. 16 depicts a flow diagram showing an example process 1600 for performing power dividing or splitting of signals using electrical conductive traces or lines located in more than one layers or planes, according to some embodiments of the present disclosure. At block 1602, a power splitter/combiner (e.g., power splitter/combiner 900) may receive an input signal (e.g., a RF signal) from a trace (e.g., trace 902) located in a first layer of a multiplex feed network stack (e.g., layer 820). In response, the power splitter/combiner may be configured to divide or split the input signal, in the first layer, into two divided or split signals, at block 1604.

Next, at block 1606, one of the two divided or split signals may propagate through or traverse a first branch of the power splitter/combiner (e.g., first output line 1004). The first branch may comprise an electrically conductive trace, line, or pathway configured to start at the first layer, extend through a second layer (e.g., layer 822 or via 1012), and end at a third layer (e.g., layer 830). The electrically conductive trace, line, or pathway of the first branch may be configured to be λ/4 in signal pathway length and be impedance matched with an input electrically conductive trace, line or pathway of the power splitter/combiner. Then at block 1608, a first output signal may be generated and transmitted in the third layer. At the output end of the first branch at the third layer, the signal propagated in block 1606 may comprise the first output signal of the power splitter/combiner. The first output signal may comprise a signal having the same frequency as the input signal and half the power of the input signal. The first output signal may be provided to a trace electrically coupled to the first branch at the third layer (e.g., trace 904).

Blocks 1610 and 1612 may be similar to respective blocks 1606 and 1608 except blocks 1606, 1608 may involve the propagation of the other of the two divided or split signals through a second branch (e.g., second output line 1006) of the power splitter/combiner to generate a second output signal at the end of the second branch at the third layer. The second branch may comprise an electrically conductive trace, line, or pathway configured to start at the first layer, extend through the second layer (e.g., layer 822 or via 1022), and end at the third layer. The electrically conductive trace, line, or pathway of the second branch may be configured to be λ/4 in signal pathway length and be impedance matched with an input electrically conductive trace, line or pathway and the first output line. The second output signal may also comprise a signal having the same frequency as the input signal and half the power of the input signal. The second output signal may be provided to a trace electrically coupled to the second branch at the third layer (e.g., trace 906).

In alternative embodiments, power splitter/combiner 900 may be configured to split or divide the signal in a layer different from the layer including the input line, rather than splitting/dividing the signal in the same layer in which the input line is included. Such a power splitter/combiner may be configured to include an input line in the first layer, a single via (electrically coupled to the input line) in the second layer disposed between the first and third layers, and first and second output lines (electrically coupled to the single via) provided in the third layer. One end of each of the first and second output lines may form an intersection or junction with an end of the single via in the third layer. The opposite end of each of the first and second output lines may intersect with respective (horizontal) traces in the third layer. In this manner, the incoming signal received from a (vertical) trace included in the first layer may be split/divided after traversing through the first and second layers, upon arrival in the same layer as the layer that includes the (horizontal or other direction) trace (e.g., third layer).

Process 1600 may be performed in reverse order from that discussed above, in which two input signals are received at respective first and second output lines 1004, 1006 and be combined into a single output signal that is provided to the input line 1002.

Four-Layer Multiplex Feed Networks

Configuring the plurality of multiplex feed networks in two layers, such as eight H-networks 710, 712, 714, 716, 718, 720, 722, 724 in FIG. 7A, may be associated with a receiver panel, for a certain number of beamformers (e.g., less than 256 beamformers), for a certain number of antenna elements, and/or the like. In alternative embodiments, the multiplex feed network layer 180*c* may comprise more than two layers, and in particular, four layers.

Figure 17A:
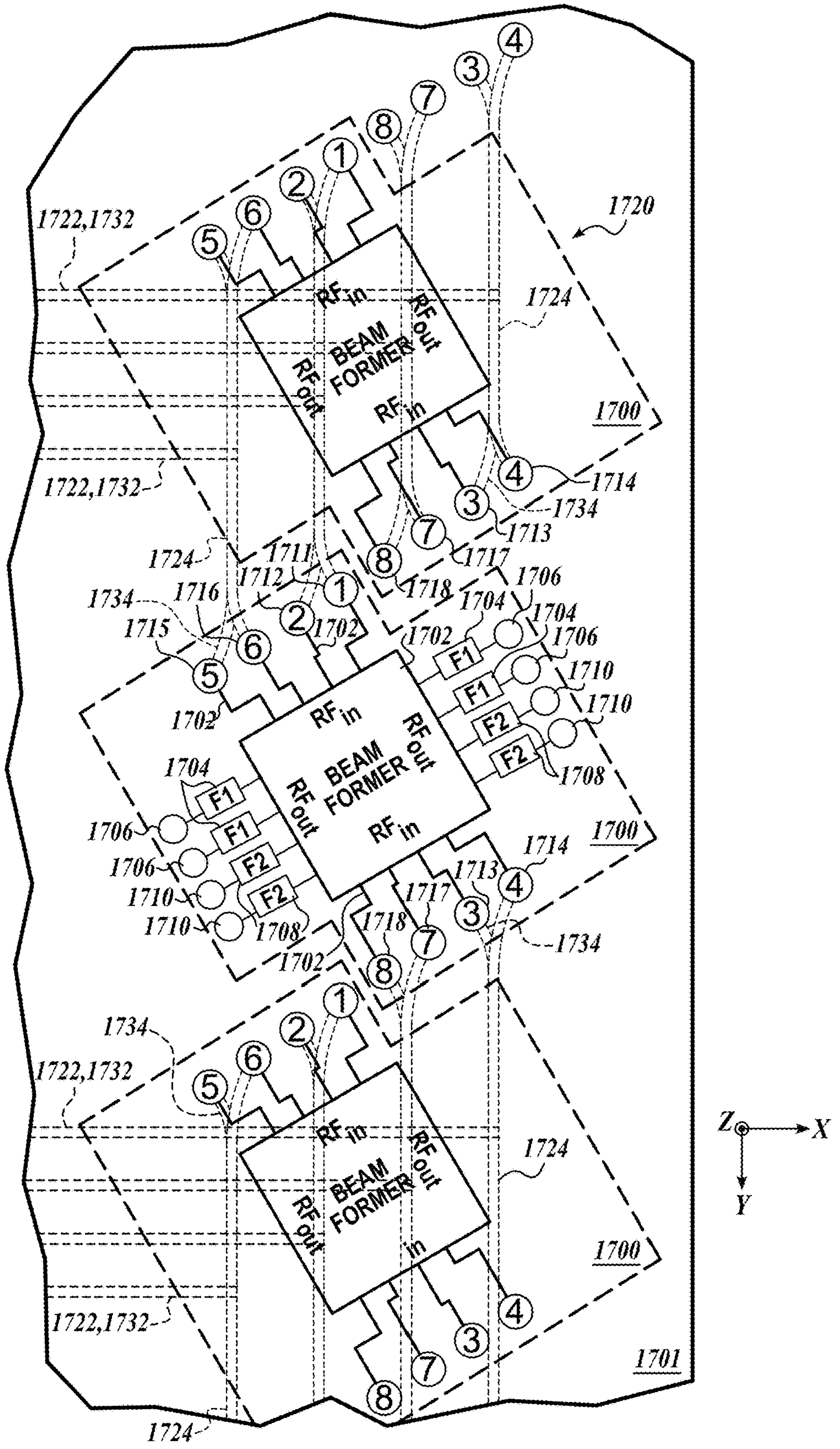
FIG. 17A depicts a block diagram of a portion of a stack including a beamformer lattice layer and four multiplex feed network layers according to some embodiments of the present disclosure.

FIG. 17A depicts multiplex feed networks configured in four layers aligned to a beamformer layer according to some embodiments of the present disclosure. The plurality of beamformers (e.g., beamformers 142*i*, 242*i*, or 342*i*) and associated structures included in a beamformer lattice (e.g., beamformer 140, 240, or 340) may be organized as a plurality of beamformer cells 1700. FIG. 17A depicts a block diagram of a portion of a beamformer lattice including a plurality of beamformer cells 1700. The beamformer lattice may be implemented in a layer 1701. Layer 1701 may be a layer similar to beamformer layer 180*d* and which may be included in a PCB layer stack similar to lay-up 180 of FIG. 1G. The Cartesian coordinate system denoted in FIG. 17A corresponds to that shown in FIG. 1G, in which FIG. 17A illustrates a bottom view of layer 1701 viewed upward from the underside of layer 1701 toward the layers above (e.g., viewed toward a multiplex feed network such as those implemented in multiplex feed network layer 180*c*). A multiplex feed network 1720 is represented as dotted lines to denote its location in layers different from layer 1701.

Each beamformer cell of the plurality of beamformer cells 1700 may include a beamformer 1702, first filters 1704, second filters 1708, vias 1706, vias 1710, vias 1711, 1712, 1713, 1714, 1715, 1716, 1717, 1718, and electrically conductive traces between beamformer 1702 and the vias 1706, 1710, 1711-1718. Beamformer cell 1700 may be similar to beamformer cell 142*i*. Beamformer 1702 may comprise an integrated circuit (IC) chip having a plurality of inputs and a plurality of outputs (e.g., chip pins). Beamformer 1702 may include eight inputs (denoted as $RF_{in}$) and eight outputs (denoted at $RF_{out}$). The eight inputs electrically couple to respective vias 1711, 1712, 1713, 1714, 1715, 1716, 1717, 1718 using traces 502. The eight outputs electrically couple to respective vias 1706, 1710. Disposed between each output and via 1706/1710 is the first or second filter 1704, 1708. For the eight outputs, four of the first filters 1704 and four of the second filters 1708 may be implemented. The vias electrically coupling to first filters 1704 are denoted as vias 1706, and vias electrically coupling to second filters 1708 are denoted as vias 1710.

In some embodiments, the inputs and outputs of beamformer 1702 may be distributed on all sides of the beamformer 1702. As illustrated in FIG. 17A, two opposing sides proximate to vias 1711-1718 may be configured with inputs and the remaining two opposing sides may be configured with outputs.

First and second filters 1704, 1708 may comprise RF filters operating at or tuned to first (f1) and second frequencies (f2), respectively. First and second filters 1704, 1708 may be configured to filter RF signals to extract portions of RF signals at or around the first and second frequencies, respectively. First and second frequencies may be the frequencies associated with the particular antenna elements that electrically couple to particular outputs of the beamformer 1702 using vias 1706, 1710. In some embodiments, first and second frequencies may be the same frequency, because all antenna elements that electrically couple to the beamformer 1702 outputs may operate at the same frequency. In such implementation, first and second filters 1704, 1708 may be the same as each other.

In other embodiments, first and second frequencies may be different from each other, because first and second subsets of the plurality of antenna elements included in the antenna lattice may operate at first and second frequencies, respectively. And in particular, antenna elements included in the first subset may electrically couple to vias 1706 and antenna elements included in the second subset may electrically couple to vias 1710. Hence, first and second filters 1704, 1708 may be different from each other. As an example, first and second subsets of antenna elements may comprise antenna elements configured in an interspersed arrangement, with first frequency ranging from approximately 11.95 to 12.2 Gigahertz (GHz) and second frequency ranging from approximately 10.95 to 11.2 GHz.

Vias 1706, 1710 may comprise electrically conductive vias that extend between layer 1701 and particular antenna elements located in an antenna lattice layer. The lengths of vias 1706, 1710 may extend perpendicular to the major plane of layer 1701, and in particular, in the negative z-direction (e.g., into the page) if implemented within a stack as configured in FIG. 1G. Vias 1706 may electrically couple to particular antenna elements associated with the first frequency (see first filters 1704 disposed in the output pathway to vias 1706). Vias 1710 may electrically couple to particular antenna elements associated with the second frequency (see second filters 1708 disposed in the output pathway to vias 1710). Vias 1706, 1710 may also be referred to as output vias, antenna vias, antenna element vias, antenna element connecting vias, or the like.

Vias 1711-1718 may comprise electrically conductive vias that extend between layer 1701 and particular ends of traces of the last stage/level of the multiplex feed network 1720. Each trace of the last stage/level comprises a trace segment between a last node at one end and the end of such trace at the other end. The end of the trace opposite the last node may be open or floating, and may be referred to as a termination or terminating end of the multiplex feed network. Such trace segments may also be referred to as termination, terminating, last, or end trace segments of the multiplex feed network. In FIG. 17A, ends of traces of the last stage/level of the multiplex feed network 1720 comprise ends of traces that are vertical traces. Vias 1711-1718 may also be referred to as input vias.

In some embodiments, the configuration of the beamformer cells 1700 with multiplex feed network 1720 may be associated with a transmitter panel, embodiments in which the multiplex feed networks are configured within four PCB layers, embodiments in which the total number of multiplex feed networks cannot be implemented within two PCB layers due to spacing, manufacturing, or other constraints or design preferences, for a certain number of beamformers (e.g., more than 256 beamformers), for a certain number of antenna elements, and/or the like.

It is understood that the number of inputs and outputs of the beamformer 1202 may be the same or different from each other. For instance, a beamformer configured to couple to eight antenna elements may have less or more than eight inputs. Each beamformer input may or may not couple to a different multiplex feed network from each other. For instance, a beamformer including eight inputs may collectively couple to six multiplex feed networks, rather than eight multiplex feed networks.

In contrast to the eight H-networks provided in two layers, multiplex feed network 1720 to which the beamformer cells 1700 are electrically coupled may comprise eight H-networks configured in four PCB layers. Two sets of two-layer H-networks may be implemented, in which each set may include four H-networks for a total of eight H-networks within the two sets. Because fewer H-networks are provided in a given set of two PCB layers than in the layers of FIGS. 7A-7D, the pitch between the horizontal traces (also referred to as the y pitch or horizontal pitch) and/or the pitch between the vertical traces (also referred to as the x pitch or vertical pitch) may be greater than corresponding pitch(es) of traces in FIGS. 7A-7D. As an example, the y pitch may be approximately 3.1 mm and the x pitch may be approximately 6.3 mm.

Figure 17B:
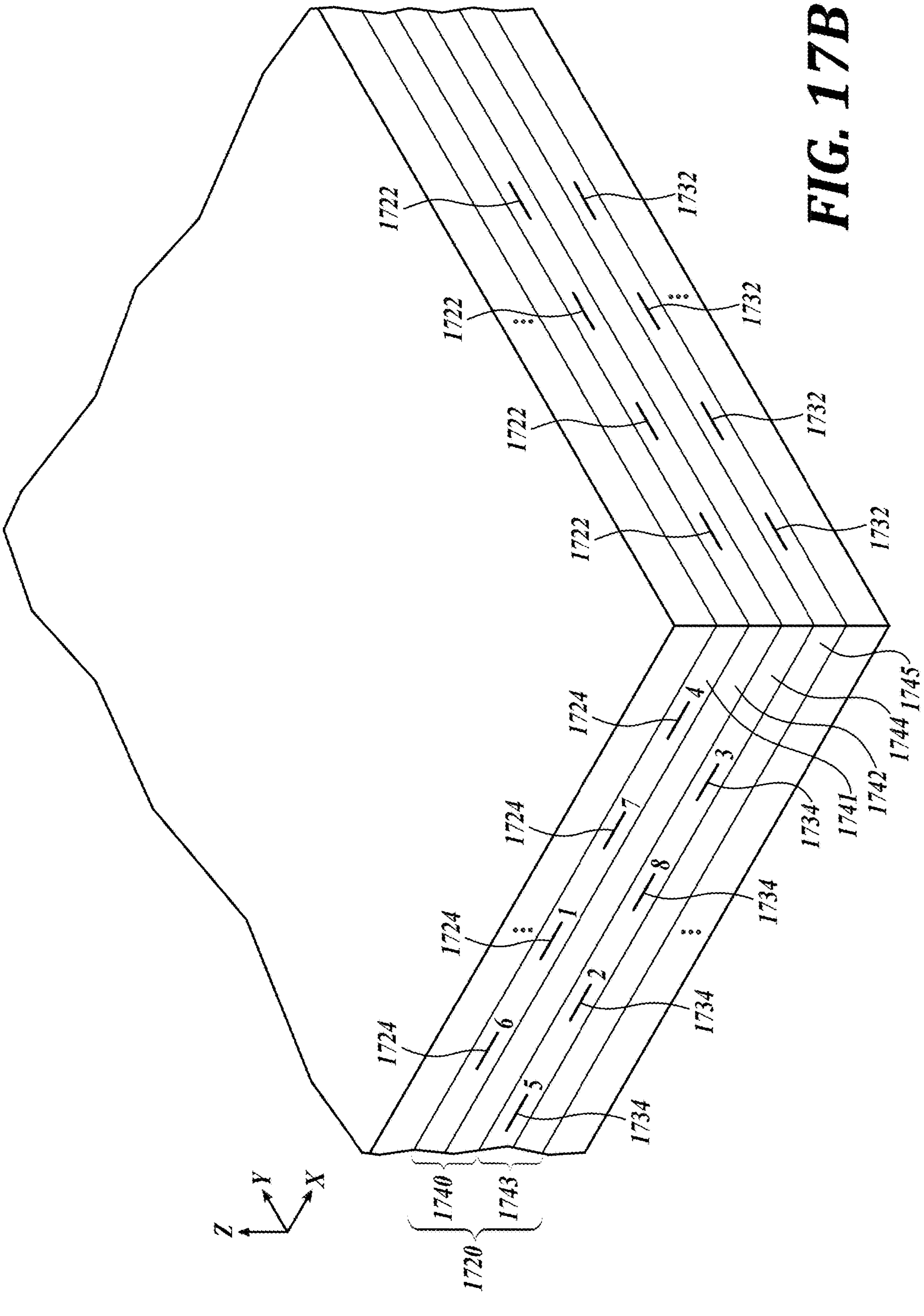
FIG. 17B depicts a perspective view of a portion of the stack including the multiplex feed network configured as eight H-networks according to some embodiments of the present disclosure.

FIG. 17B depicts a perspective view of a portion of the stack including the multiplex feed network 1720 configured as eight H-networks according to some embodiments of the present disclosure. Multiplex feed network 1720 may comprise a first subset 1740 and a second subset 1743, in which each of the first and second subsets 1740, 1743 may include a plurality of multiplex feed networks. For example, each of the first and second subsets 1740, 1743 may include four H-networks. First subset 1740 may be disposed above the second subset 1743. First subset 1740 may include two PCB layers 1741, 1742 and second subset 1743 may include two PCB layers 1744, 1745. Layer 1742 may be disposed between layers 1741 and 1744, and layer 1744 may be disposed between layers 1742 and 1745.

In the first subset 1740, layer 1741 may include vertical traces 1724 of the four H-networks of the first subset 1740 while layer 1742 may include the horizontal traces 1722 of the four H-networks of the first subset 1740. The four H-networks of the first subset 1740 may comprise H-networks in which signals S6, S1, S7, and S4 may be carried. The numbers denoted next to vertical traces 1724 correspond to the numbers denoted to particular vias 1711-1718 as shown in FIG. 17A and specifies the particular trace to via coupling. For example, vertical trace 1724 denoted with number "6" electrically couples to via 1716, vertical trace 1724 denoted with number "1" electrically couples to via 1711, and so forth.

Similarly, layer 1744 may include vertical traces 1734 of the four H-networks of the second subset 1743 while layer 1745 may include the horizontal traces 1732 of the four H-networks of the second subset 1743. The four H-networks of the second subset 1743 may comprise H-networks in which signals S5, S2, S8, and S3 may be carried. The numbers denoted next to vertical traces 1734 correspond to the numbers denoted to particular vias 1711-1718 as shown in FIG. 17A and specifies the particular trace to via coupling. For example, vertical trace 1734 denoted with number "8" electrically couples to via 1718, vertical trace 1734 denoted with number "3" electrically couples to via 1713, and so forth. Moreover, first filters 1704 or the first frequency associated with first filters 1704 may be associated with signals S5, S2, S6, and S1, in which signals S5 and S2 may be carried by a different set of H-network layers than signals S6 and S1. Second filters 1708 or the second frequency associated with second filters 1708 may be associated with signals S8, S3, S7, and S4, in which signals S8 and S3 may be carried by a different set of H-network layers than signals S7 and S4.

Although not shown, one or more additional PCB layers, grounding planes, adhesive layers, electrical isolation layers, and/or other layers may be disposed above, within, or below the layers of multiplex feed network 1720. The number of multiplex feed networks in the first and second subsets 1740, 1743 may be the same or different from each other.

In some embodiments, the orientation of the H-networks of the first and second subsets 1740, 1743 may be the same as each other so that traces are overlaid over each other except as discussed below. Hence, the traces of the first and second subsets 1740, 1743 may align and be collinear to each other in a direction perpendicular to the major plane of the stack (e.g., along the z-axis). For instance, FIGS. 17A-17B show horizontal traces 1722 and 1732 located directly over each other.

Vertical traces and nodes of the first and second subsets 1740, 1743 may also be collinear with each other except for the termination trace segments and termination ends of the first and second subsets 1740, 1743. If the termination ends of the first and second subsets 1740, 1743 are collinear with each other, then termination ends of the second subset 1743 may not be accessible using vertical vias from layer 1701 and/or electrically coupling with a termination end in the second subset 1743 by a vertical via from layer 1701 may also comprise electrically coupling with the termination end in the first subset 1740 that is located between such vertical via and such termination end in the second subset 1743.

Thus, in order for each of the vias 1711-1718 to electrically couple with a particular one of the termination ends in the first or second subsets 1740, 1743 (e.g., alternating between a termination end in the first and second subsets 1740, 1743 for adjacent vias), corresponding termination ends in the first and second subsets 1740, 1743 may be configured to be offset or non-collinear from each other in a direction perpendicular to the major plane of layer 1701. Vertical traces 1724, 1734 shown in FIG. 17B may comprise the traces at the termination ends. From left to right, adjacent termination ends in the first and second subsets 1740, 1743 are displaced or spaced apart from each other along the x-axis and also alternate between being located in the first subset 1740 or the second subset 1743 (along the z-axis).

In order for corresponding termination ends of the first and second subsets 1740, 1743 to be offset from each other, the termination trace segments associated with the corresponding termination ends may be configured to prescribe different trace pathways or have different shapes from each other. The corresponding termination trace segments, and all termination trace segments of the multiplex feed networks 1720, in general, may still have the same trace lengths so that the signal pathway length associated with each multiplex feed network of the plurality of multiplex feed networks 1720 from the input/output to the output/input will be length matched to each other. For example, termination ends to electrically couple with respective vias 1715 and 1716 may be offset from each other and termination trace segments associated with such termination ends may prescribe a different trace path from each other to locate such termination ends at non-collinear locations, even though the remaining traces of the two H-networks associated with such termination ends may be collinear to each other.

Figure 17C:
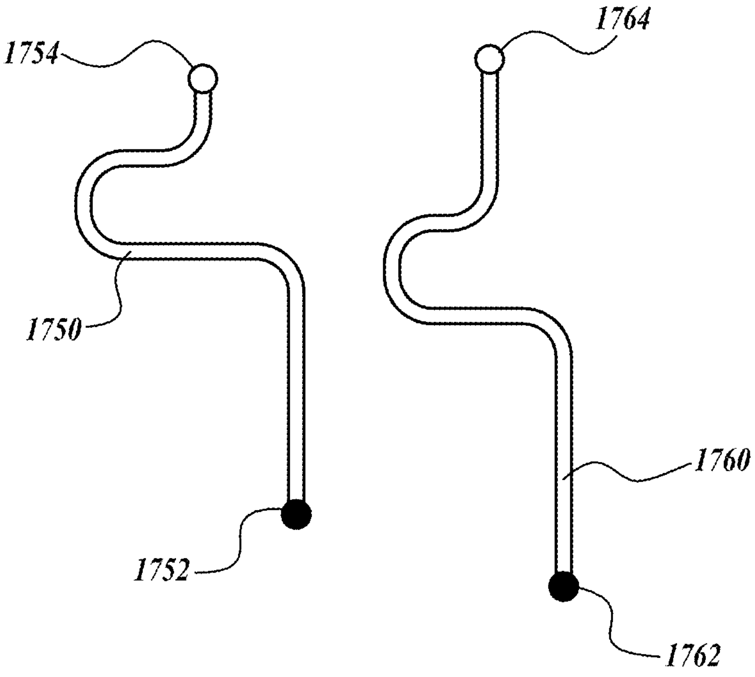
FIGS. 17C-17D depict example shapes or contours of termination trace segments included in the multiplex feed network of FIG. 17B according to some embodiments of the present disclosure.
Figure 17D:
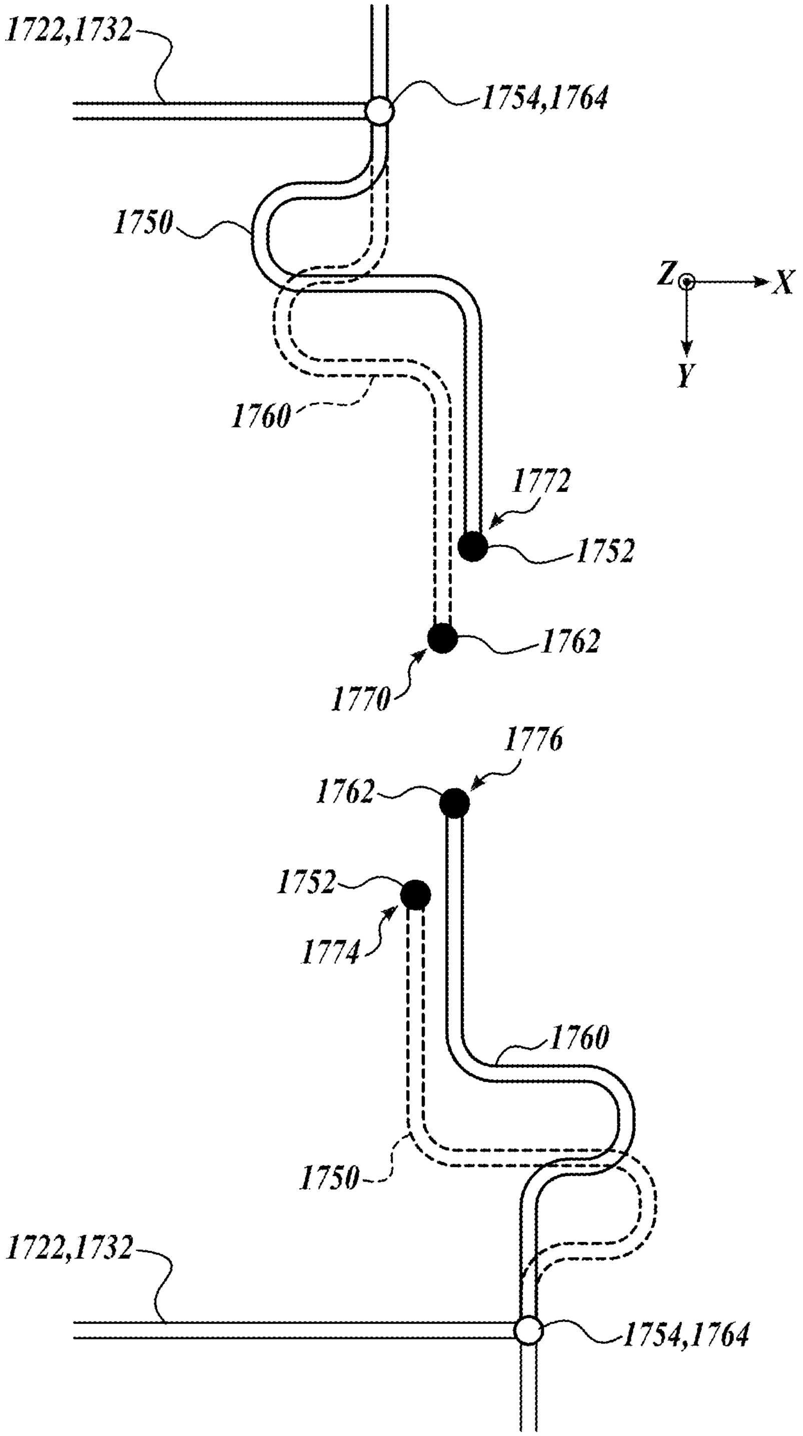

FIGS. 17C-17D depict example shapes or contours of termination trace segments 1750, 1760 included in the multiplex feed networks 1720 according to some embodiments of the present disclosure. In some embodiments, one end of a termination trace segment 1750 may comprise a termination end 1752 and the opposite end of the termination trace segment 1750 may comprise a last or end node 1754 of the multiplex feed network in which the termination trace segment 1750 is included. One end of a termination trace segment 1760 may comprise a termination end 1762 and the opposite end of the termination trace segment 1760 may comprise a last or end node 1764 of the multiplex feed network in which the termination trace segment 1760 is included.

Termination trace segment 1750 may have a shape or contours different from termination trace segment 1760. Each of the termination trace segments 1750, 1760 may include one or more straight segments, one or more curved segments, one or more angled segments, and/or the like. Because the termination trace segments 1750, 1760 may have a shape other than a straight line (all of the non-termination trace segments having a straight line shape), termination trace segments 1750, 1760 may also be referred to as meandering traces or traces having meandering shape, contours, or the like.

Termination trace segments 1750, 1760 may be configured in accordance with contour, manufacturing, location, and/or the like requirements or constraints. As an example, the signal pathway (also referred to as the electrical path or pathway) lengths of termination trace segments 1750, 1760 are to be equal to each other or be within a certain tolerance range, such as 1.55 mm. As another example, if the (line) width of termination trace segments 1750, 1760 is 0.2 mm, then a minimum radius of curvature (ROC) of any curves included in the termination trace segments 1750, 1760 is to be at least 0.5 mm. As still another example, locations of termination trace segments 1750, 1760 may be configured so that vias, such as vias 1706 and/or 1710 associated with beamformer cells 1700, may extend through the multiplex feed network layers to particular antenna elements located in the antenna lattice layer.

FIG. 17D depicts an example arrangement of termination trace segments 1750, 1760 from the same viewpoint as in FIG. 17A except with layer 1701 omitted, according to some embodiments of the present disclosure. In the upper group of termination trace segments, termination trace segment 1760 may comprise a trace included in the second subset 1743 and may be disposed below termination trace segment 1750 included in the first set 1740. In the lower group of termination trace segments, termination trace segment 1750 may comprise a trace included in the second subset 1743 and may be disposed below termination trace segment 1760 included in the first set 1740. In this manner, termination ends 1762, 1752 may be offset from each other and also located (e.g., located along a diagonal line) to align with particular of vias 1711-1718. For instance, termination ends 1770, 1772 may electrically couple to vias 1715, 1716, respectively, and termination ends 1774, 1776 may electrically couple to vias 1718, 1717, respectively. As another example, termination ends 1770, 1772 may electrically couple to vias 1712, 1711, respectively, and termination ends 1774, 1776 may electrically couple to vias 1713, 1714, respectively.

Not only are termination trace segments 1750, 1760 length matched to each other, the total signal pathway length associated with each multiplex feed network of the plurality of multiplex feed networks 1720 is also length matched to each other. Such length matching applies to power splitters/combiners included in the multiplex feed networks 1720 as well.

Illustrative examples of the apparatuses, systems, and methods of various embodiments disclosed herein are provided below. An embodiment of the apparatus, system, or method may include any one or more, and any combination of, the examples described below.

Example 1 is a power splitter/combiner, which includes:

a first electrically conductive trace included in a first layer;

second and third electrically conductive traces included in a second layer;

a first via electrically coupled to the first and second electrically conductive traces; and a second via electrically coupled to the first and third electrically conductive traces, wherein a first portion of the first electrically conductive trace comprises a first port of the power splitter/combiner, wherein a second portion of the first electrically conductive trace, the first via, and the second electrically conductive trace comprises a second port of the power splitter/combiner, and wherein a third portion of the first electrically conductive trace, the second via, and the third electrically conductive trace comprises a third port of the power splitter/combiner.

Example 2 includes the subject matter of Example 1, and wherein a signal pathway length associated with the second portion of the first electrically conductive trace in the first layer or the second electrically conductive trace in the second layer is less than a total signal pathway length associated with the second port.

Example 3 includes the subject matter of any of Examples 1-2, and wherein the first, second, and third ports are impedance matched to each other.

Example 4 includes the subject matter of any of Examples 1-3, and wherein a first signal at the first port splits into second and third signals at the second and third ports, respectively, and wherein each of the second and third signals has a power that is half of a power of the first signal.

Example 5 includes the subject matter of any of Examples 1-4, and wherein the first, second, and third electrically conductive traces are included in a multiplex feed network configured on the first and second layers.

Example 6 includes the subject matter of any of Examples 1-5, and wherein the first, second, and third portions of the first electrically conductive trace intersect with each other in the first layer.

Example 7 includes the subject matter of any of Examples 1-6, and wherein one or both of the second or third portions of the first electrically conductive trace includes an orientation that contours toward the first portion of the first electrically conductive trace.

Example 8 includes the subject matter of any of Examples 1-7, and wherein a width of the power splitter/combiner in a direction perpendicular to an orientation of the first portion of the first electrically conductive trace is reduced by the contour of one or both of the second and third portions of the first electrically conductive trace toward the first portion of the first electrically conductive trace.

Example 9 includes the subject matter of any of Examples 1-8, and wherein one or both of the second or third electrically conductive trace includes an orientation that contours toward the first portion of the first electrically conductive trace.

Example 10 includes the subject matter of any of Examples 1-9, and wherein a width of the power splitter/combiner in a direction perpendicular to an orientation of the first portion of the first electrically conductive trace is reduced by the contour of one or both of the second or third electrically conductive trace toward the first portion of the first electrically conductive trace.

Example 11 includes the subject matter of any of Examples 1-10, and herein one or both of the first or second layers includes a base layer to electrically isolate the first or second layers from adjacent layers.

Example 12 includes the subject matter of any of Examples 1-11, and wherein the base layer comprises a printed circuit board (PCB), a dielectric material, or a non-conductive material.

Example 13 includes the subject matter of any of Examples 1-12, and wherein the first, second, and third ports of the power splitter/combiner are included in a package, and the package is positioned at a location of a printed circuit board (PCB) at which electrically conductive traces located in two different layers are collinear to each other in a direction perpendicular to a plane of the layers in which the electrically conductive traces are provided.

Example 14 is an apparatus, which includes:

a first electrical signal path branch included in a first layer;

a second electrical signal path branch included in the first layer and a second layer; and a third electrical signal path branch included in the first and second layers, wherein the first, second, and third electrical signal path branches electrically couple to each other in the first layer, and wherein signal pathway lengths associated with the second and third electrical signal path branches are quarter wavelength signal pathway lengths.

Example 15 includes the subject matter of Example 14, and wherein the first, second, and third electrical signal path branches are impedance matched.

Example 16 includes the subject matter of any of Examples 14-15, and wherein at least a portion of the first, second, or third electrical signal path branches comprises an electrically conductive trace.

Example 17 includes the subject matter of any of Examples 14-16, and wherein at least a portion of the second and third electrical signal path branches comprises a via that extends between the first and second layers.

Example 18 includes the subject matter of any of Examples 14-17, and wherein the second electrical signal path branch comprises first, second, and third portions, and wherein the first portion is included in the first layer, the second portion extends between the first and second layers, and the third portion is included in the second layer.

Example 19 includes the subject matter of any of Examples 14-18, and wherein the first and third portions comprise electrically conductive traces and the second portion comprises a via.

Example 20 includes the subject matter of any of Examples 14-19, and wherein one or both of the first and second portions includes an orientation that contours toward the first electrical signal path branch.

Example 21 includes the subject matter of any of Examples 14-20, and wherein the second electrical signal path branch includes a linear orientation portion and a non-linear orientation portion.

Example 22 includes the subject matter of any of Examples 14-21, and wherein the second and third electrical signal path branches are symmetrical along opposing sides of the first electrical signal path branch.

Example 23 includes the subject matter of any of Examples 14-22, and wherein a first signal inputted to the first electrical signal path branch is converted into second and third signals at the second and third electrical signal path branches, respectively, and wherein each of the second and third signals have half the power of a power of the first signal.

Example 24 includes the subject matter of any of Examples 14-23, and wherein the first, second, and third signals comprise radio frequency (RF) signals.

Example 25 includes the subject matter of any of Examples 14-24, and wherein second and third signals inputted to the second and third electrical signal path branches, respectively, are combined into a first signal at the first electrical signal path branch, and wherein the first signal has a power that is a sum of powers of the second and third signals.

Example 26 includes the subject matter of any of Examples 14-25, and wherein ends of the first, second, and third electrical signal path branches opposite to the ends that intersect with each other electrically couple to a first electrical conductive trace included in the first layer, a second electrical conductive trace included in the second layer, and a third electrical conductive trace included in the second layer, respectively.

Example 27 is a method of routing signals, which includes:

in response to receipt of a first signal in a first layer, splitting the first signal into second and third signals;

causing to propagate the second signal from the first layer to a second layer disposed above or below the first layer; and causing to propagate the third signal from the first layer to the second layer, wherein each of the second and third signals has half the power of a power of the first signal.

Example 28 includes the subject matter of Example 27, and wherein the first, second, and third signals comprise radio frequency (RF) signals, and wherein a same frequency is associated with the first, second, and third signals.

Example 29 includes the subject matter of any of Examples 27-28, and wherein splitting the first signal into the second and third signals comprises splitting the first signal in the first layer.

Example 30 includes the subject matter of any of Examples 27-29, and wherein causing to propagate the second signal from the first layer to the second layer comprises causing to propagate the second signal through a first conductive line included in the first layer, a first via extending between the first and second layers, and a second conductive line included in the second layer.

Example 31 includes the subject matter of any of Examples 27-30, and wherein the first signal is received at a third conductive line, and wherein causing to propagate the third signal from the first layer to the second layer comprises causing to propagate the third signal through a fourth conductive line included in the first layer, a second via extending between the first and second layers, and a fifth conductive line included in the second layer.

Example 32 includes the subject matter of any of Examples 27-31, and wherein the third conductive line; the first conductive line, the first via, and the second conductive line; and the fourth conductive line, the second via, and the fifth conductive line are impedance matched to each other.

Example 33 is an apparatus, which includes:

a first layer having a first plurality of electrically conductive traces comprising a first portion of a plurality of hierarchical networks;

a second layer having a second plurality of electrically conductive traces comprising a second portion of the plurality of hierarchical networks, wherein the first plurality of electrically conductive traces is orientated in a first direction and the second plurality of electrically conductive traces is orientated in a second direction different from the first direction; and a plurality of vias electrically connecting the first plurality of electrically conductive traces of the first layer to the respective second plurality of electrically conductive traces of the second layer to define the plurality of hierarchical networks.

Example 34 includes the subject matter of Example 33, and wherein the plurality of hierarchical networks comprise H-networks, fractal networks, self-similar fractal networks, tree networks, star networks, or hybrid networks.

Example 35 includes the subject matter of any of Examples 33-34, and wherein the plurality of hierarchical networks comprises at least three hierarchical networks.

Example 36 includes the subject matter of any of Examples 33-35, and wherein respective traces of the first plurality of electrically conductive traces are parallel and offset from one another, and wherein respective traces of the second plurality of electrically conductive traces are parallel and offset from one another.

Example 37 includes the subject matter of any of Examples 33-36, and wherein hierarchical networks of the plurality of hierarchical networks are electrically isolated from one another.

Example 38 includes the subject matter of any of Examples 33-37, and wherein the plurality of vias comprises a first plurality of vias, and wherein the second plurality of traces electrically couples to a plurality of electrical components included in a layer different from the first and second layers via a second plurality of vias.

Example 39 includes the subject matter of any of Examples 33-38, and further comprising:

a plurality of isolation vias adjacent at least some of the first plurality of traces and the second plurality of traces.

Example 40 includes the subject matter of any of Examples 33-39, and wherein the plurality of vias and certain portions of the first and second plurality of electrically conductive traces comprise a plurality of power splitters/combiners.

Example 41 includes the subject matter of any of Examples 33-40, and wherein the plurality of hierarchical networks comprises a first plurality of hierarchical networks and the plurality of vias comprises a first plurality of vias, and further comprising:

a third layer having a third plurality of electrically conductive traces comprising a first portion of a second plurality of hierarchical networks;

a fourth layer having a fourth plurality of electrically conductive traces comprising a second portion of the second plurality of hierarchical networks, wherein the third plurality of electrically conductive traces is orientated in the first direction and the fourth plurality of electrically conductive traces is orientated in the second direction; and a second plurality of vias electrically connecting the third plurality of electrically conductive traces of the third layer to the respective fourth plurality of electrically conductive traces of the fourth layer to define the second plurality of hierarchical networks.

Example 42 includes the subject matter of any of Examples 33-41, and wherein open ends of the first or second traces at a last stage of the first plurality of first hierarchical networks comprise a plurality of first ends and open ends of the third or fourth traces at a last stage of the second plurality of hierarchical networks comprise a plurality of second ends, and wherein a first end of the plurality of first ends and a corresponding second end of the plurality of second ends are non-collinear to each other in a direction perpendicular to a major plane of the first layer.

Example 43 includes the subject matter of any of Examples 33-42, and wherein at least one of the first or second traces at the last stage of the first plurality of hierarchical networks has a different shape than at least one of the third or fourth traces at the last stage of the second plurality of hierarchical networks.

Example 44 includes the subject matter of any of Examples 33-43, and further comprising a plurality of antenna elements included in a third layer disposed above the first and second layers and arranged in a configuration independent of a configuration of the plurality of hierarchical networks, wherein the plurality of hierarchical networks is configured to transmit or receive multiple, isolated radio frequency (RF) signals to or from the plurality of antenna elements.

Example 45 is an apparatus, which includes:

a first electrically conductive trace having a first orientation included in a first layer;

a second electrically conductive trace having a second orientation, different from the first orientation, included in a second layer; and a power splitter/combiner included in the first and second layers, wherein a first portion of the power splitter/combiner included in the first layer electrically connects to the first electrically conductive trace, a second portion of the power splitter/combiner included in the second layer electrically connects to the second electrically conductive trace, and a third portion of the power splitter/combiner comprises a via that extends between the first and second layers.

Example 46 includes the subject matter of Example 45, and wherein the first and second electrically conductive traces comprise traces associated with a hierarchical network.

Example 47 includes the subject matter of any of Examples 45-46, and further comprising an isolation resistor included in the second layer configured to electrically isolate a first portion of the second electrically conductive trace from a second portion of the second electrically conductive trace, wherein the second portion of the power splitter/combiner included in the second layer comprises first and second branches, and wherein the first and second portions of the second electrically conductive trace electrically couple with respective first and second branches.

Example 48 includes the subject matter of any of Examples 45-47, and wherein the via comprises a first via and wherein the third portion of the power splitter/combiner further comprises a second via that extends between the first and second layers.

Example 49 includes the subject matter of any of Examples 45-48, and further comprising:

a third electrically conductive trace included in the first layer, and having the first orientation and immediately adjacent to the first electrically conductive trace;

a fourth electrically conductive trace included in the second layer, and having the second orientation and immediately adjacent to the second electrically conductive trace; and a second power splitter/combiner included in the first and second layers, wherein the second power splitter/combiner is associated with routing signals between the third and fourth electrically conductive traces.

Example 50 includes the subject matter of any of Examples 45-49, and wherein the second portion of the power splitter/combiner included in the second layer comprises first and second branches, wherein first and second portions of the second electrically conductive trace electrically couple with respective first and second branches, and wherein a pitch associated with one or both of the first and third electrically conductive traces or the second and fourth electrically conductive traces is smaller than a signal pathway length associated with one or both of the first or second branches.

Example 51 includes the subject matter of any of Examples 45-50, and wherein the first and second electrically conductive traces are associated with a first hierarchical network and the third and fourth electrically conductive traces are associated with a second hierarchical network, and wherein the first and second hierarchical networks are electrically isolated from each other.

Example 52 includes the subject matter of any of Examples 45-51, and wherein the first hierarchical network comprises an H-network.

Example 53 includes the subject matter of any of Examples 45-52, and wherein the power splitter/combiner is located at portions of the first and second electrically conductive traces that are collinear to each other in a direction perpendicular to a plane of the first layer.

Example 54 is a method for routing signals, which includes:

routing a first signal through a first hierarchical network to a first plurality of electrical components, wherein routing the first signal through the first hierarchical network includes routing the first signal through a first electrically conductive trace oriented in a first direction in a first layer, a first via located between the first layer and a second layer, and a second electrically conductive trace oriented in a second direction, different from the first direction, in the second layer; and routing a second signal through a second hierarchical network to a second plurality of electrical components, wherein routing the second signal through the second hierarchical network includes routing the second signal through a third electrically conductive trace oriented in the first direction in the first layer, a second via located between the first layer and the second layer, and a fourth electrically conductive trace oriented in the second direction in the second layer, wherein the first and third electrically conductive traces are offset from each other in the first layer and the second and fourth electrically conductive traces are offset from each other in the second layer.

Example 55 includes the subject matter of Example 54, and wherein the first and second vias comprise portions of a plurality of power splitters/combiners included in each of the first and second hierarchical networks.

Example 56 includes the subject matter of any of Examples 54-55, and wherein the first and second hierarchical networks comprise H-networks, fractal networks, self-similar fractal networks, tree networks, star networks, hybrid networks, rectilinear H-networks, or curvilinear H-networks.

Example 57 includes the subject matter of any of Examples 54-56, and wherein the first and second hierarchical networks are electrically isolated from each other.

Example 58 includes the subject matter of any of Examples 54-57, and wherein each of the first and second signals comprises a plurality of radio frequency (RF) signals.

Example 59 includes the subject matter of any of Examples 54-58, and wherein routing the first signal through the first hierarchical network further includes routing the first signal through a first electrically conductive trace oriented in a first direction in a first layer, through a power splitter/combiner including the first via and a third via located between the first and second layers, and through opposing directions of first and second portions of the second electrically conductive trace.

Example 60 includes the subject matter of any of Examples 54-59, and further comprising:

routing third signals from the first plurality of electrical components through the first hierarchical network; and routing fourth signals from the second plurality of electrical components through the second hierarchical network.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

The embodiments of the invention in which an exclusive property or privilege is claimed are defined as follows:

1. An apparatus, comprising:

a first layer having a first plurality of electrically conductive traces comprising a first portion of a plurality of hierarchical networks, wherein respective traces of the first plurality of electrically conductive traces are parallel and offset from one another;

a second layer having a second plurality of electrically conductive traces comprising a second portion of the plurality of hierarchical networks, wherein the first plurality of electrically conductive traces is orientated in a first direction and the second plurality of electrically conductive traces is orientated in a second direction different from the first direction, wherein respective traces of the second plurality of electrically conductive traces are parallel and offset from one another; and a plurality of vias electrically connecting the first plurality of electrically conductive traces of the first layer to the respective second plurality of electrically conductive traces of the second layer to define the plurality of hierarchical networks.

2. The apparatus of claim 1, wherein the plurality of hierarchical networks comprise H-networks, fractal networks, self-similar fractal networks, tree networks, star networks, or hybrid networks.

3. The apparatus of claim 1, wherein the plurality of vias and certain portions of the first and second plurality of electrically conductive traces comprise a plurality of power splitters/combiners.

4. An apparatus, comprising:

a first layer having a first plurality of electrically conductive traces comprising a first portion of a plurality of hierarchical networks;

a second layer having a second plurality of electrically conductive traces comprising a second portion of the plurality of hierarchical networks, wherein the first plurality of electrically conductive traces is oriented in a first direction and the second plurality of electrically conductive traces is oriented in a second direction different from the first direction; and a plurality of vias electrically connecting the first plurality of electrically conductive traces of the first layer to the respective second plurality of electrically conductive traces of the second layer to define the plurality of hierarchical networks, wherein the plurality of hierarchical networks comprises at least three hierarchical networks.

5. An apparatus, comprising:

a first layer having a first plurality of electrically conductive traces comprising a first portion of a plurality of hierarchical networks;

a second layer having a second plurality of electrically conductive traces comprising a second portion of the plurality of hierarchical networks, wherein the first plurality of electrically conductive traces is oriented in a first direction and the second plurality of electrically conductive traces is oriented in a second direction different from the first direction; and a plurality of vias electrically connecting the first plurality of electrically conductive traces of the first layer to the respective second plurality of electrically conductive traces of the second layer to define the plurality of hierarchical networks, wherein hierarchical networks of the plurality of hierarchical networks are electrically isolated from one another.

6. An apparatus, comprising:

a first layer having a first plurality of electrically conductive traces comprising a first portion of a plurality of hierarchical networks;

a second layer having a second plurality of electrically conductive traces comprising a second portion of the plurality of hierarchical networks, wherein the first plurality of electrically conductive traces is oriented in a first direction and the second plurality of electrically conductive traces is oriented in a second direction different from the first direction; and a plurality of vias electrically connecting the first plurality of electrically conductive traces of the first layer to the respective second plurality of electrically conductive traces of the second layer to define the plurality of hierarchical networks, wherein the plurality of vias comprises a first plurality of vias, and wherein the second plurality of electrically conductive traces electrically couples to a plurality of electrical components included in a layer different from the first and second layers via a second plurality of vias.

7. An apparatus, comprising:

a first layer having a first plurality of electrically conductive traces comprising a first portion of a plurality of hierarchical networks;

a second layer having a second plurality of electrically conductive traces comprising a second portion of the plurality of hierarchical networks, wherein the first plurality of electrically conductive traces is oriented in a first direction and the second plurality of electrically conductive traces is oriented in a second direction different from the first direction;

a plurality of vias electrically connecting the first plurality of electrically conductive traces of the first layer to the respective second plurality of electrically conductive traces of the second layer to define the plurality of hierarchical networks; and a plurality of isolation vias adjacent at least some of the first plurality of electrically conductive traces and the second plurality of electrically conductive traces.

8. An apparatus, comprising:

a first layer having a first plurality of electrically conductive traces comprising a first portion of a plurality of hierarchical networks;

a second layer having a second plurality of electrically conductive traces comprising a second portion of the plurality of hierarchical networks, wherein the first plurality of electrically conductive traces is oriented in a first direction and the second plurality of electrically conductive traces is oriented in a second direction different from the first direction; and a plurality of vias electrically connecting the first plurality of electrically conductive traces of the first layer to the respective second plurality of electrically conductive traces of the second layer to define the plurality of hierarchical networks, wherein the plurality of hierarchical networks comprises a first plurality of hierarchical networks and the plurality of vias comprises a first plurality of vias, and further comprising:

a third layer having a third plurality of electrically conductive traces comprising a first portion of a second plurality of hierarchical networks;

a fourth layer having a fourth plurality of electrically conductive traces comprising a second portion of the second plurality of hierarchical networks, wherein the third plurality of electrically conductive traces is orientated in the first direction and the fourth plurality of electrically conductive traces is orientated in the second direction; and a second plurality of vias electrically connecting the third plurality of electrically conductive traces of the third layer to the respective fourth plurality of electrically conductive traces of the fourth layer to define the second plurality of hierarchical networks.

9. The apparatus of claim 8, wherein open ends of the first or second plurality of electrically conductive traces at a last stage of the first plurality of first hierarchical networks comprise a plurality of first ends and open ends of the third or fourth plurality of electrically conductive traces at a last stage of the second plurality of hierarchical networks comprise a plurality of second ends, and wherein a first end of the plurality of first ends and a corresponding second end of the plurality of second ends are non-collinear to each other in a direction perpendicular to a major plane of the first layer.

10. The apparatus of claim 9, wherein at least one of the first or second plurality of electrically conductive traces at the last stage of the first plurality of hierarchical networks has a different shape than at least one of the third or fourth plurality of electrically conductive traces at the last stage of the second plurality of hierarchical networks.

11. An apparatus, comprising:

a first layer having a first plurality of electrically conductive traces comprising a first portion of a plurality of hierarchical networks;

a second layer having a second plurality of electrically conductive traces comprising a second portion of the plurality of hierarchical networks, wherein the first plurality of electrically conductive traces is oriented in a first direction and the second plurality of electrically conductive traces is oriented in a second direction different from the first direction;

a plurality of vias electrically connecting the first plurality of electrically conductive traces of the first layer to the respective second plurality of electrically conductive traces of the second layer to define the plurality of hierarchical networks; and a plurality of antenna elements included in a third layer disposed above the first and second layers and arranged in a configuration independent of a configuration of the plurality of hierarchical networks, wherein the plurality of hierarchical networks is configured to transmit or receive multiple, isolated radio frequency (RF) signals to or from the plurality of antenna elements.

12. An apparatus comprising:

a first electrically conductive trace having a first orientation included in a first layer;

a second electrically conductive trace having a second orientation, different from the first orientation, included in a second layer;

a third electrically conductive trace included in the first layer, and having the first orientation and immediately adjacent to the first electrically conductive trace;

a fourth electrically conductive trace included in the second layer, and having the second orientation and immediately adjacent to the second electrically conductive trace;

a power splitter/combiner included in the first and second layers, wherein a first portion of the power splitter/combiner included in the first layer electrically connects to the first electrically conductive trace, a second portion of the power splitter/combiner included in the second layer electrically connects to the second electrically conductive trace, and a third portion of the power splitter/combiner comprises a via that extends between the first and second layers; and a second power splitter/combiner included in the first and second layers, wherein the second power splitter/combiner is associated with routing signals between the third and fourth electrically conductive traces.

13. The apparatus of claim 12, wherein the first and second electrically conductive traces comprise traces associated with a hierarchical network.

14. The apparatus of claim 12, wherein the via comprises a first via and wherein the third portion of the power splitter/combiner further comprises a second via that extends between the first and second layers.

15. The apparatus of claim 12, wherein the second portion of the power splitter/combiner included in the second layer comprises first and second branches, wherein first and second portions of the second electrically conductive trace electrically couple with respective first and second branches, and wherein a pitch associated with one or both of the first and third electrically conductive traces or the second and fourth electrically conductive traces is smaller than a signal pathway length associated with one or both of the first or second branches.

16. The apparatus of claim 12, wherein the first and second electrically conductive traces are associated with a first hierarchical network and the third and fourth electrically conductive traces are associated with a second hierarchical network, and wherein the first and second hierarchical networks are electrically isolated from each other.

17. The apparatus of claim 16, wherein the first hierarchical network comprises an H-network.

18. An apparatus, comprising:

a first electrically conductive trace having a first orientation included in a first layer;

a second electrically conductive trace having a second orientation, different from the first orientation, included in a second layer;

a power splitter/combiner included in the first and second layers, wherein a first portion of the power splitter/combiner included in the first layer electrically connects to the first electrically conductive trace, a second portion of the power splitter/combiner included in the second layer electrically connects to the second electrically conductive trace, and a third portion of the power splitter/combiner comprises a via that extends between the first and second layers; and an isolation resistor included in the second layer configured to electrically isolate a first portion of the second electrically conductive trace from a second portion of the second electrically conductive trace, wherein the second portion of the power splitter/combiner included in the second layer comprises first and second branches, and wherein the first and second portions of the second electrically conductive trace electrically couple with respective first and second branches.

19. An apparatus, comprising:

a first electrically conductive trace having a first orientation included in a first layer;

a second electrically conductive trace having a second orientation, different from the first orientation, included in a second layer; and a power splitter/combiner included in the first and second layers, wherein a first portion of the power splitter/combiner included in the first layer electrically connects to the first electrically conductive trace, a second portion of the power splitter/combiner included in the second layer electrically connects to the second electrically conductive trace, and a third portion of the power splitter/combiner comprises a via that extends between the first and second layers, wherein the power splitter/combiner is located at portions of the first and second electrically conductive traces that are collinear to each other in a direction perpendicular to a plane of the first layer.

20. A method for routing signals, the method comprising:

routing a first signal through a first hierarchical network to a first plurality of electrical components, wherein routing the first signal through the first hierarchical network includes routing the first signal through a first electrically conductive trace oriented in a first direction in a first layer, a first via located between the first layer and a second layer, and a second electrically conductive trace oriented in a second direction, different from the first direction, in the second layer; and routing a second signal through a second hierarchical network to a second plurality of electrical components, wherein routing the second signal through the second hierarchical network includes routing the second signal through a third electrically conductive trace oriented in the first direction in the first layer, a second via located between the first layer and the second layer, and a fourth electrically conductive trace oriented in the second direction in the second layer, wherein the first and third electrically conductive traces are offset from each other in the first layer and the second and fourth electrically conductive traces are offset from each other in the second layer.

21. The method of claim 20, wherein the first and second vias comprise portions of a plurality of power splitters/combiners included in each of the first and second hierarchical networks.

22. The method of claim 20, wherein the first and second hierarchical networks comprise H-networks, fractal networks, self-similar fractal networks, tree networks, star networks, hybrid networks, rectilinear H-networks, or curvilinear H-networks.

23. The method of claim 20, wherein the first and second hierarchical networks are electrically isolated from each other.

24. The method of claim 20, wherein each of the first and second signals comprises a plurality of radio frequency (RF) signals.

25. The method of claim 20, wherein routing the first signal through the first hierarchical network further includes routing the first signal through a first electrically conductive trace oriented in a first direction in a first layer, through a power splitter/combiner including the first via and a third via located between the first and second layers, and through opposing directions of first and second portions of the second electrically conductive trace.

26. The method of claim 20, further comprising:

routing third signals from the first plurality of electrical components through the first hierarchical network; and routing fourth signals from the second plurality of electrical components through the second hierarchical network.

* * * * *